(12) United States Patent
Xu

(10) Patent No.: US 12,532,200 B2
(45) Date of Patent: Jan. 20, 2026

(54) BURST MONITORING METHOD AND APPARATUS

(71) Applicant: Huawei Technologies Co., Ltd., Shenzhen (CN)

(72) Inventor: Xiaoying Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 319 days.

(21) Appl. No.: 18/468,419

(22) Filed: Sep. 15, 2023

(65) Prior Publication Data

US 2024/0007886 A1 Jan. 4, 2024

Related U.S. Application Data

(63) Continuation of application No. PCT/CN2021/081513, filed on Mar. 18, 2021.

(51) Int. Cl.
*H04W 24/08* (2009.01)
*H04L 43/0852* (2022.01)

(52) U.S. Cl.
CPC ......... *H04W 24/08* (2013.01); *H04L 43/0852* (2013.01)

(58) Field of Classification Search
CPC .... H04W 24/08; H04W 24/04; H04L 43/0852
See application file for complete search history.

(56) References Cited

U.S. PATENT DOCUMENTS

| 2017/0034025 | A1* | 2/2017 | Kollar | H04W 28/0268 |
| 2018/0077594 | A1* | 3/2018 | He | H04L 41/0806 |
| 2023/0224904 | A1* | 7/2023 | Mondet | H04W 72/21 370/336 |

FOREIGN PATENT DOCUMENTS

CN 111866929 A 10/2020

OTHER PUBLICATIONS

3GPP TS 23.501 V16.3.0 (Dec. 2019) "3rd Generation Partnership Project; Technical Specification Group Services and System Aspects; System architecture for the 5G System (5GS); Stage 2 (Release 16)," total 417 pages.
3GPP TS 23.502 V16.7.1 (Jan. 2021) "3rd Generation Partnership Project; Technical Specification Group Services and System Aspects; Procedures for the 5G System (5GS); Stage 2 (Release 16)," total 603 pages.

(Continued)

*Primary Examiner* — Kevin T Bates
*Assistant Examiner* — Hector Reyes
(74) *Attorney, Agent, or Firm* — Slater Matsil LLP

(57) ABSTRACT

A burst monitoring method is provided, wherein an uplink delay of an uplink burst that is between a terminal device and an access network device and that is determined by the access network device includes a first uplink delay from a first time to a second time, the first time is a grant time of the first data packet that arrives at a MAC layer of the terminal device in the uplink burst, and the second time is a sending time of the last data packet that is sent from a PDCP layer of the access network device in the uplink burst. In this way, a process of monitoring the uplink delay of the uplink burst between the terminal device and the access network device is implemented.

19 Claims, 22 Drawing Sheets

(56) References Cited

OTHER PUBLICATIONS

3GPP TS 28.552 V17.1.0 (Dec. 2020) "3rd Generation Partnership Project; Technical Specification Group Services and System Aspects; Management and orchestration; 5G performance measurements (Release 17)," total 207 pages.

3GPP TS 38.300 V15.4.0 (Dec. 2018) "3rd Generation Partnership Project; Technical Specification Group Radio Access Network; NR; NR and NG-RAN Overall Description; Stage 2 (Release 15)," total 97 pages.

3GPP TS 38.314 V16.2.0 (Dec. 2020) "3rd Generation Partnership Project; Technical Specification Group Radio Access Network; NR; Layer 2 Measurements; (Release 16)," total 20 pages.

3GPP TS 38.331 V15.12.0 (Dec. 2020) "3rd Generation Partnership Project; Technical Specification Group Radio Access Network; NR; Radio Resource Control (RRC) protocol specification (Release 15)," total 541 pages.

3GPP TS 38.413 V16.0.0 (Dec. 2019) "3rd Generation Partnership Project; Technical Specification Group Radio Access Network; NG-RAN; NG Application Protocol (NGAP) (Release 16)," total 335 pages.

3GPP TS 38.423 V16.0.0 (Dec. 2019) "3rd Generation Partnership Project; Technical Specification Group Radio Access Network; NG-RAN; Xn application protocol (XnAP) (Release 16)," total 330 pages.

3GPP TS 38.463 V15.8.0 (Sep. 2020) "3rd Generation Partnership Project; Technical Specification Group Radio Access Network; NG-RAN; E1 Application Protocol (E1AP) (Release 15)," total 179 pages.

3GPP TS 38.473 V15.4.1 (Jan. 2019) "3rd Generation Partnership Project; Technical Specification Group Radio Access Network; NG-RAN; F1 application protocol (F1AP) (Release 15)," total 192 pages.

\* cited by examiner

BURST MONITORING METHOD AND APPARATUS

CROSS-REFERENCE TO RELATED APPLICATIONS

This application is a continuation of International Application No. PCT/CN2021/081513, filed on Mar. 18, 2021, the disclosure of which is hereby incorporated by reference in its entirety.

TECHNICAL FIELD

This application relates to the communication field, and more specifically, to a burst monitoring method and apparatus.

BACKGROUND

During data transmission, a network device (for example, an access network device or a core network device) generally monitors a performance parameter such as a transmission delay or a packet loss rate by using a data packet as a granularity. In other words, the network device evaluates data transmission performance by monitoring a performance parameter of a data packet. Specifically, the network device monitors a performance parameter of a data packet between the terminal device and the access network device, and monitors a performance parameter of a data packet between the terminal device and the core network device.

However, in some scenarios, a service flow is transmitted in a transmission unit of a burst, and one burst includes one or more data packets. However, a performance parameter obtained by performing monitoring at a granularity of a data packet cannot be used to accurately evaluate data transmission performance, resulting in poor user experience. Data of a video type is used as an example. One video frame is one burst. The terminal can display an image of a video frame only when correctly receiving all data packets in the frame within a preset delay. Otherwise, frame loss occurs, and consequently video freeze occurs, resulting in poor user experience.

Therefore, a technology needs to be provided to improve accuracy of evaluating data transmission performance, so as to improve user experience.

SUMMARY

Embodiments of this application provide a burst monitoring method and apparatus. A network device (for example, an access network device) monitors a delay of a burst (an uplink burst or a downlink burst) between a terminal device and the access network device, and a network device (for example, a core network device) monitors a delay of a burst (an uplink burst or a downlink burst) between the terminal device and the core network device. Therefore, the network device (for example, the access network device or the core network device) can more accurately evaluate data transmission performance based on the delay of the burst, to improve user experience. In addition, in embodiments of this application, the network device (for example, the access network device) further monitors a burst error rate for a plurality of bursts, so that data transmission performance can be more accurately evaluated based on the burst error rate for the burst, thereby improving user experience.

According to a first aspect, a burst monitoring method is provided, including:

An access network device receives a delay monitoring request from a core network device, where the delay monitoring request indicates to perform delay monitoring on a periodic burst.

The access network device determines an uplink delay of an uplink burst between a terminal device and the access network device in response to the delay monitoring request, where the uplink delay of the uplink burst between the terminal device and the access network device includes a first uplink delay, the first uplink delay includes duration from a first time to a second time, the first time is a grant time of the first data packet that arrives at a media access control MAC layer of the terminal device in the uplink burst, and the second time is a sending time of the last data packet that is sent from a packet data convergence protocol PDCP layer of the access network device in the uplink burst.

The uplink burst is periodic, and the delay monitoring request indicates to perform delay monitoring on an uplink burst in each of one or more periods, to determine a transmission delay of the periodic uplink burst between the terminal device and the access network device.

According to the burst monitoring method provided in this embodiment of this application, a method for monitoring a delay of an uplink burst is provided. An access network device determines an uplink delay of an uplink burst between a terminal device and the access network device based on a delay monitoring request sent by a core network device for the uplink burst. The uplink delay includes a first uplink delay from a first time to a second time, the first time is a grant time of the first data packet that arrives at a MAC layer of the terminal device in the uplink burst, and the second time is a sending time of the last data packet that is sent from a PDCP layer of the access network device in the uplink burst. In this way, a process in which the access network device monitors the uplink delay of the uplink burst between the terminal device and the access network device is implemented, so that the access network can more accurately evaluate data transmission performance based on the uplink delay of the uplink burst, thereby improving user experience.

Optionally, the first uplink delay includes a second uplink delay and a third uplink delay, the second uplink delay includes duration from the first time to a third time, the third uplink delay includes duration from the third time to the second time, and the third time is a sending time of the last data packet that is sent from a radio link control RLC layer of the access network device to the PDCP layer of the access network device in the uplink burst.

Optionally, the uplink delay of the uplink burst between the terminal device and the access network device further includes a fourth uplink delay, the fourth uplink delay includes duration from a fourth time to a fifth time, or the fourth uplink delay includes duration from a fourth time to the first time, the fourth time is an arrival time of the first data packet that arrives at a PDCP layer of the terminal device in the uplink burst, and the fifth time is an arrival time of the first data packet that arrives at the MAC layer of the terminal device in the uplink burst.

According to the burst monitoring method provided in this embodiment of this application, the uplink delay of the uplink burst between the terminal device and the access network device further includes the fourth uplink delay of the uplink burst that is delivered at protocol layers of the terminal device, so that the access network device can more accurately monitor the uplink delay of the uplink burst.

Therefore, the access network device can more accurately evaluate data transmission performance based on the uplink delay of the uplink burst, thereby further improving user experience.

Optionally, that the access network device determines an uplink delay of an uplink burst between a terminal device and the access network device in response to the delay monitoring request includes:

The access network device determines the second uplink delay and the third uplink delay in response to the delay monitoring request.

The access network device determines the fourth uplink delay.

The access network device determines the uplink delay of the uplink burst between the terminal device and the access network device based on the second uplink delay, the third uplink delay, and the fourth uplink delay.

According to the burst monitoring method provided in this embodiment of this application, the access network device may collect statistics on the second uplink delay and the third uplink delay of the uplink burst between the terminal device and the access network device by segment, and determine the fourth uplink delay of the uplink burst that is generated because data is delivered on the terminal device, to determine the uplink delay of the uplink burst between the terminal device and the access network device based on the second uplink delay, the third uplink delay, and the fourth uplink delay. In this way, in a scenario in which a DU and a CU are separated, the DU may determine a second uplink delay of an uplink burst between the terminal device and the DU, the CU determines a third uplink delay of the uplink burst between the DU and the CU, and the CU determines the uplink delay of the uplink burst between the terminal device and the access network device based on the second uplink delay, the third uplink delay, and a determined fourth uplink delay, so as to monitor the uplink delay of the uplink burst in the scenario in which the DU and the CU are separated, and obtain a more accurate uplink delay.

Optionally, that the access network device determines an uplink delay of an uplink burst between a terminal device and the access network device in response to the delay monitoring request includes:

The access network device determines the first time and the second time in response to the delay monitoring request.

The access network device determines the fourth uplink delay.

The access network device determines the uplink delay of the uplink burst between the terminal device and the access network device based on the fourth uplink delay, the first time, and the second time.

According to the burst monitoring method provided in this embodiment of this application, the access network device determines the first time (that is, a start time) for transmitting the uplink burst on an air interface, the second time (that is, an end time) of the uplink burst on the access network device, and the fourth uplink delay of the uplink burst that is generated because data is delivered on the terminal device, and determines the uplink delay of the uplink burst between the terminal device and the access network device based on the first time, the second time, and the fourth uplink delay. Compared with a manner in which the access network device collects statistics on delays by segment, this method can obtain a more accurate uplink delay of the uplink burst, so that the access network device can more accurately evaluate data transmission performance, thereby further improving user experience. In addition, this embodiment is applicable to both the scenario in which the DU and the CU are separated and a scenario in which the DU and the CU are not separated, and is more flexible.

Optionally, that the access network device determines an uplink delay of an uplink burst between a terminal device and the access network device in response to the delay monitoring request includes:

The access network device determines the second uplink delay and the third uplink delay in response to the delay monitoring request.

The access network device determines the uplink delay of the uplink burst between the terminal device and the access network device based on the second uplink delay and the third uplink delay.

According to the burst monitoring method provided in this embodiment of this application, the access network device may collect statistics on the second uplink delay and the third uplink delay of the uplink burst between the terminal device and the access network device by segment, to determine the uplink delay of the uplink burst between the terminal device and the access network device based on the second uplink delay and the third uplink delay. In this way, in a scenario in which a DU and a CU are separated, the DU may determine a second uplink delay of an uplink burst between the terminal device and the DU, the CU determines a third uplink delay of the uplink burst between the DU and the CU, and the CU determines the uplink delay of the uplink burst between the terminal device and the access network device based on the second uplink delay and the third uplink delay, so as to monitor the uplink delay of the uplink burst in the scenario in which the DU and the CU are separated.

Optionally, that the access network device determines an uplink delay of an uplink burst between a terminal device and the access network device in response to the delay monitoring request includes:

The access network device determines the first time and the second time in response to the delay monitoring request.

The access network device determines the uplink delay of the uplink burst between the terminal device and the access network device based on the first time and the second time.

According to the burst monitoring method provided in this embodiment of this application, the access network device determines the first time (that is, a start time) for transmitting the uplink burst on an air interface and the second time (that is, an end time) of the uplink burst on the access network device, and determines the uplink delay of the uplink burst between the terminal device and the access network device based on the first time and the second time. Compared with a manner in which the access network device collects statistics on delays by segment, this method can obtain a more accurate uplink delay of the uplink burst, so that the access network device can more accurately evaluate data transmission performance, thereby further improving user experience. In addition, this embodiment is applicable to both the scenario in which the DU and the CU are separated and a scenario in which the DU and the CU are not separated, and is more flexible.

Optionally, the method further includes:

The access network device sends response information to the core network device, where the response information includes the uplink delay of the uplink burst between the terminal device and the access network device.

According to the burst monitoring method provided in this embodiment of this application, the access network device sends the uplink delay of the uplink burst between the terminal device and the access network device to the core network device, so that the core network device can further determine an uplink delay of the uplink burst between the terminal device and the core network device.

According to a second aspect, a burst monitoring method is provided, including:

A core network device sends a delay monitoring request to an access network device, where the delay monitoring request indicates to perform delay monitoring on a periodic burst.

The core network device receives response information from the access network device, where the response information is information for responding to the delay monitoring request, and the response information includes an uplink delay of an uplink burst between a terminal device and the access network device, where the uplink delay of the uplink burst between the terminal device and the access network device includes a first uplink delay, the first uplink delay includes duration from a first time to a second time, the first time is a grant time of the first data packet that arrives at a media access control MAC layer of the terminal device in the uplink burst, and the second time is a sending time of the last data packet that is sent from a packet data convergence protocol PDCP layer of the access network device in the uplink burst.

The core network device determines a fifth uplink delay, where the fifth uplink delay is a delay, between the access network device and the core network device, of the last data packet that is sent from the PDCP layer of the access network device in the uplink burst.

The core network device determines an uplink delay of the uplink burst between the terminal device and the core network device based on the fifth uplink delay and the uplink delay of the uplink burst between the terminal device and the access network device.

According to the burst monitoring method provided in this embodiment of this application, a method for monitoring a delay of an uplink burst is provided. A core network device receives an uplink delay of an uplink burst that is between a terminal device and an access network device and that is sent by the access network device, and finally determines an uplink delay of the uplink burst between the terminal device and the core network device based on the uplink delay and a fifth uplink delay of the uplink burst that is between the access network device and the core network device and that is determined by the core network device. In this way, a process of monitoring the uplink delay of the uplink burst between the terminal device and the core network device is implemented, so that the core network device can more accurately evaluate data transmission performance based on the uplink delay of the uplink burst, thereby improving user experience.

Optionally, the uplink delay of the uplink burst between the terminal device and the access network device further includes a fourth uplink delay, the fourth uplink delay includes duration from a fourth time to a fifth time, or the fourth uplink delay includes duration from a fourth time to the first time, the fourth time is an arrival time of the first data packet that arrives at a PDCP layer of the terminal device in the uplink burst, and the fifth time is an arrival time of the first data packet that arrives at the MAC layer of the terminal device in the uplink burst.

According to a third aspect, a burst monitoring method is provided, including:

A core network device sends a delay monitoring request to an access network device, where the delay monitoring request indicates to perform delay monitoring on a periodic burst.

The core network device receives response information from the access network device, where the response information is information for responding to the delay monitoring request, the response information includes a first time, and the first time is a grant time of the first data packet that arrives at a media access control MAC layer of a terminal device in an uplink burst.

The core network device determines an arrival time of the last data packet that arrives at the core network device in the uplink burst.

The core network device determines an uplink delay of the uplink burst between the terminal device and the core network device based on the first time and the arrival time.

According to the burst monitoring method provided in this embodiment of this application, the core network device determines the uplink delay of the uplink burst between the terminal device and the core network device by using the grant time (that is, the first time) of the first data packet that arrives at the MAC layer in the uplink burst and that is sent by the access network device and the arrival time of the last data packet that arrives at the core network device in the uplink burst. In this way, a process of monitoring the uplink delay of the uplink burst between the terminal device and the core network device is implemented, and a more accurate uplink delay can be obtained, so that the core network device can more accurately evaluate data transmission performance based on the uplink delay of the uplink burst, thereby improving user experience.

Optionally, the response information further includes a fourth uplink delay, the fourth uplink delay includes duration from a fourth time to a fifth time, or the fourth uplink delay includes duration from a fourth time to the first time, the fourth time is an arrival time of the first data packet that arrives at a PDCP layer of the terminal device in the uplink burst, and the fifth time is an arrival time of the first data packet that arrives at the MAC layer of the terminal device in the uplink burst.

That the core network device determines an uplink delay of the uplink burst between the terminal device and the core network device based on the first time and the arrival time includes:

The core network device determines the uplink delay of the uplink burst between the terminal device and the core network device based on the first time, the arrival time, and the fourth uplink delay.

According to a fourth aspect, a burst monitoring method is provided, including:

An access network device receives a delay monitoring request from a core network device, where the delay monitoring request indicates to perform delay monitoring on a periodic burst.

The access network device determines a downlink delay of a downlink burst between a terminal device and the access network device in response to the delay monitoring request, where the downlink delay of the downlink burst between the terminal device and the access network device includes a first downlink delay, the first downlink delay includes duration from a first time to a second time, the first time is an arrival time of the first data packet that arrives at a packet data convergence protocol PDCP layer of the access network device in the downlink burst, and the second time is an arrival time of the last piece of feedback information that arrives at a media access control MAC layer of the access network device, or the second time is a sending time of the last piece of feedback information that is sent from a physical layer of the terminal device, where the feedback information indicates that the terminal device successfully receives a data packet in the downlink burst.

According to the burst monitoring method provided in this embodiment of this application, a method for monitoring a delay of a downlink burst is provided. An access network device determines a downlink delay of a downlink burst between the access network device and a terminal device based on a delay monitoring request for the downlink burst that is sent by a core network device. The downlink delay includes a first downlink delay from a first time to a second time, the first time is an arrival time of the first data packet that arrives at a packet data convergence protocol PDCP layer of the access network device in the downlink burst, and the second time is an arrival time of the last piece of feedback information that arrives at a MAC layer of the access network device or a sending time of the last piece of feedback information that is sent from a physical layer of the terminal device. In this way, a process in which the access network device monitors the downlink delay of the downlink burst between the terminal device and the access network device is implemented, so that the access network device can more accurately evaluate data transmission performance based on the downlink delay of the downlink burst, thereby improving user experience.

Optionally, the first downlink delay includes a second downlink delay and a third downlink delay, the second downlink delay includes duration from a third time to the second time, the third downlink delay includes duration from the first time to the third time, and the third time is an arrival time of the first data packet that arrives at a radio link control RLC layer of the access network device in the downlink burst.

Optionally, that the access network device determines a downlink delay of a downlink burst between a terminal device and the access network device in response to the delay monitoring request includes:

The access network device determines the second downlink delay and the third downlink delay in response to the delay monitoring request.

The access network device determines the downlink delay of the downlink burst between the terminal device and the access network device based on the second downlink delay and the third downlink delay.

According to the burst monitoring method provided in this embodiment of this application, the access network device may collect statistics on the second downlink delay and the third downlink delay of the downlink burst between the terminal device and the access network device by segment, to determine the downlink delay of the downlink burst between the terminal device and the access network device based on the second downlink delay and the third downlink delay. In this way, in a scenario in which a DU and a CU are separated, the DU may determine a second downlink delay of a downlink burst between the terminal device and the DU, the CU determines a third downlink delay of the downlink burst between the DU and the CU, and the CU determines the downlink delay of the downlink burst between the terminal device and the access network device based on the second downlink delay and the third downlink delay, so as to monitor the downlink delay of the downlink burst in the scenario in which the DU and the CU are separated.

Optionally, that the access network device determines a downlink delay of a downlink burst between a terminal device and the access network device in response to the delay monitoring request includes:

The access network device determines the first time and the second time in response to the delay monitoring request.

The access network device determines the downlink delay of the downlink burst between the terminal device and the access network device based on the first time and the second time.

According to the burst monitoring method provided in this embodiment of this application, the access network device determines the first time (that is, a start time) and the second time (that is, an end time) for transmitting the downlink burst between the access network device and the terminal device, and determines the downlink delay of the downlink burst between the terminal device and the access network device based on the first time and the second time. Compared with a manner in which the access network device collects statistics on delays by segment, this method can obtain a more accurate downlink delay of the downlink burst, so that the access network device can more accurately evaluate data transmission performance, thereby further improving user experience. In addition, this embodiment is applicable to both the scenario in which the DU and the CU are separated and a scenario in which the DU and the CU are not separated, and is more flexible.

Optionally, the downlink delay of the downlink burst between the terminal device and the access network device further includes a fourth downlink delay, the fourth downlink delay includes duration from a fourth time to a fifth time, the fourth time is an arrival time of the last data packet that arrives at a MAC layer of the terminal device in the downlink burst, and the fifth time is a sending time of the last data packet that is sent from a PDCP layer of the terminal device in the downlink burst.

According to the burst monitoring method provided in this embodiment of this application, the downlink delay of the downlink burst between the terminal device and the access network device further includes the fourth downlink delay of the downlink burst that is delivered at protocol layers of the terminal device, so that the access network device can more accurately monitor the downlink delay of the downlink burst. Therefore, the access network device can more accurately evaluate data transmission performance based on the downlink delay of the downlink burst, thereby further improving user experience.

Optionally, that the access network device determines a downlink delay of a downlink burst between a terminal device and the access network device in response to the delay monitoring request includes:

The access network device determines the second downlink delay and the third downlink delay in response to the delay monitoring request.

The access network device determines the fourth downlink delay.

The access network device determines the downlink delay of the downlink burst between the terminal device and the access network device based on the second downlink delay, the third downlink delay, and the fourth downlink delay.

According to the burst monitoring method provided in this embodiment of this application, the access network device may collect statistics on the second downlink delay and the third downlink delay of the downlink burst between the terminal device and the access network device by segment, and determine the fourth downlink delay of the downlink burst that is generated because data is delivered at protocol layers of the terminal device, to determine the downlink delay of the downlink burst between the terminal device and the access network device based on the second downlink delay, the third downlink delay, and the fourth downlink delay. In this way, in a scenario in which a DU and a CU are separated, the DU may determine a second downlink delay of a downlink burst between the terminal device and the DU, the CU determines a third downlink delay of the downlink burst between the DU and the CU, and the CU determines the downlink delay of the downlink burst between the terminal device and the access network device based on the second downlink delay, the third downlink delay, and a determined fourth downlink delay, so as to monitor the downlink delay of the downlink burst in the scenario in which the DU and the CU are separated, and obtain a more accurate downlink delay.

Optionally, that the access network device determines a downlink delay of a downlink burst between a terminal device and the access network device in response to the delay monitoring request includes:

The access network device determines the first time and the second time in response to the delay monitoring request.

The access network device determines the fourth downlink delay.

The access network device determines the downlink delay of the downlink burst between the terminal device and the access network device based on the first time, the second time, and the fourth downlink delay.

According to the burst monitoring method provided in this embodiment of this application, the access network device determines the first time (that is, a start time) and the second time (that is, an end time) for transmitting the downlink burst between the access network device and the terminal device, determines the fourth downlink delay of the downlink burst that is generated because data is delivered at protocol layers of the terminal device, and determines the downlink delay of the downlink burst between the terminal device and the access network device based on the first time, the second time, and the fourth downlink delay. Compared with a manner in which the access network device collects statistics on delays by segment, this method can obtain a more accurate downlink delay of the downlink burst, so that the access network device can more accurately evaluate data transmission performance, thereby further improving user experience. In addition, this embodiment is applicable to both the scenario in which the DU and the CU are separated and a scenario in which the DU and the CU are not separated, and is more flexible.

Optionally, the method further includes:

The access network device sends response information to the core network device, where the response information includes the downlink delay of the downlink burst between the terminal device and the access network device.

According to the burst monitoring method provided in this embodiment of this application, the access network device sends the downlink delay of the downlink burst between the terminal device and the access network device to the core network device, so that the core network device can further determine a downlink delay of the downlink burst between the terminal device and the core network device.

According to a fifth aspect, a burst monitoring method is provided, including:

A core network device sends a delay monitoring request to an access network device.

The core network device receives response information from the access network device, where the response information is information for responding to the delay monitoring request, and the response information includes a downlink delay of a downlink burst between a terminal device and the access network device, where the downlink delay of the downlink burst between the terminal device and the access network device includes a first downlink delay, the first downlink delay includes duration from a first time to a second time, the first time is an arrival time of the first data packet that arrives at a packet data convergence protocol PDCP layer of the access network device in the downlink burst, and the second time is an arrival time of the last piece of feedback information that arrives at a media access control MAC layer of the access network device, or the second time is a sending time of the last piece of feedback information that is sent from a physical layer of the terminal device, where the feedback information indicates that the terminal device successfully receives a data packet in the downlink burst.

The core network device determines a fifth downlink delay, where the fifth downlink delay is a delay, between the access network device and the core network device, of the first data packet that is sent from the core network device in the downlink burst.

The core network device determines a downlink delay of the downlink burst between the terminal device and the core network device based on the fifth downlink delay and the downlink delay of the downlink burst between the terminal device and the access network device.

According to the burst monitoring method provided in this embodiment of this application, a method for monitoring a delay of a downlink burst is provided. A core network device receives a downlink delay of a downlink burst that is between a terminal device and an access network device and that is sent by the access network device, and finally determines a downlink delay of the downlink burst between the terminal device and the core network device based on the downlink delay and a fifth downlink delay of the downlink burst that is between the access network device and the core network device and that is determined by the core network device. In this way, a process of monitoring the downlink delay of the downlink burst between the terminal device and the core network device is implemented, so that the core network device can more accurately evaluate data transmission performance based on the downlink delay of the downlink burst, thereby improving user experience.

Optionally, the downlink delay of the downlink burst between the terminal device and the core network device further includes a fourth downlink delay, the fourth downlink delay includes duration from a fourth time to a fifth time, the fourth time is an arrival time of the last data packet that arrives at a MAC layer of the terminal device in the downlink burst, and the fifth time is a sending time of the last data packet that is sent from a PDCP layer of the terminal device in the downlink burst.

According to a sixth aspect, a burst monitoring method is provided, including:

A core network device sends a delay monitoring request to an access network device.

The core network device receives response information from the access network device, where the response information is information for responding to the delay monitoring request, the response information includes a second time, and the second time is an arrival time of the last piece of feedback information that arrives at a media access control MAC layer of the access network device, or the second time is a sending time of the last piece of feedback information that is sent from a physical layer of the terminal device, where the feedback information indicates that the terminal device successfully receives a data packet in a downlink burst.

The core network device determines a sending time of the first data packet that is sent from the core network device in the downlink burst.

The core network device determines a downlink delay of the downlink burst between the terminal device and the core network device based on the second time and the sending time.

According to the burst monitoring method provided in this embodiment of this application, the core network device determines the downlink delay of the downlink burst between the terminal device and the core network device by using the sending time of the first data packet that is sent from the core network device in the burst and that is sent by the access network device, and the second time of the last piece of feedback information that arrives at the access network device or the last piece of feedback information that is sent from the terminal device. In this way, a process of monitoring the downlink delay of the downlink burst between the terminal device and the core network device is implemented, and a more accurate downlink delay can be obtained, so that the core network device can more accurately evaluate data transmission performance based on the downlink delay of the downlink burst, thereby improving user experience.

Optionally, the response information further includes a fourth downlink delay, the fourth downlink delay includes duration from a fourth time to a fifth time, the fourth time is an arrival time of the last data packet that arrives at a MAC layer of the terminal device in the downlink burst, and the fifth time is a sending time of the last data packet that is sent from a PDCP layer of the terminal device in the downlink burst.

That the core network device determines a downlink delay of the downlink burst between the terminal device and the core network device based on the second time and the sending time includes:

The core network device determines the downlink delay of the downlink burst between the terminal device and the core network device based on the second time, the sending time, and the fourth downlink delay.

According to a seventh aspect, a burst monitoring method is provided, including:

An access network device receives a burst error monitoring request from a core network device.

The access network device determines a burst error rate in response to the burst error monitoring request, where the burst error rate indicates a relationship between a quantity of first-type bursts in a plurality of bursts and a quantity of the plurality of bursts, and the first-type burst indicates that at least one data packet in one burst is not successfully received by a receive end within a preset delay.

The access network device sends response information to the core network device, where the response information includes the burst error rate.

It should be understood that the burst may be an uplink burst, or may be a downlink burst. This is not limited in this embodiment of this application.

The plurality of bursts indicate a plurality of bursts in a period of time. For example, the period of time may be predefined in a protocol, or may be set or configured by the access network device.

For example, the preset delay may be predefined in a protocol, or may be set or configured by the access network device.

In uplink transmission, the first-type burst indicates that at least one data packet in one burst is not successfully received by the access network device within a preset delay, and the access network device is the receive end.

In downlink transmission, the first-type burst indicates that at least one data packet in one burst is not successfully received by a terminal device within a preset delay, and the terminal device is the receive end. It should be understood that, in downlink transmission, if the access network device receives feedback information indicating that a data packet is successfully received, it is considered that the data packet is successfully received by the terminal device.

According to the burst monitoring method provided in this embodiment of this application, a method for determining a burst error rate of a burst is provided. The burst error rate indicates a relationship between a plurality of bursts and a first-type burst that is not successfully received by a receive end in the plurality of bursts, so that an access network device determines a burst error rate for the plurality of bursts based on a burst error monitoring request of a core network device, and sends the burst error rate to the core network device. In this way, a process in which the access network device monitors the burst error rate of the burst between the terminal device and the access network device is implemented, so that data transmission performance can be more accurately evaluated based on the burst error rate for the burst, thereby improving user experience.

Optionally, the burst error rate is a ratio of a quantity of first-type bursts to a quantity of the plurality of bursts.

Optionally, the first-type burst indicates that at least one data packet in first-type data in one burst is not successfully received by the receive end within the preset delay, and the first-type data is base-layer data.

The base-layer data is data used as a reference for decoding a burst to which the base-layer data belongs or another burst.

According to an eighth aspect, a burst monitoring apparatus is provided. The apparatus is configured to perform the method provided in any one of the first aspect to the seventh aspect. Specifically, the apparatus may include a module configured to perform any possible implementation of the first aspect to the seventh aspect.

According to a ninth aspect, a burst monitoring apparatus is provided, including a processor. The processor is coupled to a memory, which may be configured to execute instructions in the memory, to implement the method in any possible implementation of the first aspect to the seventh aspect. Optionally, the apparatus further includes the memory. Optionally, the apparatus further includes a communication interface, and the processor is coupled to the communication interface.

According to a tenth aspect, a computer-readable storage medium is provided. The computer-readable storage medium stores a computer program. When the computer program is executed by an apparatus, the apparatus is enabled to implement the method in any possible implementation of the first aspect to the seventh aspect.

According to an eleventh aspect, a computer program product including instructions is provided. When the instructions are executed by a computer, an apparatus is enabled to implement the method in any possible implementation of the first aspect to the seventh aspect.

According to a twelfth aspect, a chip is provided, including an input interface, an output interface, a processor, and a memory. The input interface, the output interface, the processor, and the memory are connected by using an internal connection path. The processor is configured to execute code in the memory. When the code is executed, the processor is configured to perform the method in any possible implementation of the first aspect to the seventh aspect.

DETAILED DESCRIPTION OF ILLUSTRATIVE EMBODIMENTS

The following describes technical solutions of this application with reference to accompanying drawings.

The technical solutions in embodiments of this application may be applied to various communication systems, for example, a long term evolution (LTE) system, an LTE frequency division duplex (FDD) system, an LTE time division duplex (TDD) system, and a future 5th generation (5G) system or a new radio (NR) system.

Figure 1:
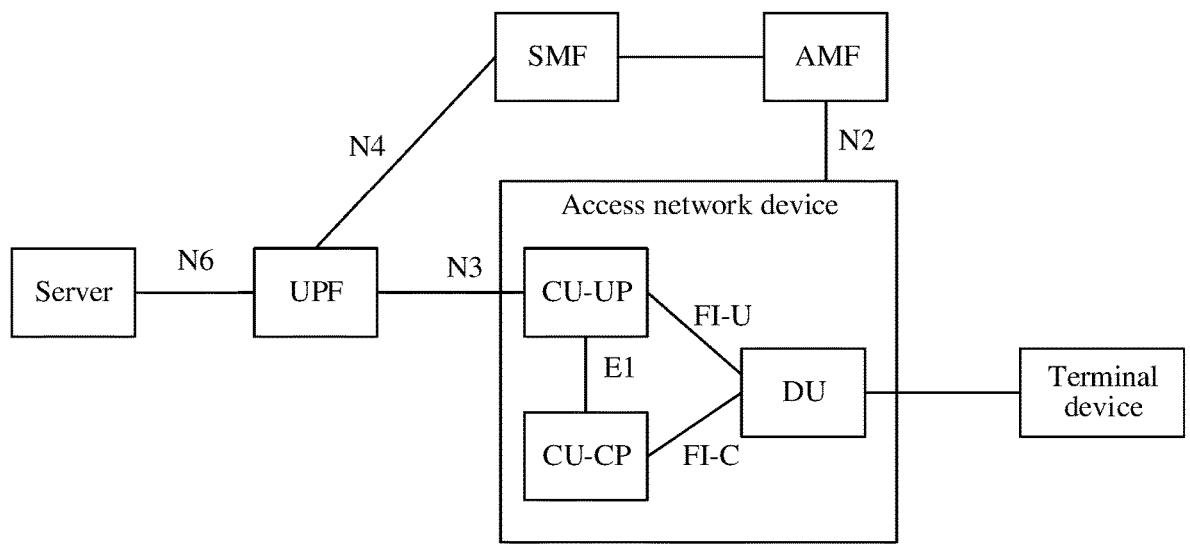
FIG. 1 is a schematic diagram of a possible network architecture applied to an embodiment of this application.

FIG. 1 shows a possible network architecture applied to an embodiment of this application. The network architecture includes a server, a core network device, an access network device, and a terminal device. The core network device includes a user plane network element, an access and management network element, and a session management network element. In addition, the access network device, the core network device, and the server may be collectively referred to as a network device in embodiments of this application.

With reference to FIG. 1, the following describes the network elements in the network architecture.

1. The user plane network element is configured to: implement packet routing and forwarding, quality of service (QoS) processing on user plane data, packet detection, policy rule execution, and the like, forward the user plane data, and generate a charging data record based on a traffic status, and functions as a data plane anchor. In 5G communication, as shown in FIG. 1, the user plane network element may be a user plane function (UPF) network element. In future communication such as 6G communication, the user plane network element may still be a UPF network element or have another name. This is not limited in this application.

For ease of description, an example in which the user plane network element is the UPF network element is used below for description, and the UPF network element is referred to as a UPF for short. The UPF network element described in this application subsequently may be replaced with the user plane network element.

2. The access management network element is mainly configured to perform mobility management, access management, and the like, for example, implement functions such as user location update, user registration with a network, user handover, lawful interception, and access authorization/authentication. In 5G communication, as shown in FIG. 1, the access and management network element may be an access and management function (AMF) network element. In future communication such as 6G communication, the access and management network element may still be an AMF network element or have another name. This is not limited in this application.

For ease of description, an example in which the access and management network element is the AMF network element is used below for description, and the AMF network element is referred to as an AMF for short. The AMF network element described in this application subsequently may be replaced with the access and management network element.

3. The session management network element is mainly configured to: manage a session, allocate and manage an internet protocol (IP) address of the terminal device, select a manageable UPF network element, implement access network-related session information exchange by using the AMF network element, terminate a policy control and charging function interface, notify downlink data, and the like. In 5G communication, as shown in FIG. 1, the session management network element may be a session management function (SMF) network element. In future communication such as 6G communication, the session management network element may still be an SMF network element or have another name. This is not limited in this application.

For ease of description, an example in which the session management network element is the SMF network element is used below for description, and the SMF network element is referred to as an SMF for short. The SMF network element described in this application subsequently may be replaced with the session management network element.

4. The server is configured to provide a network for transmitting data, for example, the internet. The server may be a data network authentication, authorization, and accounting (data network authentication, authorization, accounting) server, or may be an application server. In embodiments of this application, the server may also be referred to as a data network (DN) network element.

5. The terminal device is a device having a wireless communication function, and may be deployed on land, including an indoor or outdoor device, a handheld device, a wearable device, or a vehicle-mounted device, or may be deployed on the water (for example, on a ship), or may be deployed in the air (for example, on an airplane, a balloon, or a satellite). The terminal device may be a mobile phone, a tablet computer (Pad), a computer with a wireless transceiver function, a virtual reality (VR) terminal device, an augmented reality (AR) terminal device, a wireless terminal in industrial control, a vehicle-mounted terminal device, a wireless terminal in self-driving, a wireless terminal in remote medical, a wireless terminal in smart grid, a wireless terminal in transportation safety, a wireless terminal in smart city, a wireless terminal in smart home, or a wearable terminal. An application scenario is not limited in embodiments of this application.

The terminal device sometimes may also be referred to as a terminal, user equipment (UE), an access terminal device, a vehicle-mounted terminal, an industrial control terminal, a UE unit, a UE station, a mobile station, a mobile console, a remote station, a remote terminal device, a mobile device, a UE terminal device, a terminal device, a wireless communication device, a UE agent, a UE apparatus, or the like. The terminal device may be fixed or mobile.

6. The access network device is configured to provide a network access function for an authorized user in a specific area, and can use transmission tunnels with different quality based on a user level, a service requirement, and the like. The access network device can manage a radio resource, and provide an access service for the terminal device, to further complete forwarding of a control signal and user data between the terminal device and the core network device. The access network device network element may also be understood as a base station in a conventional network. In embodiments of this application, the access network device may also be referred to as a radio access network (RAN).

The access network device in embodiments of this application is a device configured to communicate with the terminal device. The access network device may be an evolved NodeB (eNB or eNodeB) or a transmission reception point (TRP) in an LTE system, a subsequently evolved NodeB in 3GPP, a radio controller in a cloud radio access network (CRAN) scenario, a relay station, an access point, a vehicle-mounted device, or a wearable device, a network device in a 5G network, a network device in a future 6G network, or the like. This is not limited in embodiments of this application.

As shown in FIG. 1, in some scenarios, the access network device is divided into a central unit (CU) and a distributed unit (DU), that is, the DU and the CU are separated. The DU is mainly configured to perform processing at a radio link control (radio link control, RLC) layer, a media access control (MAC) layer, and a physical layer (PHY). The CU is mainly configured to perform processing at a packet data convergence protocol (PDCP) layer.

In some scenarios, a control plane and a user plane of the CU are separated. A network element used for the control plane is referred to as a central unit control plane (CU-CP) network element, and a network element used for the user plane is referred to as a central unit user plane (CU-UP) network element. Generally, one CU includes one CU-CP and one or more CU-UPs.

In the network architecture, an N2 interface is a reference point between the access network device and the AMF network element, and is used to send a non-access stratum (NAS) message and the like. An N3 interface is a reference point between the access network device and the UPF network element, and is used to transmit user plane data and the like. An N4 interface is a reference point between the SMF network element and the UPF network element, and is used to transmit tunnel information such as tunnel identification information of an N3 connection, data buffer indication information, and a downlink data notification message. An N6 interface is a reference point between the UPF network element and the server, and is configured to transmit user plane data and the like.

In a scenario in which the CU and the DU of the access network device are separated and the CU-CP and the CU-UP of the CU are separated, an F1-U interface is a reference point between the DU and the CU-UP, and is used to transmit user plane data between the CU and the DU. An F1-C interface is a reference point between the DU and the CU-CP, and is used to transmit control message data between the CU and the DU. An E1 interface is a reference point between the CU-UP and the CU-CP, and is used to transmit control message data between the CU-CP and the CU-UP.

It should be understood that the foregoing network architecture applied to embodiments of this application is merely an example for description, and a network architecture applicable to embodiments of this application is not limited thereto. Any network architecture that can implement the functions of the foregoing network elements is applicable to embodiments of this application. The access and management network element, the access and management network element, and the session management network element are network elements in the core network device.

It should be further understood that the core network device may include more or fewer network elements. This is not limited in embodiments of this application. For example, the core network device may further include a policy control function (PCF) network element and a network exposure function (NEF) network element.

It should be further understood that the foregoing function network element may be a network element in a hardware device, or may be a software function running on dedicated hardware, or may be a virtualization function instantiated on a platform (for example, a cloud platform).

Currently, the network device (for example, the access network device or the core network device) evaluates data transmission performance by monitoring a performance parameter such as a transmission delay or a packet loss rate of a data packet. However, in some scenarios, a service flow is transmitted in a transmission unit of a burst, and one burst includes one or more data packets. However, a performance parameter obtained by performing monitoring at a granularity of a data packet cannot be used to accurately evaluate data transmission performance, resulting in poor user experience.

Data of a video type is used as an example. One video frame may be referred to as one burst. The terminal device can display an image of a video frame only when correctly receiving all data packets in the frame within a preset delay. Otherwise, frame loss occurs, and consequently video freeze occurs, resulting in poor user experience. For example, a video frame in a virtual reality (VR) technology is used as an example. In basic experience (35 Mbps, 60 fps), one video frame is generated every 16.7 ms, and one video frame (about 583 KB) is divided into 50 data packets (about 1500 bytes) for transmission. A decoder of the terminal device can correctly display an image of a video frame only when the terminal device correctly receives all data packets in the frame within a preset delay. Otherwise, the image of this frame cannot be displayed, which is equivalent to frame loss. If frame loss occurs, video freeze occurs. More frequent frame loss indicates a higher play freeze frequency.

Therefore, monitoring a performance parameter of a data packet by using a data packet as a granularity cannot meet requirements in some scenarios, especially for data of a video type. Therefore, embodiments of this application aim to perform monitoring by using a burst as a granularity to obtain a performance parameter of the burst, so as to obtain more accurate data transmission performance.

For ease of understanding, related terms and technologies in embodiments of this application are first described.

1. Burst

The burst is a periodic burst of a service flow, and may represent a transmission unit of service flow transmission. For example, one burst is a minimum unit of service flow transmission. One burst includes one or more data packets. In most cases, one burst includes a plurality of data packets.

From another perspective, one burst may include one or more files. One file is for one feature, and the feature is related to a type of a service flow. For example, when the type of the service flow is a video, the feature may be content that represents different attributes, such as a scenery, a person, and an animal, in a video frame image. In addition, one file may include one or more data packets.

In embodiments of this application, the burst is periodic, and the burst is periodically monitored during performance parameter monitoring.

In some scenarios, a slice may also be used as a transmission unit of data, each slice may be independently decoded, and one slice includes one or more data packets. For example, one slice may be a part of an area in one frame image.

Therefore, in a first case, one burst may be understood as one slice. In a second case, one slice may be used as a sub-unit of one burst, and one burst includes one or more slices.

A video frame is used as an example. One video frame may be divided into a plurality of slices.

In a first case, "one slice" may be used as a monitoring object to monitor a performance parameter of the slice. Therefore, one burst may be understood as one slice.

In a second case, "one video frame" may be used as a monitoring object to monitor a performance parameter of the video frame. Therefore, one burst may be understood as one video frame.

It should be noted that, in embodiments of this application, the slice may also be referred to as a tile, and the two descriptions may be replaced with each other.

2. Protocol Architecture

A wireless communication protocol architecture includes a control plane protocol architecture and a user plane protocol architecture. In embodiments of this application, unless otherwise specified, the protocol architecture described in embodiments of this application is the user plane protocol architecture.

Figure 2:
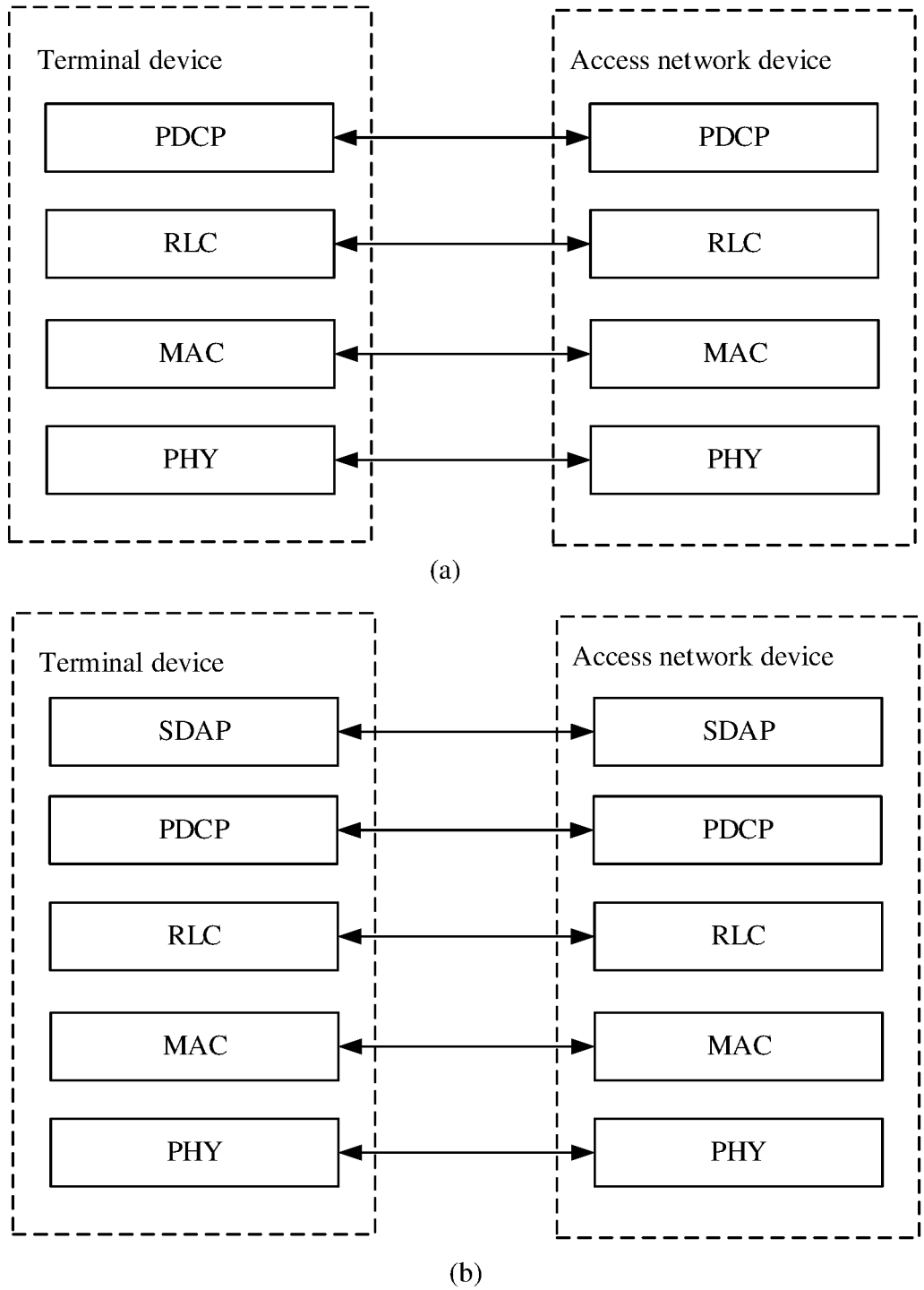
FIG. 2 is an example diagram of two possible protocol architectures according to an embodiment of this application.

FIG. 2 is an example diagram of two possible protocol architectures according to an embodiment of this application. Herein, (a) in FIG. 2 shows a protocol architecture in 4G, and (b) in FIG. 2 shows a protocol architecture in 5G. The terminal device and the access network device each are configured with a protocol architecture.

Refer to (a) in FIG. 2. The protocol architecture sequentially includes a PDCP layer, an RLC layer, a MAC layer, and a PHY from top to bottom.

The PDCP layer is responsible for performing IP header compression to reduce bit traffic that needs to be transmitted over a radio interface.

The RLC layer is responsible for segmentation/concatenation and reassembly of data, retransmission processing, and sequential transmission of upper-layer data.

Data received by an RLC entity from the PDCP layer or data sent to the PDCP layer is referred to as an RLC SDU, and data received by the RLC entity from the MAC layer or data sent to the MAC layer is referred to as an RLC PDU. A size of the RLC PDU is determined by the MAC layer, and a size ratio of the RLC PDU is not necessarily equal to a size of the RLC SDU. Therefore, a transmitting end may need to segment/concatenate the RLC SDU, so that a size of processed data matches a size specified by the MAC layer, and the processed data is sent to the MAC layer in a form of the RLC PDU. Correspondingly, after receiving the RLC PDU, a receiving end needs to reassemble the previously segmented RLC SDU, to restore the original RLC SDU and deliver the RLC SDU to the PDCP layer.

The MAC layer is responsible for logical channel multiplexing controlling, hybrid automatic repeat request (HARQ) hybrid HARQ retransmission, and uplink and downlink scheduling.

The PHY is responsible for processing encoding/decoding, modulation/demodulation, multi-antenna mapping, and other types of physical layer functions.

In a scenario in which the DU and the CU of the access network device are separated, the PHY, the MAC layer, and the RLC layer are configured in the DU, and the PDCP layer is configured in the CU. In addition, in a scenario in which the CU-CP and the CU-UP of the CU are separated, the PDCP layer is configured in the CU-UP.

Refer to (b) in FIG. 2. The protocol architecture sequentially includes a service data adaptation protocol (SDAP) layer, a PDCP layer, an RLC layer, a MAC layer, and a PHY from top to bottom. The SDAP layer is used to process QoS-related information. For descriptions of the other protocol layers, refer to the foregoing descriptions. Details are not described herein again.

In a scenario in which the DU and the CU of the access network device are separated, the PHY, the MAC layer, and the RLC layer are configured in the DU, and the PDCP layer and the SDAP layer are configured in the CU. In addition, in a scenario in which the CU-CP and the CU-UP of the CU are separated, the PDCP layer and the SDAP layer configured in the CU-UP.

The protocol architecture shown in (b) in FIG. 2 is used as an example to describe an uplink transmission process and a downlink transmission process.

In uplink transmission, uplink data is sent from the terminal device to the access network device, and then sent by the access network device to the core network device, for example, sent to the UPF in the core network device.

Specifically, on a terminal device side used as a transmitting end, the uplink data is delivered from an upper layer to a lower layer. After the uplink data arrives at the SDAP layer, the terminal device sequentially delivers the uplink data from the SDAP layer to the PHY from top to bottom. On an access network device side used as a receiving end, the access network device receives the uplink data at the PHY, and sequentially delivers the uplink data from the PHY to the SDAP layer from bottom to top, to complete transmission of the uplink data between the terminal device and the access network device. Finally, the access network device sends the delivered uplink data to the core network device, to complete transmission of the uplink data between the access network device and the core network device. In this way, transmission of the uplink data between the terminal device and the core network device is completed.

In downlink transmission, downlink data is sent from the core network device to the access network device, for example, sent from the UPF in the core network device to the access network device, and then sent by the access network device to the terminal device.

Specifically, the downlink data is sent from the core network device to the access network device, and arrives at the SDAP layer of the access network device, to complete transmission of the downlink data between the core network device and the access network device. On an access network device side used as a transmitting end, the access network device sequentially delivers the downlink data from the SDAP layer to the PHY from top to bottom. On a terminal device side used as a receiving end, the terminal device receives the downlink data at the PHY, and sequentially delivers the downlink data from the PHY to the SDAP layer from bottom to top, to complete transmission of the downlink data between the terminal device and the access network device. In this way, transmission of the downlink data between the terminal device and the core network device is completed.

Embodiments of this application mainly relate to monitoring of two performance parameters. One performance parameter is a delay of a burst, including a delay of transmitting a burst between the terminal device and the access network device and a delay of transmitting a burst between the terminal device and the core network device. The other performance parameter is a burst error rate, and is mainly used to monitor a burst that does not meet a delay requirement in a plurality of bursts in a time period. In embodiments of this application, the foregoing two performance parameters are separately described. Monitoring of the delay of the burst is first described, and monitoring of the burst error rate for the burst is subsequently described.

With reference to FIG. 3 to FIG. 20, the following describes the delay of the burst in detail, including a delay of an uplink burst and a delay of a downlink burst. FIG. 3 to FIG. 11 relate to the delay of the uplink burst, and FIG. 12 to FIG. 20 relate to the delay of the downlink burst.

Uplink Transmission

To facilitate understanding of the delay of the uplink burst, with reference to FIG. 3 to FIG. 6, a process of transmitting the uplink burst from the terminal device to the core network device in four scenarios is described.

In addition, an example in which the protocol architecture in 5G is applied, the UPF is used as the core network device, and one uplink burst includes four data packets is used for description. The four data packets are respectively denoted as a data packet 1, a data packet 2, a data packet 3, and a data packet 4.

It should be noted that, because the SDAP layer and the PHY have no data buffering function, and a delay of data at the SDAP layer and the PHY is very short and may be ignored, the PHY layer is not shown in FIG. 3 to FIG. 6. However, for ease of description of another case, the SDAP layer is shown in the figure.

Figure 3:
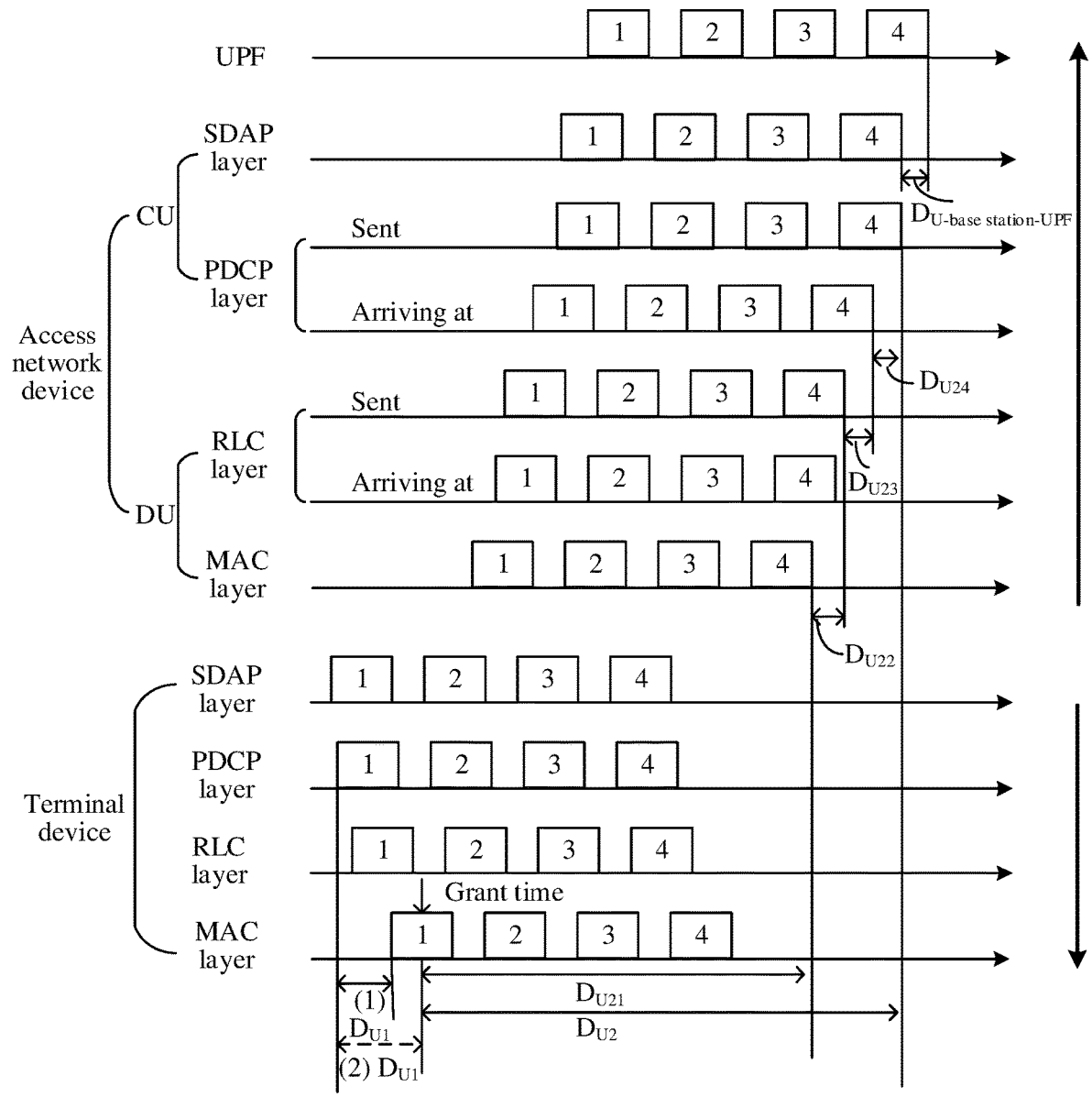
FIG. 3 is a schematic diagram of transmitting an uplink burst in a scenario of sequential delivering at protocol layers according to an embodiment of this application.

FIG. 3 is a schematic diagram of transmitting an uplink burst in a scenario of sequential delivering at protocol layers.

Refer to FIG. 3. The four data packets arrive at the SDAP layer of the terminal device, and the terminal device sequentially delivers the four data packets to the MAC layer of the terminal device from top to bottom. The terminal device sends the four data packets to the access network device, and the four data packets arrive at the MAC layer of the access network device from the MAC layer of the terminal device. The access network device sequentially delivers the four data packets from the MAC layer of the access network device to the SDAP layer of the access network device from bottom to top, and sends the four data packets from the SDAP layer to the UPF.

Figure 4:
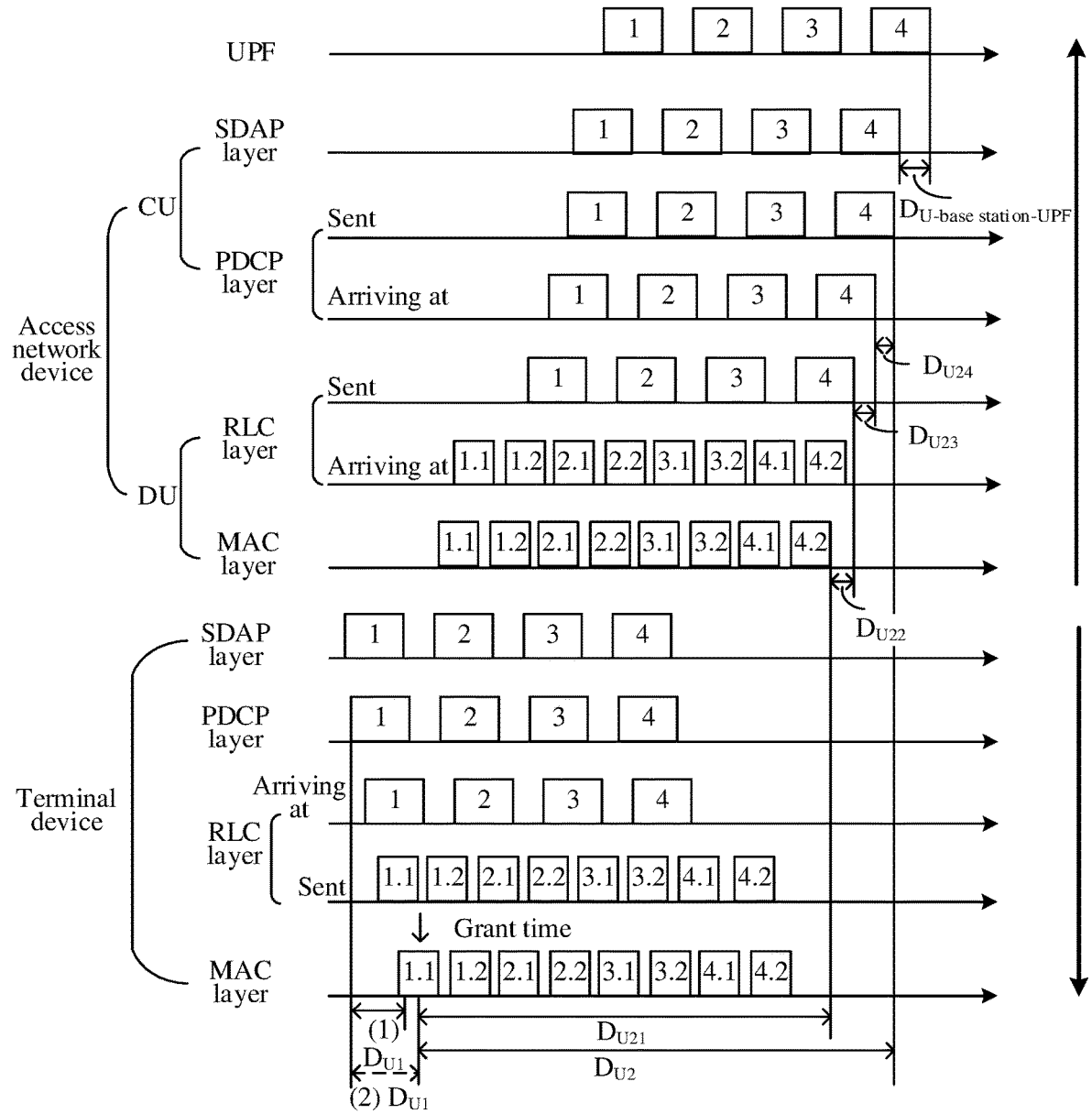
FIG. 4 is a schematic diagram of transmitting an uplink burst in a scenario of segmentation at an RLC layer according to an embodiment of this application.

FIG. 4 is a schematic diagram of transmitting an uplink burst in a scenario of segmentation at an RLC layer. It is assumed that the uplink burst is sequentially delivered at protocol layers.

In this case, refer to FIG. 4. The four data packets arrive at the SDAP layer of the terminal device. After the terminal device sequentially delivers the four data packets to the RLC layer in a form of an RLC SDU from top to bottom, the terminal device segments the data packet of the uplink burst. It is assumed that the terminal device segments each data packet and divides one data packet into two segments. In this case, the four data packets are segmented at the RLC layer to obtain eight data packets, which are denoted as a data packet 1.1, a data packet 1.2, a data packet 2.1, a data packet 2.2, a data packet 3.1, a data packet 3.2, a data packet 4.1, and a data packet 4.2. The eight data packets sequentially arrive at the MAC layer in a form of an RLC PDU. The terminal device sends the eight data packets to the access network device, and the eight data packets arrive at the MAC layer of the access network device from the MAC layer of the terminal device. After the access network device sequentially delivers the eight data packets to the RLC layer of the access network device from bottom to top, the access network device needs to reassemble the previously segmented data packets (that is, RLC SDUs), to restore the previously segmented data packets, that is, restore the eight data packets to the original four data packets. The access network device sends the four data packets from the RLC layer to the SDAP layer of the access network device, and sends the four data packets from the SDAP layer to the UPF.

Figure 5:
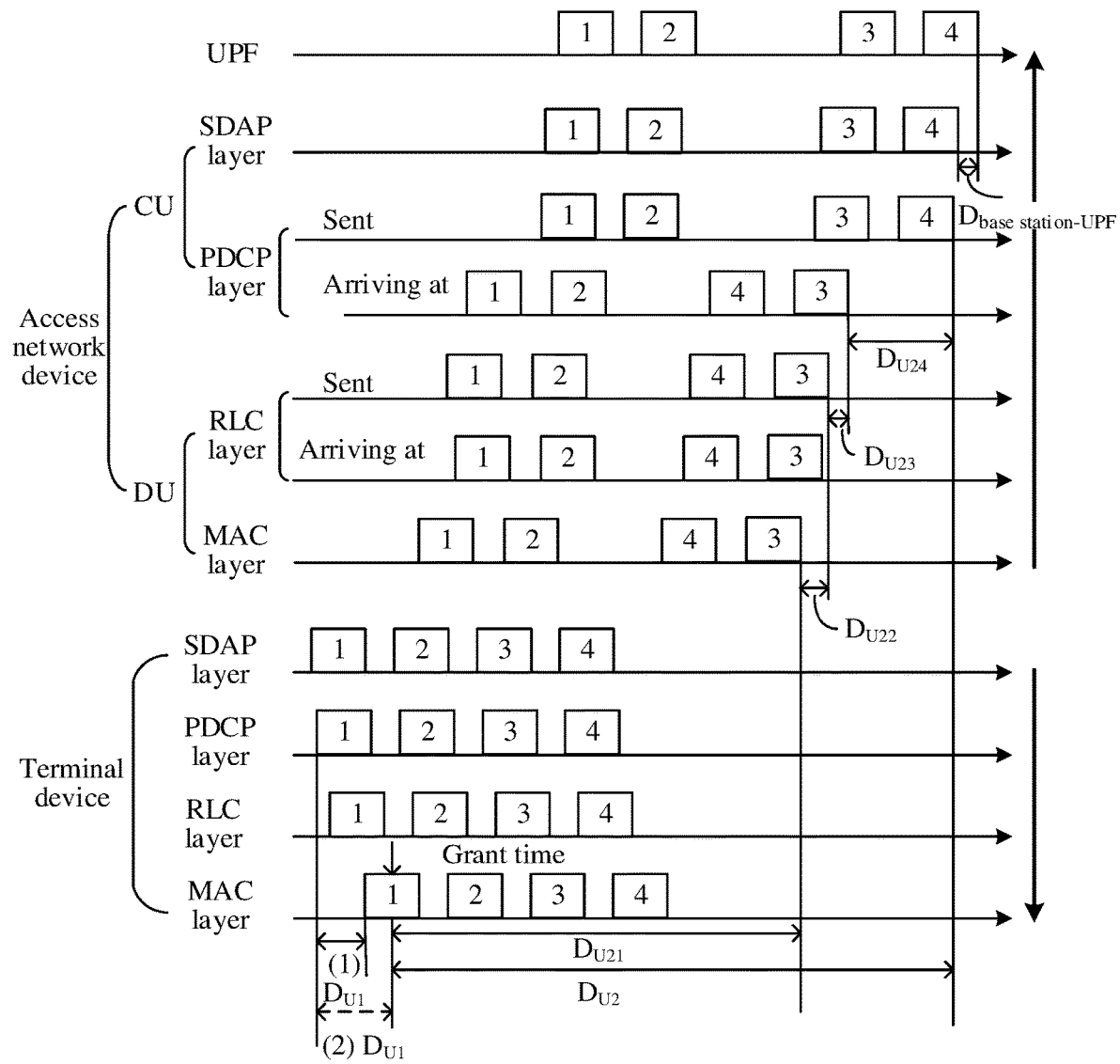
FIG. 5 is a schematic diagram of transmitting an uplink burst in a scenario of out-of-order arrival in an air interface transmission process according to an embodiment of this application.

FIG. 5 is a schematic diagram of transmitting an uplink burst in a scenario of out-of-order arrival in an air interface transmission process.

It should be understood that air interface transmission described in embodiments of this application represents a process in which a transmitting end (for example, the terminal device) sends data from a MAC layer of the transmitting end to a MAC layer of a receiving end (for example, the access network device). The following explanations of air interface transmission are similar.

Refer to FIG. 5. The four data packets arrive at the SDAP layer of the terminal device, and the terminal device sequentially delivers the four data packets to the MAC layer of the terminal device from top to bottom. The terminal device sends the four data packets to the access network device, and the four data packets arrive at the MAC layer of the access network device from the MAC layer of the terminal device. However, in the air interface transmission process, the data packets arrive out of order, that is, the data packet 4 arrives at the MAC layer of the access network device before the data packet 3. Then, the access network device delivers the four data packets to the PDCP layer in a sequence of the data packet 1, the data packet 2, the data packet 4, and the data packet 3. When in-order delivery is configured at the PDCP layer, regardless of a sequence in which the four data packets arrive at the PDCP layer, the access network device sends the four data packets from the PDCP layer to the SDAP layer in an original sequence of the data packet 1, the data packet 2, the data packet 3, and the data packet 4, and sends the four data packets from the SDAP layer to the UPF.

It should be noted that, when out-of-order delivery is configured at the PDCP layer, the access network device sends the four data packets in a time sequence, that is, sends one data packet that arrives at the PDCP layer before another data packet that arrives at the PDCP layer, where the one data packet arrives at the PDCP layer earlier than the another data packet. In the scenario shown in FIG. 5, the terminal device continues to send the four data packets to the SDAP layer in the sequence of the data packet 1, the data packet 2, the data packet 4, and the data packet 3, and sends the four data packets to the UPF from the SDAP layer (not shown in the figure).

Figure 6:
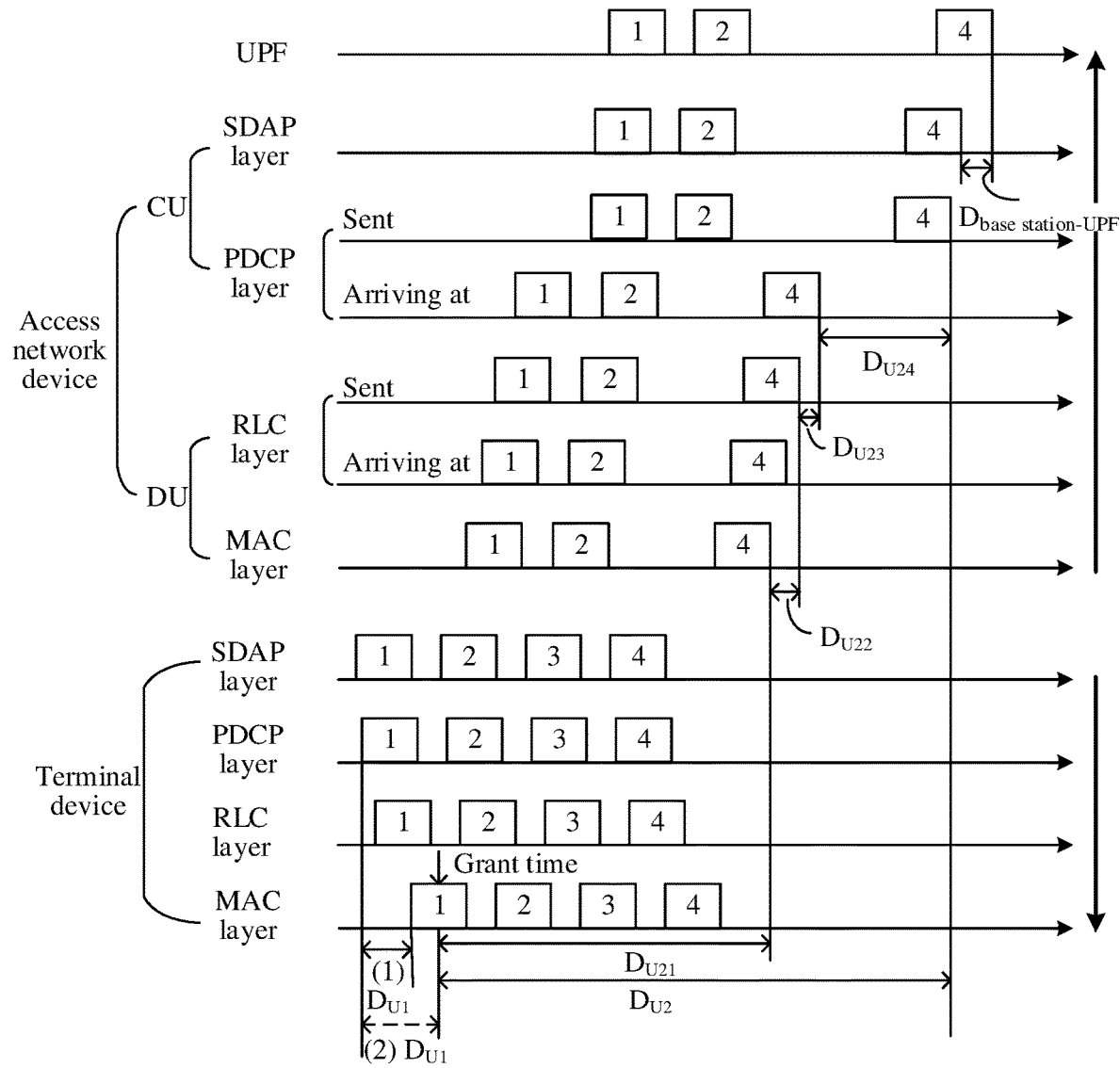
FIG. 6 is a schematic diagram of transmitting an uplink burst in a scenario of packet loss and out-of-order arrival according to an embodiment of this application.

FIG. 6 is a schematic diagram of transmitting an uplink burst in a scenario of packet loss and out-of-order arrival.

Refer to FIG. 3. The four data packets arrive at the SDAP layer of the terminal device, and the terminal device sequentially delivers the four data packets to the MAC layer of the terminal device from top to bottom. The terminal device sends the four data packets to the access network device, and the four data packets arrive at the MAC layer of the access network device from the MAC layer of the terminal device. However, in an air interface transmission process, packet loss and out-of-order arrival occur. To be specific, the data packet 3 does not arrive at the MAC layer of the access network device, and the data packet 4 arrives at the MAC layer of the access network device before a time at which the data packet 3 needs to arrive. The access network device sequentially delivers the remaining three data packets to the PDCP layer from bottom to top. When in-order delivery is configured at the PDCP layer, even if the access network device has received the data packet 4 at the PDCP layer, the access network device delivers the data packet 4 to the SDAP layer only after the access network device does not receive the data packet 3 within preset duration for the data packet 3, and then sends the remaining three data packets from the SDAP layer to the UPF.

In embodiments of this application, an uplink delay of an uplink burst between the terminal device and the access network device is denoted as $D_{U\text{-}UE\text{-}base\ station}$, an uplink delay of an uplink burst between the terminal device and the core network device is denoted as $D_{U\text{-}UE\text{-}UPF}$, and an uplink delay of an uplink burst between the access network device and the core network device is denoted as $D_{U\text{-}base\ station\text{-}UPF}$.

The following describes the foregoing three delays in detail with reference to the scenarios shown in FIG. 3 to FIG. 6.

1. Uplink Delay $D_{U\text{-}UE\text{-}base\ station}$

There are two possible cases (Case 1 and Case 2) of the uplink delay $D_{U\text{-}UE\text{-}base\ station}$ in embodiments of this application. The following describes the uplink delay $D_{U\text{-}UE\text{-}base\ station}$ in different cases.

Case 1

The uplink delay $D_{U\text{-}UE\text{-}base\ station}$ includes an uplink delay $D_{U1}$ and an uplink delay $D_{U2}$.

The uplink delay $D_{U1}$ may be understood as a delay of delivering, by the terminal device, a data packet from an upper layer to a lower layer in an uplink burst, and the uplink delay $D_{U2}$ may be understood as duration from a time at which the terminal device starts to send an uplink burst to a time at which the access network device sends the last data packet in the uplink burst to the core network device.

The following describes the uplink delay $D_{U1}$ and the uplink delay $D_{U2}$ in detail.

Uplink Delay $D_{U1}$

In some embodiments, the uplink delay $D_{U1}$ includes duration from a time $T_{U1.1}$ to a time $T_{U1.2}$, for example, duration corresponding to $D_{U1}$ (1) in FIG. 3 to FIG. 6.

The time $T_{U1.1}$ is an arrival time of the first data packet (for example, the data packet 1 in FIG. 3 to FIG. 6) that arrives at the PDCP layer of the terminal device in the uplink burst.

The time $T_{U1.2}$ is an arrival time of the first data packet (for example, the data packet 1 in FIG. 3, FIG. 5, and FIG. 6, or the data packet 1.1 in FIG. 4) that arrives at the MAC layer of the terminal device in the uplink burst.

In a scenario in which a data packet in an uplink burst is segmented at the RLC layer of the terminal device, if the first data packet that arrives at the MAC layer of the terminal device is divided into a plurality of segments at the RLC layer, the first data packet that arrives at the MAC layer of the terminal device is the first data packet in the plurality of data packet segments. For example, in the scenario shown in FIG. 4, the first data packet that arrives at the MAC layer of the terminal device is the data packet 1.1.

The following explanations of the first data packet that arrives at the MAC layer of the terminal device in the uplink burst are similar. Details are not described below.

In some other embodiments, the uplink delay $D_{U1}$ includes duration from the time $T_{U1.1}$ to a time $T_{U1.3}$, for example, duration corresponding to $D_{U1}$ (2) in FIG. 3 to FIG. 6.

The time $T_{U1.3}$ is a grant time of the first data packet (for example, the data packet 1 in FIG. 3, FIG. 5, and FIG. 6, or the data packet 1.1 in FIG. 4) that arrives at the MAC layer of the terminal device in the uplink burst.

A grant time of a data packet indicates a time at which the data packet is scheduled by the access network device. The time at which the data packet is scheduled may be understood as a time at which the access network device indicates that the data packet is sent from the terminal device to the access network device. For example, when scheduling data, the access network device may send scheduling information to the terminal device. The scheduling information includes the time at which the data packet is scheduled.

It should be understood that, because the SDAP layer has no data buffering function, a delay of data at the SDAP layer is very short and may be ignored.

Uplink Delay $D_{U2}$

The uplink delay $D_{U2}$ includes duration from a time $T_{U1.3}$ to a time $T_{U2.1}$, for example, duration corresponding to $D_{U2}$ in FIG. 3 to FIG. 6.

The time $T_{U1.3}$ is a grant time of the first data packet (for example, the data packet 1 in FIG. 3, FIG. 5, and FIG. 6, or the data packet 1.1 in FIG. 4) that arrives at the MAC layer of the terminal device in the uplink burst. For specific descriptions, refer to the foregoing descriptions. Details are not described again.

The time $T_{U2.1}$ is a sending time of the last data packet (for example, the data packet 4) that is sent from the PDCP layer of the access network device in the uplink burst. In the scenario in which the DU and the CU are separated, the time $T_{U2.1}$ is a sending time of the last data packet (for example, the data packet 4) that is sent from a PDCP layer of the CU in the uplink burst.

It should be understood that a sending time of a data packet that is sent from the PDCP layer of the access network device in embodiments of this application indicates a sending time of a data packet that is sent from the PDCP layer to the SDAP layer in 5G, and indicates a sending time of a data packet that is sent from the PDCP layer to the core network device (for example, the UPF) in 4G.

In the scenario in which the DU and the CU of the access network device are separated, the uplink delay $D_{U2}$ may, for example, include four parts of delays, and the four parts of delays include a delay $D_{U21}$, a delay $D_{U22}$, a delay $D_{U23}$, and a delay $D_{U24}$.

The delay $D_{U21}$ may be understood as an air interface delay of the uplink burst between the terminal device and the access network device, and includes duration from the time $T_{U1.3}$ to a time $T_{U2.2}$, for example, duration corresponding to $D_{U21}$ in FIG. 3 to FIG. 6.

The time $T_{U2.2}$ is an arrival time of the last data packet (for example, the data packet 1 in FIG. 3, the data packet 4.2 in FIG. 4, the data packet 3 in FIG. 5, or the data packet 4 in FIG. 4) that arrives at a MAC layer of the DU in the uplink burst.

In a scenario in which a data packet in an uplink burst is segmented at the RLC layer of the terminal device, if a complete data packet is segmented at the RLC layer of the terminal device, and a data packet segment of the complete data packet finally arrives at the MAC layer of the access network device, the last data packet that arrives at the MAC layer of the access network device in the uplink burst in embodiments of this application is a data packet segment of the complete data packet. For example, in the scenario shown in FIG. 4, the last data packet that arrives at the MAC layer of the access network device is the data packet 4.2.

The delay $D_{U22}$ may be understood as a delay of processing a data packet by the DU, and includes duration from the time $T_{U2.2}$ to a time $T_{U2.3}$, for example, duration corresponding to $D_{U22}$ in FIG. 3 to FIG. 6.

In an example, the time $T_{U2.3}$ is a sending time of the last data packet (for example, the data packet 4 in FIG. 3, FIG. 4, or FIG. 6, or the data packet 3 in FIG. 5) that is sent from an RLC layer of the DU in the uplink burst.

In another example, the time $T_{U2.3}$ may be a sending time of the last data packet that is sent from a general packet radio system tunneling protocol ((general packet radio system, GPRS) tunneling protocol, GTP) tunnel egress of an F1-U interface of the DU in the uplink burst.

It should be understood that, in a scenario in which a data packet in an uplink burst is segmented at the RLC layer of the terminal device, after the uplink burst arrives at the RLC layer of the access network device, the RLC layer receives and reassembles the previously segmented data packet (that is, an RLC SDU), to restore the original data packet (that is, the RLC SDU), and delivers the restored complete data packet to the PDCP layer. Therefore, regardless of whether the data packet in the uplink burst is segmented, the last data packet that is sent from the RLC layer of the access network device in the uplink burst is the restored data packet. As shown in FIG. 4, the access network device reassembles the data packet 4.1 and the data packet 4.2 into the data packet 4 at the RLC layer, and then delivers the data packet 4 to the PDCP layer.

The delay $D_{U23}$ may be understood as a delay of transmitting a data packet between the DU and the CU, and includes duration from the time $T_{U2.3}$ to a time $T_{U2.4}$, for example, duration corresponding to $D_{U23}$ in FIG. 3 to FIG. 6.

In an example, the time $T_{U2.4}$ is an arrival time of the last data packet (for example, the data packet 4 in FIG. 3, FIG. 4, or FIG. 6, or the data packet 3 in FIG. 5) that arrives at the PDCP layer of the CU in the uplink burst.

In another example, the time $T_{U2.4}$ may be an arrival time of the last data packet that arrives at a tunnel ingress of an F1-U interface of the CU in the uplink burst.

The delay $D_{U24}$ may be understood as a delay of processing a data packet by the CU, and includes duration from the time $T_{U2.4}$ to the time $T_{U2.1}$, for example, duration corresponding to $D_{U24}$ in FIG. 3 to FIG. 6.

Case 2

The uplink delay $D_{U\text{-}UE\text{-}base\ station}$ includes an uplink delay $D_{U2}$, and does not relate to a delay of delivering an uplink burst at protocol layers of the terminal device. For specific descriptions of the uplink delay $D_{U2}$, refer to the foregoing related descriptions in Case 1. Details are not described again.

2. Uplink Delay $D_{U\text{-}base\ station\text{-}UPF}$

The uplink delay $D_{U\text{-}base\ station\text{-}UPF}$ is a delay of the last data packet (for example, the data packet 4 in FIG. 3 to FIG. 6) that is sent from the access network device in an uplink burst between the access network device and the core network device. It should be understood that the uplink delay $D_{U\text{-}base\ station\text{-}UP}$ is a delay at a granularity of a data packet.

In some embodiments, the uplink delay $D_{U\text{-}base\ station\text{-}UPF}$ includes duration from a time $T_{U2.6}$ to a time $T_{U3}$.

The time $T_{U2.6}$ is a sending time of the last data packet that is sent from the access network device in the uplink burst.

In an example, the time $T_{U2.6}$ may be a sending time of the last data packet that is sent from a GTP tunnel egress of an interface (for example, an N3 interface) between the access network device and the core network device in the uplink burst.

In another example, the time $T_{U2.6}$ may be a sending time of the last data packet that is sent from the SDAP layer of the access network device in the uplink burst. It should be understood that a sending time indicates a sending time at which a data packet is sent from the SDAP layer of the access network device to the core network device. For example, the time $T_{U2.6}$ shown in FIG. 3 to FIG. 6 is a sending time of the data packet 4 that is sent from the SDAP layer.

Because a time of data at the SDAP layer is very short and may be ignored, the time $T_{U2.6}$ may be any one of the following:

In an example, the time $T_{U2.6}$ may be a sending time of the last data packet that is sent from the PDCP layer of the access network device in the uplink burst.

In 4G, the time $T_{U2.6}$ is a sending time of the last data packet that is sent from the PDCP layer of the access network device in the uplink burst.

The time $T_{U3}$ may be an arrival time of the last data packet (for example, the data packet 4) that arrives at the core network device in the uplink burst.

In an example, the time $T_{U3}$ may be an arrival time of the last data packet that arrives at the GTP tunnel ingress of the interface (for example, the N3 interface) between the core network device and the access network device in the uplink burst.

3. Uplink Delay $D_{U-UE-UPF}$

The uplink delay $D_{U-UE-UPF}$ indicates a delay of an uplink burst between the terminal device and the core network device, and includes an uplink delay $D_{U-UE-base\ station}$ and an uplink delay $D_{U-base\ station-UPF}$. For specific descriptions of the uplink delay $D_{U-base\ station}$ and the uplink delay $D_{U-base\ station-UPF}$, refer to the foregoing related descriptions. Details are not described again.

With reference to FIG. 7 to FIG. 11, the following describes in detail a burst monitoring method in downlink transmission in embodiments of this application by using the foregoing defined delay of the uplink burst.

Figure 7:
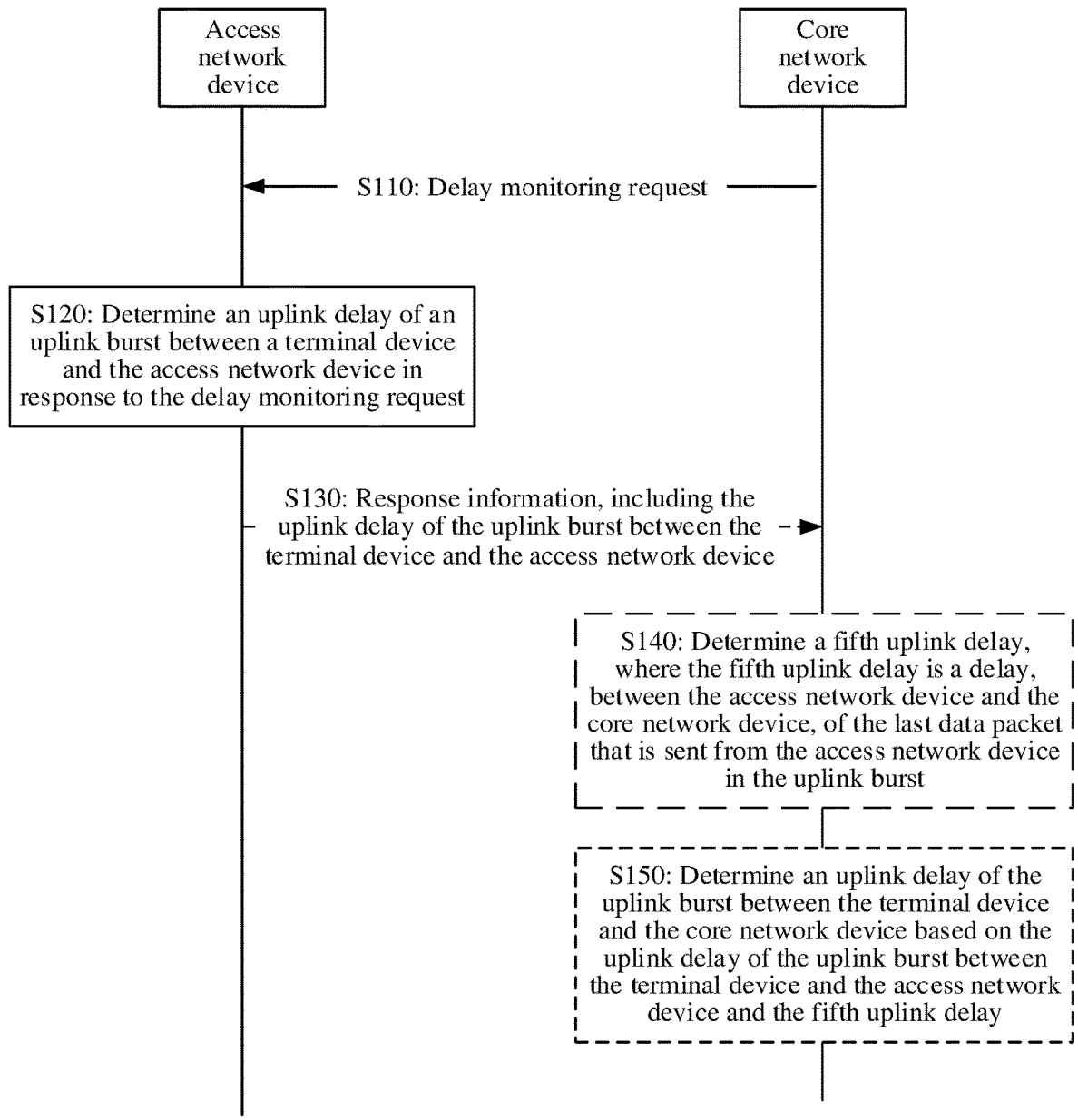
FIG. 7 is a schematic flowchart of a burst monitoring method 100 in uplink transmission according to an embodiment of this application.

FIG. 7 is a schematic flowchart of a burst monitoring method 100 in uplink transmission according to an embodiment of this application.

In S110, a core network device sends a delay monitoring request to an access network device, where the delay monitoring request indicates to perform delay monitoring on a periodic burst.

In this embodiment of this application, the uplink burst is periodic, and the delay monitoring request indicates to perform delay monitoring on an uplink burst in each of one or more periods, to determine a transmission delay of the periodic uplink burst between a terminal device and the access network device.

It should be understood that the delay monitoring request indicates to report the transmission delay of the periodic uplink burst between the terminal device and the access network device.

The delay monitoring request may be independent information, or may be content carried in other information. This is not limited in this embodiment of this application.

For example, the delay monitoring request may be carried in a field in downlink (DL) protocol data unit (PDU) session information.

In S120, the access network device determines an uplink delay of the uplink burst between the terminal device and the access network device in response to the delay monitoring request, where the uplink delay of the uplink burst between the terminal device and the access network device includes a first uplink delay, the first uplink delay includes duration from a first time to a second time, the first time is a grant time of the first data packet that arrives at a media access control MAC layer of the terminal device in the uplink burst, and the second time is a sending time of the last data packet that is sent from a packet data convergence protocol PDCP layer of the access network device in the uplink burst.

In other words, the access network device receives the delay monitoring request, and determines the uplink delay of the uplink burst between the terminal device and the access network device. The access network device may alternatively start the delay monitoring according to a configuration policy of a network management system, for example, an operation, administration, and maintenance (OAM) system, or according to a locally stored configuration policy of the access network device (for example, a factory configuration of a device, where the factory configuration may be upgraded). Therefore, S110 is optional. Correspondingly, in S120, the access network device determines the uplink delay according to the configuration policy of the network management system or the locally stored configuration policy.

In this embodiment, the first time may be understood as a start time of the uplink burst between the terminal device and the access network device, and the second time may be understood as an end time of the uplink burst between the terminal device and the access network device.

The uplink delay of the uplink burst between the terminal device and the access network device is the foregoing uplink delay $D_{U-UE-base\ station}$, the first uplink delay is the foregoing delay $D_{U2}$, the first time is the foregoing time $T_{U1.3}$, and the second time is the foregoing time $T_{U2.1}$. For specific descriptions of the uplink delay $D_{U-UE-base\ station}$, the delay $D_{U2}$, the time $T_{U1.3}$, and the time $T_{U2.1}$, refer to the foregoing related descriptions. Details are not described again.

In some embodiments, the terminal device may determine, based on a burst number of the uplink burst, the first data packet that arrives at the MAC layer of the terminal device in the uplink burst.

For example, the terminal device may determine, based on a change of the burst number of the uplink burst, the first data packet that arrives at the MAC layer of the terminal device in the uplink burst. For example, the MAC layer of the terminal device first receives a data packet in an uplink burst whose burst number is 1, and subsequently receives a data packet in an uplink burst whose burst number is 2. Because the burst number has changed from 1 to 2, it means that the uplink burst whose burst number is 1 has been received. In this case, the first data packet that is in the uplink burst whose burst number is 2 and that is received from the MAC layer of the terminal device is the first data packet that arrives at the MAC layer of the terminal device.

In some other embodiments, the terminal device may determine, based on a periodicity of the uplink burst, the first data packet that arrives at the MAC layer of the terminal device in the uplink burst.

For example, the terminal device may start monitoring from a start time of the periodicity, and the first data packet that is received from the MAC layer of the terminal device in the periodicity is the first data packet in the uplink burst transmitted in the periodicity.

In some embodiments, the access network device may determine, based on a periodicity of the uplink burst, the last data packet that is sent from the PDCP layer of the access network device in the uplink burst.

For example, the access network device may start monitoring from a start time of the periodicity, and the last data packet that is sent from the PDCP layer in the periodicity is the last data packet that is sent from the PDCP layer of the access network device in the uplink burst transmitted in the periodicity.

According to the burst monitoring method provided in this embodiment of this application, a method for monitoring a delay of an uplink burst is provided. An access network device determines an uplink delay based on a delay monitoring request sent by a core network device for the uplink burst. The uplink delay includes a first uplink delay from a first time to a second time, the first time is a grant time of the first data packet that arrives at a MAC layer of a terminal device in the uplink burst, and the second time is a sending time of the last data packet that is sent from a PDCP layer of the access network device in the uplink burst. In this way, a process in which the access network device monitors the uplink delay of the uplink burst between the terminal device and the access network device is implemented, so that the access network device can more accurately evaluate data transmission performance based on the uplink delay of the uplink burst, thereby improving user experience.

In some embodiments, the uplink delay of the uplink burst between the terminal device and the access network device further includes a fourth uplink delay, the fourth uplink delay includes duration from a fourth time to a fifth time, or the fourth uplink delay includes duration from a fourth time to the first time, the fourth time is an arrival time of the first data packet that arrives at a PDCP layer of the terminal device in the uplink burst, and the fifth time is an arrival time of the first data packet that arrives at the MAC layer of the terminal device in the uplink burst.

In this embodiment, the fourth time may be understood as a start time of the uplink burst between the terminal device and the access network device.

The fourth uplink delay is the foregoing uplink delay $D_{U1}$, the fourth time is the foregoing time $T_{U1.1}$, the fifth time is the foregoing time $T_{U1.2}$, and the first time is the foregoing time $T_{U1.3}$. For specific descriptions of the uplink delay $D_{U1}$, the time $T_{U1.1}$, the time $T_{U1.2}$, and the time $T_{U1.3}$, refer to the foregoing related descriptions. Details are not described again.

In some embodiments, the terminal device may collect statistics on fourth uplink delays of a plurality of uplink bursts, to obtain an average value of the plurality of fourth uplink delays, and may use the average value as the fourth uplink delay of the uplink burst. Periodicity lengths of the plurality of uplink bursts are the same.

In some embodiments, the terminal device may determine, based on a burst number of the uplink burst, the first data packet that arrives at the PDCP layer of the terminal device in the uplink burst. For specific descriptions, refer to the foregoing related descriptions of determining, by the terminal device based on the burst number of the uplink burst, the first data packet that arrives at the MAC layer of the terminal device in the uplink burst. Details are not described again.

In some other embodiments, the terminal device may determine, based on a periodicity of the uplink burst, the first data packet that arrives at the PDCP layer of the terminal device in the uplink burst. For specific descriptions, refer to the foregoing related descriptions of determining, by the terminal device based on the periodicity of the uplink burst, the first data packet that arrives at the MAC layer of the terminal device in the uplink burst. Details are not described again.

In some embodiments, the terminal device sends a fourth uplink delay to the access network device.

The access network device receives the fourth uplink delay.

The access network device determines the first uplink delay, and determines the uplink delay of the uplink burst between the terminal device and the access network device based on the fourth uplink delay and the first uplink delay.

The uplink delay of the uplink burst between the terminal device and the access network device includes the first uplink delay and the fourth uplink delay. Simply speaking, the access network device adds the two delays to obtain the uplink delay of the uplink burst between the terminal device and the access network device.

According to the burst monitoring method provided in this embodiment of this application, the uplink delay of the uplink burst between the terminal device and the access network device further includes a delay of the uplink burst that is delivered at protocol layers of the terminal device, so that the uplink delay of the uplink burst can be more accurately monitored. Therefore, data transmission performance can be more accurately evaluated based on the uplink delay of the uplink burst, thereby further improving user experience.

This embodiment of this application provides two uplink delay monitoring methods (denoted as a manner 1 and a manner 2). Manner 1 is mainly used to obtain the uplink delay of the uplink burst between the terminal device and the access network device through statistics collection performed by segment, to obtain the uplink delay of the uplink burst between the terminal device and the access network device. This manner is applicable to a scenario in which a DU and a CU of the access network device are separated. Manner 2 is mainly used to determine the uplink delay of the uplink burst between the terminal device and the access network device based on the first time and the second time of the uplink burst. Manner 2 is not limited to the scenario in which the DU and the CU are separated, and may also be applied to a scenario in which the DU and the CU are not separated.

The following separately describes in detail, based on Manner 1 and Manner 2, a method for monitoring an uplink delay of an uplink burst.

Manner 1

In some embodiments, the access network device mainly collects statistics on two delays by segment, that is, a second uplink delay and a third uplink delay.

That is, the first uplink delay includes the second uplink delay and the third uplink delay, the second uplink delay includes duration from the first time to a third time, the third uplink delay includes duration from the third time to the second time, and the third time is a sending time of the last data packet that is sent from an RLC layer of the access network device to the PDCP layer of the access network device in the uplink burst.

The first time is an arrival time of the first data packet that arrives at the MAC layer of the terminal device in the uplink burst, that is, the foregoing time $T_{U1.3}$. The second time is the sending time of the last data packet that is sent from the PDCP layer of the access network device in the uplink burst, that is, the foregoing time $T_{U2.1}$. The fifth time is the foregoing time $T_{U2.3}$. For specific descriptions of each time, refer to the foregoing related descriptions. Details are not described again.

In the scenario in which the DU and the CU are separated, specifically, the second time is a sending time of the last data packet that is sent from a PDCP layer of the DU in the uplink burst, and the third time is a sending time of the last data packet that is sent from an RLC layer of the CU to the PDCP layer of the DU in the uplink burst.

The second uplink delay includes the foregoing delay $D_{U21}$ and the foregoing delay $D_{U22}$, and the third uplink delay includes the foregoing delay $D_{U23}$ and the foregoing delay $D_{U24}$. For specific descriptions of each delay, refer to the foregoing related descriptions. Details are not described again.

In some embodiments, the access network device may determine, based on a periodicity of the uplink burst, the last data packet that is sent from the RLC layer to the PDCP layer of the access network device in the uplink burst. For specific descriptions, refer to the foregoing related descriptions of determining, by the access network device based on the periodicity of the uplink burst, the last data packet that is sent from the PDCP layer of the access network device in the uplink burst. Details are not described again.

In a first case, the uplink delay of the uplink burst between the terminal device and the access network device includes the first uplink delay and the fourth uplink delay.

Based on this, in some embodiments, that the access network device determines an uplink delay of the uplink burst between the terminal device and the access network device in response to the delay monitoring request includes:

The access network device determines the second uplink delay and the third uplink delay in response to the delay monitoring request.

The access network device determines the fourth uplink delay.

The access network device determines the uplink delay of the uplink burst between the terminal device and the access network device based on the second uplink delay, the third uplink delay, and the fourth uplink delay.

In an example, the access network device receives the fourth uplink delay sent by the terminal device, to determine the fourth uplink delay. The fourth downlink delay is the foregoing downlink delay $D_{U1}$. For specific descriptions, refer to the foregoing related descriptions. Details are not described again.

In some embodiments, in the scenario in which the DU and the CU are separated, the method for monitoring an uplink delay of an uplink burst may be as follows:

The DU determines the second uplink delay in response to the delay monitoring request.

The DU sends the second uplink delay to the CU.

The CU determines the fourth uplink delay.

The CU determines the third uplink delay in response to the delay monitoring request.

The CU determines the uplink delay of the uplink burst between the terminal device and the access network device based on the second uplink delay, the third uplink delay, and the fourth uplink delay.

In an example, the terminal device sends the fourth uplink delay to the CU, so that the CU determines the fourth uplink delay.

In an example, the DU may determine the second uplink delay based on the first time and the third time, that is, the DU first determines the first time and the third time, and then determines the second uplink delay.

In another example, the DU may determine the second uplink delay based on the delay $D_{U21}$ and the delay $D_{U22}$, that is, the DU first determines the delay $D_{U21}$ and the delay $D_{U22}$, and then determines the second uplink delay.

In an example, the CU may determine the third uplink delay based on the third time and the second time, that is, the CU first determines the third time and the first time, and then determines the third uplink delay.

In another example, the CU may determine the third uplink delay based on the delay $D_{U23}$ and the delay $D_{U24}$, that is, the DU first determines the delay $D_{U23}$ and the delay $D_{U24}$, and then determines the third uplink delay.

In a scenario in which a CU-UP and a CU-CP of the CU are separated, for example, the CU-UP determines the third uplink delay, and determines the uplink delay of the uplink burst between the terminal device and the access network device based on the second uplink delay, the third uplink delay, and the fourth uplink delay.

According to the burst monitoring method provided in this embodiment of this application, the scenario in which the DU and the CU of the access network device are separated is supported. The DU reports a second uplink delay of an uplink burst between the DU and the terminal device to the CU, and the CU determines the uplink delay of the uplink burst between the terminal device and the access network device based on the second uplink delay, a third uplink delay that is determined by the CU and that is generated because the uplink burst is transmitted between the CU and the DU and the CU processes the uplink burst, and a fourth uplink delay of the uplink burst that is obtained by the CU and that is generated because data is delivered on the terminal device. That is, the DU and the CU collect statistics on delays related to the DU and the CU by segment, so that the uplink delay of the uplink burst can be monitored in the scenario in which the DU and the CU are separated.

In a second case, the uplink delay of the uplink burst between the terminal device and the access network device includes the first uplink delay, but does not include the fourth uplink delay.

Based on this, in some embodiments, that the access network device determines an uplink delay of the uplink burst between the terminal device and the access network device in response to the delay monitoring request includes:

The access network device determines the second uplink delay and the third uplink delay in response to the delay monitoring request.

The access network device determines the uplink delay of the uplink burst between the terminal device and the access network device based on the second uplink delay and the third uplink delay.

In some embodiments, in the scenario in which the DU and the CU are separated, the method for monitoring an uplink delay of an uplink burst may be as follows:

The DU determines the second uplink delay in response to the delay monitoring request.

The DU sends the second uplink delay to the CU.

The CU determines the third uplink delay in response to the delay monitoring request.

The CU determines the uplink delay of the uplink burst between the terminal device and the access network device based on the third uplink delay and the fourth uplink delay.

In a scenario in which a CU-UP and a CU-CP of the CU are separated, for example, the CU-UP determines the third uplink delay, and determines the uplink delay of the uplink burst between the terminal device and the access network device based on the second uplink delay and the third uplink delay.

According to the burst monitoring method provided in this embodiment of this application, the scenario in which the DU and the CU of the access network device are separated is supported. The DU reports a second uplink delay of an uplink burst between the DU and the terminal device to the CU, and the CU determines the uplink delay of the uplink burst between the terminal device and the access network device based on the second uplink delay and a third uplink delay that is determined by the CU and that is generated because the uplink burst is transmitted between the CU and the DU and the CU processes the uplink burst. That is, the DU and the CU collect statistics on delays related to the DU and the CU by segment, so that the uplink delay of the uplink burst can be monitored in the scenario in which the DU and the CU are separated.

Manner 2

In a first case, the uplink delay of the uplink burst between the terminal device and the access network device includes the first uplink delay and the fourth uplink delay.

Based on this, in some embodiments, that the access network device determines an uplink delay of the uplink burst between the terminal device and the access network device in response to the delay monitoring request includes:

The access network device determines the first time and the second time in response to the delay monitoring request.

The access network device determines the fourth uplink delay.

The access network device determines the uplink delay of the uplink burst between the terminal device and the access network device based on the fourth uplink delay, the first time, and the second time.

In this embodiment, the first time is an arrival time of the first data packet that arrives at the MAC layer of the terminal device in the uplink burst, that is, the foregoing time $T_{U1.3}$. The second time is the sending time of the last data packet that is sent from the PDCP layer of the access network device in the uplink burst. In the scenario in which the DU and the CU are separated, the second time is a sending time of the last data packet that is sent from a PDCP layer of the DU in the uplink burst, that is, the foregoing time $T_{U2.1}$. For specific descriptions of each time, refer to the foregoing related descriptions. Details are not described again. The duration from the first time to the second time is the first uplink delay in this embodiment of this application.

When the access network device schedules data, the access network device allocates an uplink grant (UL grant) to the terminal device. The UL grant carries a grant time of a data packet, and the terminal device sends the data packet by using the UL grant. Even if the access network device receives the data packet only through retransmission scheduling, the access network device may still obtain the grant time of the data packet based on a time of the UL grant for initial transmission of the data packet.

Therefore, in an example, the access network device may determine a grant time of the first data packet in the uplink burst based on a UL grant.

In some embodiments, in the scenario in which the DU and the CU are separated, that the access network device determines an uplink delay of the uplink burst between the terminal device and the access network device in response to the delay monitoring request includes:

The DU determines the first time in response to the delay monitoring request.

The DU sends the first time to the CU.

The CU determines the fourth uplink delay.

The CU determines the second time in response to the delay monitoring request.

The CU determines the uplink delay of the uplink burst between the terminal device and the access network device based on the fourth uplink delay, the first time, and the second time.

In an example, the terminal device sends the fourth uplink delay to the CU, so that the CU determines the fourth uplink delay.

In a scenario in which a CU-UP and a CU-CP of the CU are separated, for example, the CU-UP determines the uplink delay of the uplink burst between the terminal device and the access network device based on the fourth uplink delay, the first time, and the second time.

According to the burst monitoring method provided in this embodiment of this application, the scenario in which the DU and the CU of the access network device are separated is supported. The DU reports, to the CU, the first time (that is, a start time) for transmitting the uplink burst on an air interface, and the CU determines the uplink delay of the uplink burst between the terminal device and the access network device based on the first time, the second time (that is, an end time) of the uplink burst that is determined by the CU and that is on the CU, and the fourth uplink delay of the uplink burst that is obtained by the CU and that is generated because data is delivered on the terminal device. In this way, a process of monitoring the uplink delay of the uplink burst in the scenario in which the DU and the CU are separated can be implemented. In addition, compared with a manner in which the DU and the CU collect statistics on delays by segment, this method can obtain a more accurate uplink delay of the uplink burst.

In a second case, the uplink delay of the uplink burst between the terminal device and the access network device includes the first uplink delay, but does not include the fourth uplink delay.

Based on this, in some embodiments, that the access network device determines an uplink delay of the uplink burst between the terminal device and the access network device in response to the delay monitoring request includes:

The access network device determines the first time and the second time in response to the delay monitoring request.

The access network device determines the uplink delay of the uplink burst between the terminal device and the access network device based on the first time and the second time.

In some embodiments, in the scenario in which the DU and the CU are separated, that the access network device determines an uplink delay of the uplink burst between the terminal device and the access network device in response to the delay monitoring request includes:

The DU determines the first time in response to the delay monitoring request.

The DU sends the first time to the CU.

The CU determines the second time.

The CU determines the uplink delay of the uplink burst between the terminal device and the access network device based on the first time and the second time.

In a scenario in which a CU-UP and a CU-CP of the CU are separated, for example, the CU-UP determines the second time, and determines the uplink delay of the uplink burst between the terminal device and the access network device based on the second time and the received first time.

According to the burst monitoring method provided in this embodiment of this application, the scenario in which the DU and the CU of the access network device are separated is supported. The DU reports, to the CU, the first time (that is, a start time) for transmitting the uplink burst on an air interface, and the CU determines the uplink delay of the uplink burst between the terminal device and the access network device based on the first time and the second time (that is, an end time) of the uplink burst that is determined by the CU and that is on the CU. In this way, the uplink delay of the uplink burst can be monitored in the scenario in which the DU and the CU are separated. In addition, compared with a manner in which the DU and the CU collect statistics on delays by segment, this method can obtain a more accurate uplink delay of the uplink burst.

In some embodiments, an uplink delay of the uplink burst between the terminal device and the core network device may be further determined based on the obtained uplink delay of the uplink burst between the terminal device and the access network device. Based on this, the burst monitoring method 100 in uplink transmission in this embodiment of this application further includes steps S130, S140, and S150.

In S130, the access network device sends response information to the core network device, where the response information is information for responding to the delay monitoring request, and the response information includes the uplink delay of the uplink burst between the terminal device and the access network device. Correspondingly, the core network device receives the response information.

The response information may be independent information, or may be content carried in other information. This is not limited in this embodiment of this application.

For example, the response information may be a field carried in uplink (UL) PDU SESSION INFORMATION.

In S140, the core network device determines a fifth uplink delay, between the access network device and the core network device, of the last data packet that is sent from the PDCP layer of the access network device in the uplink burst.

The fifth uplink delay is the foregoing uplink delay $D_{U\text{-base station-}UPF}$. For specific descriptions of the uplink delay $D_{U\text{-base station-}UPF}$, refer to the foregoing related descriptions. Details are not described again.

In an example, the access network device may determine the fifth uplink delay based on the sending time (that is, the second time) of the last data packet that is sent from the PDCP layer of the access network device in the uplink burst and an arrival time of the last data packet that arrives at the core network device.

It should be understood that the last data packet that is sent from the PDCP layer of the access network device in the uplink burst and the last data packet that arrives at the core network device in the uplink burst are a same data packet, and the fifth uplink delay indicates a delay of one data packet. Therefore, the fifth uplink delay may alternatively be determined based on an average value of transmissions of a plurality of data packets (not limited to uplink data packets or downlink data packets) between the access network device and the core network device, or the fifth uplink delay may alternatively be obtained based on a transmission delay of any data packet between the access network device and the core network device.

In S150, the core network device determines an uplink delay of the uplink burst between the terminal device and the core network device based on the fifth uplink delay and the uplink delay of the uplink burst between the terminal device and the access network device.

The uplink delay of the uplink burst between the terminal device and the core network device includes the fifth uplink delay and the uplink delay of the uplink burst between the terminal device and the access network device. Simply speaking, the core network device adds the two delays to obtain the uplink delay of the uplink burst between the terminal device and the core network device.

The uplink delay of the uplink burst between the terminal device and the core network device is the foregoing uplink delay $D_{U\text{-}UE\text{-}UPF}$. For specific descriptions, refer to the foregoing related descriptions. Details are not described again.

According to the burst monitoring method provided in this embodiment of this application, a method for monitoring a delay of an uplink burst is provided. A core network device receives an uplink delay of an uplink burst that is between a terminal device and an access network device and that is sent by the access network device, and finally determines an uplink delay of the uplink burst between the terminal device and the core network device based on the uplink delay and a fifth uplink delay of the uplink burst that is between the access network device and the core network device and that is determined by the core network device. In this way, a process of monitoring the uplink delay of the uplink burst between the terminal device and the core network device is implemented, so that the core network device can more accurately evaluate data transmission performance based on the uplink delay of the uplink burst, thereby improving user experience.

Figure 8:
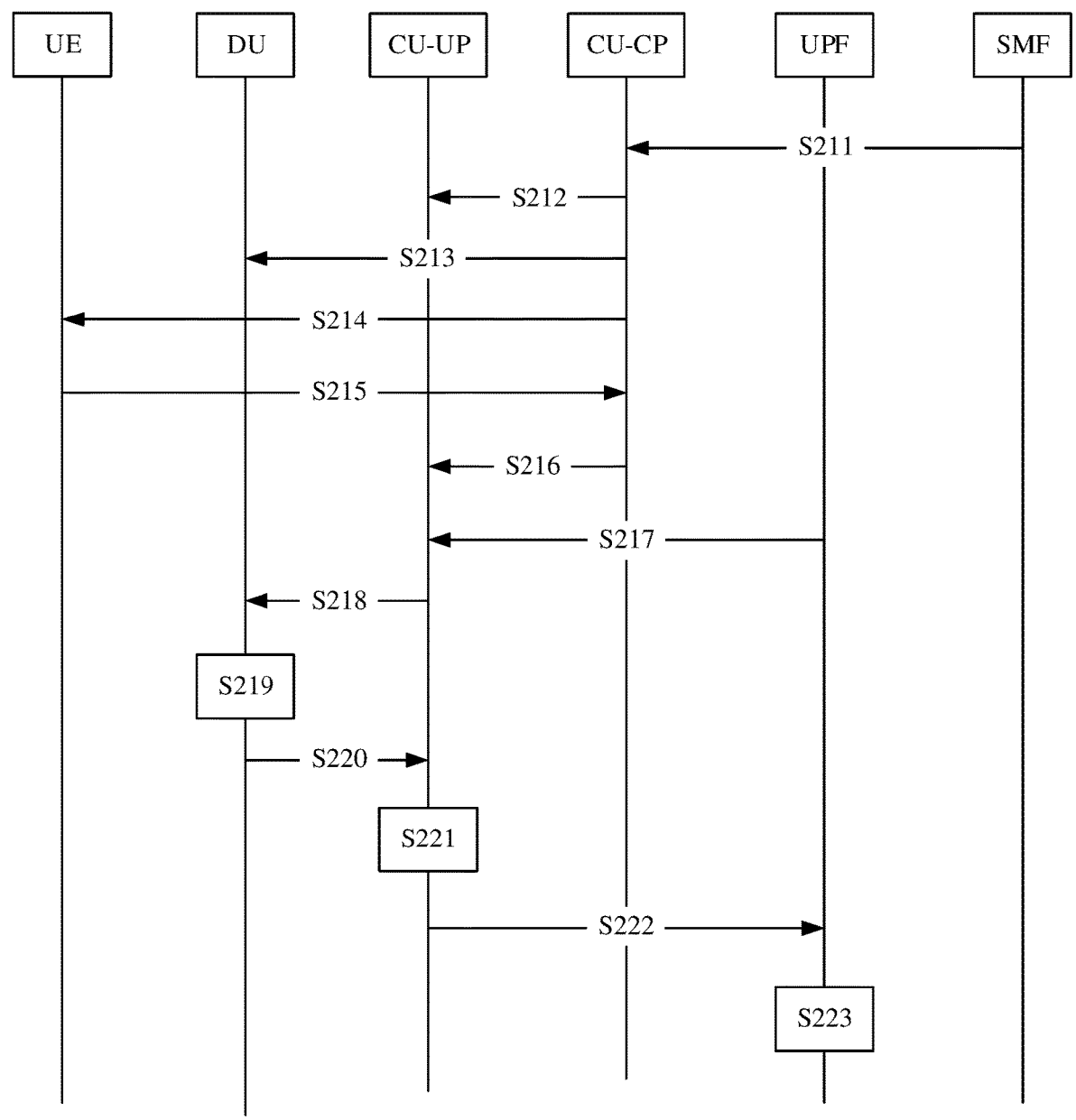
FIG. 8 is a schematic flowchart of a burst monitoring method 200 in uplink transmission in a scenario in which a DU and a CU of an access network device are separated according to an embodiment of this application.
Figure 9:
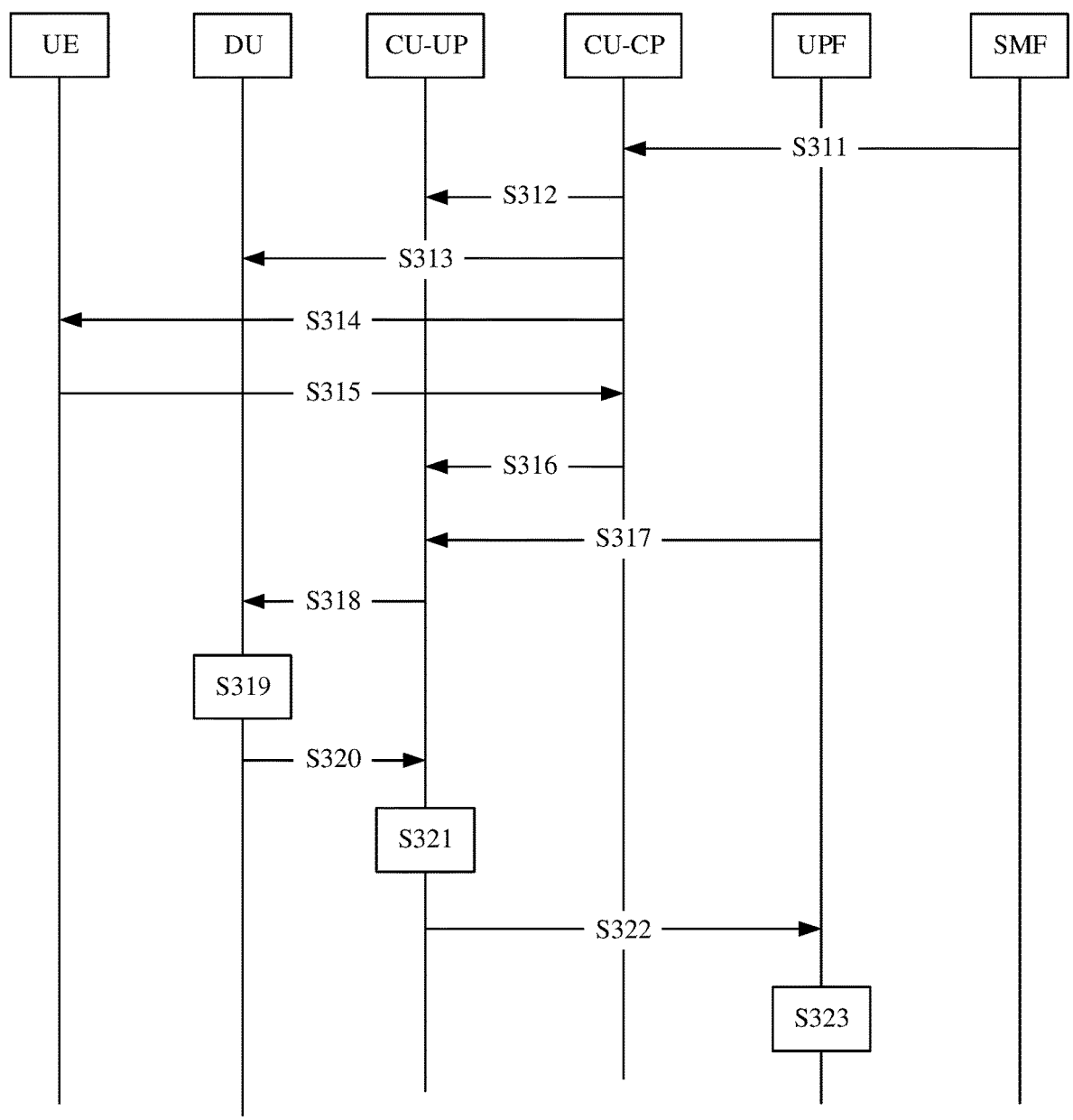
FIG. 9 is a schematic flowchart of a burst monitoring method 300 in uplink transmission in a scenario in which a DU and a CU of an access network device are separated according to an embodiment of this application.

In an example, with reference to FIG. 8 and FIG. 9, the following describes in detail a burst monitoring method in uplink transmission in a scenario in which a DU and a CU are separated. Network elements in the methods shown in FIG. 8 and FIG. 9 include a terminal device, an SMF and a UPF of a core network device, and a CU-CP and a CU-UP of an access network device. In addition, in a specific embodiment, the methods shown in FIG. 8 and FIG. 9 are described by using an example in which an uplink frame is used as an uplink burst and UE is used as a terminal device. For example, the uplink frame may be a video frame.

FIG. 8 is a schematic flowchart of a burst monitoring method 200 in uplink transmission in a scenario in which a DU and a CU of an access network device are separated according to an embodiment of this application. The method 200 corresponds to the embodiment of Manner 1.

S211: The SMF sends a PDU session resource setup request (PDU SESSION RESOURCE SETUP REQUEST) to the CU-CP, where the PDU SESSION RESOURCE SETUP REQUEST carries a QoS flow identifier (QFI) and a frame quality of service monitoring request.

The frame quality of service monitoring request indicates a monitoring transmission direction, and the transmission direction includes uplink transmission and downlink transmission. After the CU-CP receives the frame quality of service monitoring request, the DU and the CU-UP may be enabled to perform a frame quality of service monitoring function for a data radio bearer (DRB) of the QFI, so that the DU and the CU-UP can enable a frame monitoring function.

In this step, the frame monitoring transmission direction indicated by the frame quality of service monitoring request is uplink transmission.

It should be understood that, when a burst is used as a description object, the frame quality of service monitoring request may also be referred to as a burst quality of service monitoring request. Descriptions of the two may be replaced.

S212: The CU-CP sends a bearer context setup request (BEARER CONTEXT SETUP REQUEST) to the CU-UP, where the BEARER CONTEXT SETUP REQUEST carries a QFI and a frame quality of service monitoring request.

Correspondingly, the CU-UP receives the BEARER CONTEXT SETUP REQUEST sent by the CU-CP, and the CU-UP may perform the frame quality of service monitoring function for the DRB of the QFI.

It should be understood that, when a burst is used as a description object, the frame quality of service monitoring function may also be referred to as a burst quality of service monitoring function. Descriptions of the two may be replaced.

S213: The CU-CP sends a UE context setup request (UE CONTEXT SETUP REQUEST) to the DU, where the UE CONTEXT SETUP REQUEST carries a QFI and a frame quality of service monitoring request.

Correspondingly, the DU receives the UE CONTEXT SETUP REQUEST from the CU-CP, and obtains the QFI and the corresponding frame quality of service monitoring request. The DU may perform the frame quality of service monitoring function for the DRB of the QFI.

S214: The CU-CP sends measurement configuration information to the UE, where the measureconfig includes a delivery delay, on the terminal device, of the first data packet that arrives at a PDCP layer in an uplink frame in which the UE is indicated to report the DRB, and the delivery delay, on the terminal device, of the first data packet that arrives at the PDCP layer in the uplink frame is the foregoing fourth uplink delay, that is, the uplink delay $D_{U1}$.

S215: The UE collects statistics on the fourth uplink delay of the uplink frame of the DRB. The UE sends a measurement report to the CU-CP, where the measurement report carries an identifier (for example, an ID) of the DRB and the fourth uplink delay $D_{U1}$ of the corresponding uplink frame.

Correspondingly, the CU-CP receives the measurement report, and obtains the fourth uplink delay $D_{U1}$ of the uplink frame corresponding to the DRB.

S216: The CU-CP sends GNB-CU-CP measurement results information (GNB-CU-CP MEASUREMENT RESULTS INFORMATION) to the CU-UP, where the GNB-CU-CP MEASUREMENT RESULTS INFORMATION carries the identifier of the DRB and the fourth uplink delay $D_{U1}$ of the uplink frame corresponding to the identifier of the DRB.

S217: The UPF sends DL PDU session information (DL PDU SESSION INFORMATION) to the CU-UP, where the DL PDU SESSION INFORMATION carries a QoS monitoring frame (QMF). Correspondingly, the CU-UP receives the DL PDU SESSION INFORMATION, and obtains the QMF.

The QMF may be understood as the delay monitoring request in the method 100.

Table 1 shows a frame format of the DL PDU SESSION INFORMATION, where the DL PDU SESSION INFORMATION carries the QoS monitoring frame (QoS Monitoring frame, QMF). The DL PDU SESSION INFORMATION may further carry a QoS monitoring packet request (QMP), and the QMP indicates the access network device to perform QoS monitoring on a data packet. Generally, DL PDU SESSION INFORMATION has either the QMP or the QMF.

In addition, for example, the DL PDU SESSION INFORMATION may further carry a paging policy presence (PPP), a reflective QoS indicator (RQI), and a paging policy indicator (PPI).

TABLE 1

| Bits | | | | | | | | Number of octets (Number of Octets) |
|---|---|---|---|---|---|---|---|---|
| 7 | 6 | 5 | 4 | 3 | 2 | 1 | 0 | |
| PDU Type (=0) | | | | QMP | QMF | Spare | 1 | PDU Type (=0) |
| PPP | RQI | | | QoS flow identifier | | | | 1 |

TABLE 1-continued

| Bits | | | | | | | | Number of octets (Number of Octets) |
|---|---|---|---|---|---|---|---|---|
| 7 | 6 | 5 | 4 | 3 | 2 | 1 | 0 | |
| PPI | | | Spare | | | | | 0 or 1 |
| Downlink sending timestamp | | | | | | | | 0 or 4 |
| Padding | | | | | | | | 0 to 3 |

It should be understood that, when a burst is used as a description object, the QoS monitoring frame may also be referred to as a QoS monitoring burst. Descriptions of the two may be replaced.

S218: The CU-UP sends DL user data (PDU Type 0) to the DU, where the DL USER DATA carries the QMF.

Correspondingly, the DU receives the DL USER DATA, and obtains the QMF.

S219: The DU determines a second uplink delay of the uplink frame between the terminal device and the DU based on the QMF received in S218.

Second uplink delay=Delay $D_{U21}$+Delay $D_{U22}$. For specific descriptions of the delay, refer to the foregoing related descriptions. Details are not described again.

S220: The DU sends UL assistance information data (UL ASSISTANCE INFORMATION DATA) (PDU Type 2) to the CU-UP, where the UL ASSISTANCE INFORMATION DATA carries the second uplink delay between the terminal device and the DU.

Correspondingly, the CU-UP receives the UL ASSISTANCE INFORMATION DATA, and obtains the second uplink delay.

Table 2 shows a frame format of the UL ASSISTANCE INFORMATION DATA. As shown in Table 2, an uplink frame delay DU result ((UL frame, ULF) Delay DU Result) includes the second uplink delay of the uplink frame between the terminal device and the DU, and is represented by 0 or 4 bytes. An uplink frame delay indicator (ULF Delay Ind.) indicates whether the UL ASSISTANCE INFORMATION DATA includes the ULF Delay DU Result, and is represented by 1 byte. For example, when a value of the ULF Delay Ind. is 1, it indicates that the UL ASSISTANCE INFORMATION DATA includes the ULF Delay DU Result; or when the value of the ULF Delay Ind. is 0, it indicates that the UL ASSISTANCE INFORMATION DATA does not include the ULF Delay DU Result.

It should be understood that, when a burst is used as a description object, the uplink frame delay result may also be referred to as an uplink burst delay result, and the uplink frame delay indicator may also be referred to as an uplink burst delay indicator. Descriptions of the two may be replaced.

TABLE 2

| Bit | | | | | | | | Number of octets (Number of Octets) |
|---|---|---|---|---|---|---|---|---|
| 7 | 6 | 5 | 4 | 3 | 2 | 1 | 0 | |
| PDU Type (=2) | | | | PDCP duplication indicator (PDCP Dupl. Ind.) | Assistance information indicator (Assistance Info. Ind.) | Uplink delay indicator (UL Delay Ind.) | Downlink delay indicator (DL Delay Ind.) | 1 |
| Uplink frame delay indicator (ULF Delay | Downlink frame delay indicator (DLF Delay | | | Spare (Spare) | | | PDCP duplication activation suggestion | 1 |

TABLE 2-continued

| Bit | | | | | | | | Number of octets (Number of Octets) |
|---|---|---|---|---|---|---|---|---|
| 7 | 6 | 5 | 4 | 3 | 2 | 1 | 0 | |
| Delay Ind.) | Ind.) | | | | | | | |
| | | | | Number of assistance information fields | | | | 0 or 1 |
| | | | | Assistance information type | | | | 0 or (2 * Number of assistance information fields + sum of number of octets for radio quality assistance information fields) (2 * Number of Assistance Info Fields + sum of Number of octets for Radio Quality Assistance Information Fields) |
| | | | | Number of octets for radio quality assistance information fields | | | | |
| | | | | Radio quality assistance information | | | | |
| | | | | Uplink delay DU result (UL Delay DU Result) | | | | 0 or 4 |
| | | | | Downlink delay DU result (DL Delay DU Result) | | | | 0 or 4 |
| | | | | Uplink frame delay DU result (ULF Delay DU Result) | | | | 0 or 4 |
| | | | | Downlink frame delay DU result (DLF Delay DU Result) | | | | 0 or 4 |

S221: The CU-UP determines an uplink delay of the uplink frame between the terminal device and the CU-UP based on the QMF received in S217, that is, determines the uplink delay $D_{U\text{-}UE\text{-}base\ station}$ of the uplink frame between the terminal device and the access network device.

The uplink delay includes the second uplink delay, a third uplink delay, and the fourth uplink delay. First uplink delay=Second uplink delay+Third uplink delay.

That is, the CU-UP determines the uplink delay between the terminal device and the CU-UP based on the second uplink delay, the third uplink delay, and the fourth uplink delay.

The fourth uplink delay is the fourth uplink delay carried in the GNB-CU-CP MEASUREMENT RESULTS INFORMATION sent by the CU-CP to the CU-UP in S216.

The second uplink delay is the second uplink delay carried in the UL ASSISTANCE INFORMATION DATA sent by the DU to the CU-UP in S220.

Third uplink delay=Delay $D_{U23}$+Delay $D_{U24}$. For specific descriptions of the delay, refer to the foregoing related descriptions. Details are not described again.

S222: The CU-UP sends UL PDU session information (UL PDU SESSION INFORMATION) to the UPF, where the UL PDU SESSION INFORMATION carries the uplink delay $D_{U\text{-}UE\text{-}base\ station}$ between the terminal device and the CU-UP.

Correspondingly, the UPF receives the UL PDU SESSION INFORMATION.

It may be understood that the UL PDU SESSION INFORMATION carries response information for responding to the QMF sent in S217, and the response information includes the uplink delay $D_{U\text{-}UE\text{-}base\ station}$ between the terminal device and the CU-UP.

Table 3 shows a frame format of the UL PDU SESSION INFORMATION. An uplink frame delay result (ULF Delay Result) includes the uplink delay of the uplink frame between the terminal device and the CU-UP, and the ULF Delay Ind. indicates whether the UL PDU SESSION INFORMATION includes the ULF Delay Result, and is represented by 1 byte. For example, when a value of the ULF Delay Ind. is 1, it indicates that the UL PDU SESSION INFORMATION includes the ULF Delay Result; or when the value of the ULF Delay Ind. is 0, it indicates that the UL PDU SESSION INFORMATION does not include the ULF Delay Result.

TABLE 3

| Bits | | | | | | | | Number of octets (Number of Octets) |
|---|---|---|---|---|---|---|---|---|
| 7 | 6 | 5 | 4 | 3 | 2 | 1 | 0 | |
| PDU Type (=1) | | | | QMP | DL Delay Ind. | UL Delay Ind. | DLF Delay Ind. | 1 |
| ULF Delay Ind. | Spare | | QoS flow identifier | | | | | 1 |

TABLE 3-continued

| Bits | | | | | | | | Number of octets (Number of Octets) |
|---|---|---|---|---|---|---|---|---|
| 7 | 6 | 5 | 4 | 3 | 2 | 1 | 0 | |
| Downlink sending timestamp repeated (DL Sending Timestamp Repeated) | | | | | | | | 0 or 4 |
| Downlink sending timestamp (DL Sending Timestamp) | | | | | | | | 0 or 4 |
| Uplink sending timestamp (UL Sending Timestamp) | | | | | | | | 0 or 4 |
| Downlink delay result (DL Delay Result) | | | | | | | | 0 or 4 |
| Uplink delay result (UL Delay Result) | | | | | | | | 0 or 4 |
| Downlink frame delay result (DLF Delay Result) | | | | | | | | |
| Uplink frame delay result (ULF Delay Result) | | | | | | | | |
| Padding (Padding) | | | | | | | | 0 to 3 |

S223: The UPF determines an uplink delay of the uplink frame between the terminal device and the UPF (that is, the core network device).

The uplink delay includes a fifth uplink delay $D_{U\text{-}base\ station\text{-}UPF}$ of the uplink frame between the UPF and the CU-UP, and the uplink delay $D_{U\text{-}UE\text{-}base\ station}$ of the uplink frame between the terminal device and the CU-UP.

That is, the UPF determines the uplink delay $D_{U\text{-}UE\text{-}UPF}$ of the uplink frame between the terminal device and the UPF based on the fifth uplink delay and the uplink delay of the uplink frame between the terminal device and the CU-UP.

The uplink delay determined in the foregoing embodiment includes the fourth uplink delay $D_{U1}$. When the uplink delay does not include the fourth uplink delay $D_{U1}$, for another specific embodiment in the scenario in which the DU and the CU are separated, refer to the embodiment in FIG. 8. However, because the fourth uplink delay $D_{U1}$ does not need to be determined, a method for monitoring an uplink delay is slightly different. In this embodiment, S214 to S216 are omitted, and all content related to the fourth uplink delay $D_{U1}$ is omitted in S219 to S223.

FIG. 9 is a schematic flowchart of a burst monitoring method 300 in uplink transmission in a scenario in which a DU and a CU of an access network device are separated according to an embodiment of this application. The method 300 corresponds to the embodiment of Manner 2.

In the method 300, a process of performing S311 to S318 by each network element is the same as a process of performing S211 to S218 by each network element in the method 200. Details are not described herein again. The following describes a process of S319 to S323.

S319: The DU determines a first time based on the QMF received in S318, where the first time is a grant time of the first data packet that arrives at a MAC layer of the terminal device in the uplink frame.

The first time is the foregoing time $T_{U1.3}$. For specific descriptions, refer to the foregoing related descriptions. Details are not described again.

S320: The DU sends UL ASSISTANCE INFORMATION DATA (PDU Type 2) to the CU-UP, where the UL ASSISTANCE INFORMATION DATA carries the first time.

Table 4 shows a frame format of the ASSISTANCE INFORMATION DATA. As shown in Table 4, an uplink frame timestamp DU result ((UL frame, ULF) Timestamp DU Result) includes the grant time (that is, the first time) of the first data packet in the uplink frame, and an uplink frame delay indicator (ULF Delay Ind.) indicates whether the ASSISTANCE INFORMATION DATA includes the ULF Timestamp DU Result. For example, when a value of the ULF Delay Ind. is 1, it indicates that the ASSISTANCE INFORMATION DATA includes the ULF Timestamp DU Result; or when the value of the ULF Delay Ind. is 0, it indicates that the ASSISTANCE INFORMATION DATA does not include the ULF Timestamp DU Result.

It should be understood that, when a burst is used as a description object, the uplink frame timestamp result may also be referred to as an uplink burst timestamp result. Descriptions of the two may be replaced.

TABLE 4

| Bits | | | | | | | | Number of octets (Number of Octets) |
|---|---|---|---|---|---|---|---|---|
| 7 | 6 | 5 | 4 | 3 | 2 | 1 | 0 | |
| PDU Type (=2) | | | | 1 | Assistance Info. Ind. | UL Delay Ind. | DL Delay Ind. | 1 |
| ULF Delay Ind. | DLF Delay Ind. | | | | Spare | | PDCP Duplication Activation Suggestion | 1 |
| Number of Assistance Information Fields | | | | | | | | 0 or 1 |
| Assistance Information Type | | | | | | | | 0 or (2 * |
| Number of octets for Radio Quality Assistance Information Fields | | | | | | | | Number of |
| Radio Quality Assistance Information | | | | | | | | Assistance Info Fields + sum of Number of octets for |

TABLE 4-continued

| Bits | | | | | | | | Number of octets (Number of Octets) |
|---|---|---|---|---|---|---|---|---|
| 7 | 6 | 5 | 4 | 3 | 2 | 1 | 0 | |
| | | | | | | | | Radio Quality Assistance Information Fields) |
| | | | | UL Delay DU Result | | | | 0 or 4 |
| | | | | DL Delay DU Result | | | | 0 or 4 |
| | | Uplink frame timestamp DU result (ULF Timestamp DU Result) | | | | | | 0 or 4 |
| | | Downlink frame timestamp DU result (DLF Timestamp DU Result) | | | | | | 0 or 4 |

S321: The CU-UP determines an uplink delay of the uplink frame between the terminal device and the CU-UP, to determine the uplink delay $D_{U\text{-}UE\text{-}base\ station}$ of the uplink frame between the terminal device and the access network device.

The uplink delay includes the fourth uplink delay of the uplink frame that is delivered on the terminal device and a first uplink delay from the first time to a second time, and the second time is a sending time of the last data packet that is sent from a PDCP layer of the CU in the uplink frame.

That is, the CU-UP determines the uplink delay $D_{U\text{-}UE\text{-}base\ station}$ between the terminal device and the CU-UP (that is, the core network device) based on the fourth uplink delay, the first time, and the second time.

The fourth uplink delay is the fourth uplink delay carried in the GNB-CU-CP MEASUREMENT RESULTS INFORMATION sent by the CU-CP to the CU-UP in S316.

S322: The CU-UP sends UL PDU SESSION INFORMATION to the UPF, where the UL PDU SESSION INFORMATION carries the uplink delay $D_{U\text{-}UE\text{-}base\ station}$ between the terminal device and the CU-UP.

For a form in which the UL PDU SESSION INFORMATION carries the uplink delay $D_{U\text{-}UE\text{-}base\ station}$, refer to the UL PDU SESSION INFORMATION shown in Table 3 in the method 200. Details are not described again.

S323: The UPF determines an uplink delay $D_{U\text{-}UE\text{-}UPF}$ of the uplink frame between the terminal device and the UPF (that is, the core network device).

A process of performing S322 and S323 by each network element is the same as a process of performing S222 and S223 by each network element in the method 200. Details are not described herein again.

The uplink delay determined in the foregoing embodiment includes the fourth uplink delay. When the uplink delay does not include the fourth uplink delay, for another specific embodiment in the scenario in which the DU and the CU are separated, refer to the embodiment in FIG. 9. However, because the fourth uplink delay does not need to be determined, a method for monitoring an uplink delay is slightly different. Compared with Case 1, in this case, S314 to S316 are omitted, and content related to the fourth uplink delay is omitted in S321 to S323.

An embodiment of this application further provides a burst monitoring method. In the method, a core network device mainly determines an uplink delay of an uplink burst between a terminal device and the core network device based on a first time and an end time of the uplink burst between the terminal device and the core network device. The uplink delay is more accurate than an uplink delay obtained in a manner in which each network element collects statistics on delays by segment.

Figure 10:
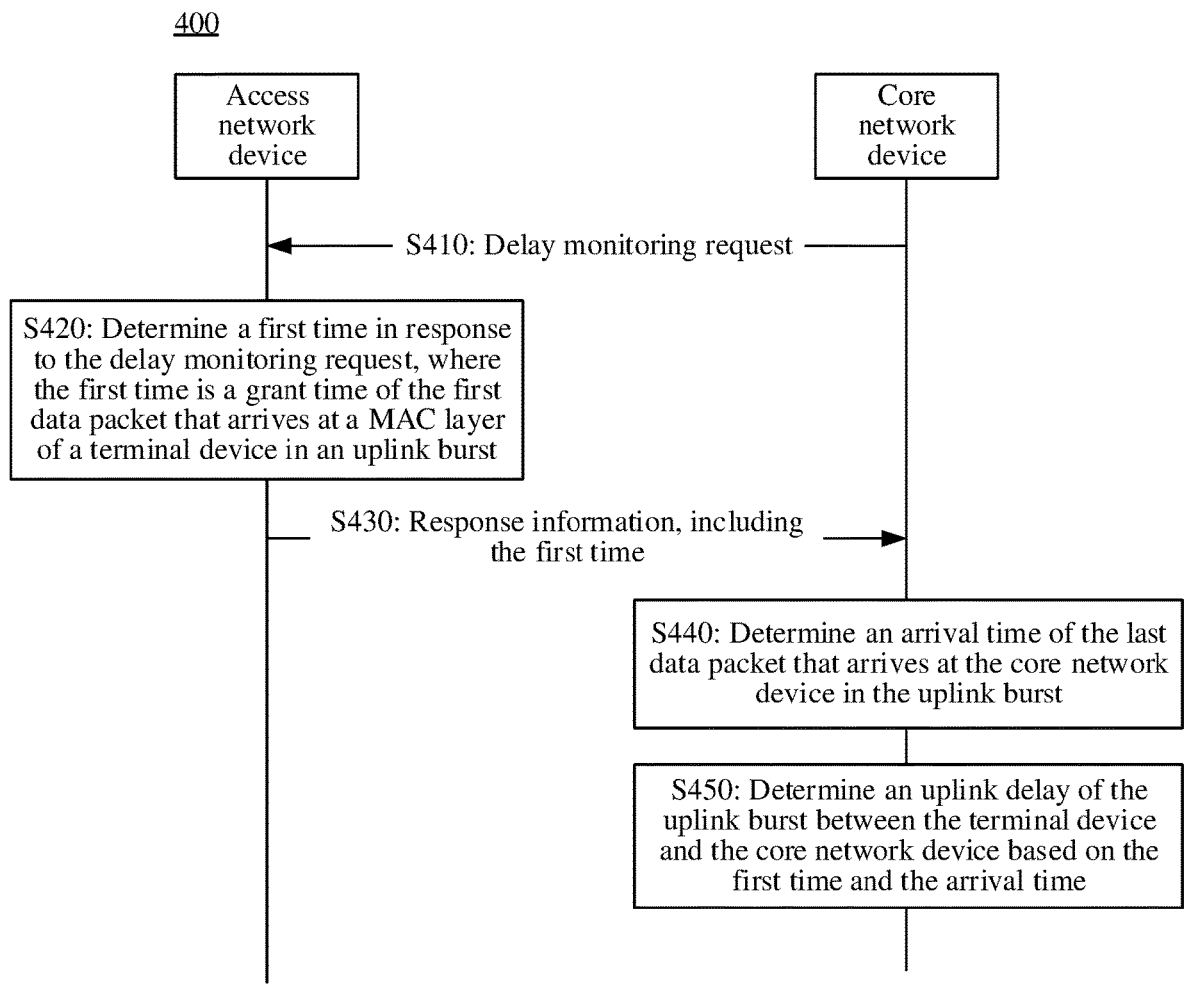
FIG. 10 is a schematic flowchart of a burst monitoring method 400 in uplink transmission according to an embodiment of this application.

FIG. 10 is a schematic flowchart of a burst monitoring method 400 in uplink transmission according to an embodiment of this application.

In S410, a core network device sends a delay monitoring request to an access network device, where the delay monitoring request indicates to perform delay monitoring on a periodic burst.

For the delay monitoring request, refer to the related descriptions of S110 in the method 100. Details are not described again.

In S420, the access network device determines a first time in response to the delay monitoring request, where the first time is a grant time of the first data packet that arrives at a MAC layer of the terminal device in the uplink burst.

The access network device may determine the first time based on a UL grant. For specific descriptions, refer to the foregoing related descriptions of determining the first time by the access network device in Manner 2. Details are not described again.

In S430, the access network device sends response information to the core network device, where the response information includes the first time.

The response information may be independent information, or may be content carried in other information. This is not limited in this embodiment of this application.

For example, the response information may be a field carried in an UL PDU SESSION INFORMATION frame.

In S440, the core network device determines an arrival time of the last data packet that arrives at the core network device in the uplink burst.

The arrival time may be understood as an end time of the uplink burst between the terminal device and the core network device.

The arrival time is the foregoing time $T_{U3}$. For specific descriptions, refer to the foregoing related descriptions. Details are not described again.

In S450, the core network device determines an uplink delay of the uplink burst between the terminal device and the core network device based on the first time and the arrival time.

The uplink delay of the uplink burst between the terminal device and the core network device is the foregoing uplink delay $D_{U\text{-}UE\text{-}UPF}$, and includes duration from the first time to the arrival time.

According to the burst monitoring method provided in this embodiment of this application, the core network device determines the uplink delay of the uplink burst between the terminal device and the core network device by using the grant time (that is, the first time) of the first data packet that arrives at the MAC layer in the uplink burst and that is sent by the access network device and the arrival time of the last data packet that arrives at the core network device in the uplink burst. In this way, a process of monitoring the uplink delay of the uplink burst between the terminal device and the core network device is implemented, and a more accurate uplink delay can be obtained, so that the core network device can more accurately evaluate data transmission performance based on the uplink delay of the uplink burst, thereby improving user experience.

In some embodiments, the uplink delay $D_{U\text{-}UE\text{-}UPF}$ of the uplink burst between the terminal device and the core network device further includes a fourth uplink delay. Based on this, the method 400 further includes:

The core network device receives the fourth uplink delay from the terminal device.

In S450, specifically, the core network device determines the uplink delay of the uplink burst between the terminal device and the core network device based on the fourth uplink delay, the first time, and the arrival time.

The terminal device sends the fourth uplink delay to the core network device by using the access network device.

In an example, the response information sent by the access network device includes the first time and the fourth uplink delay.

Figure 11:
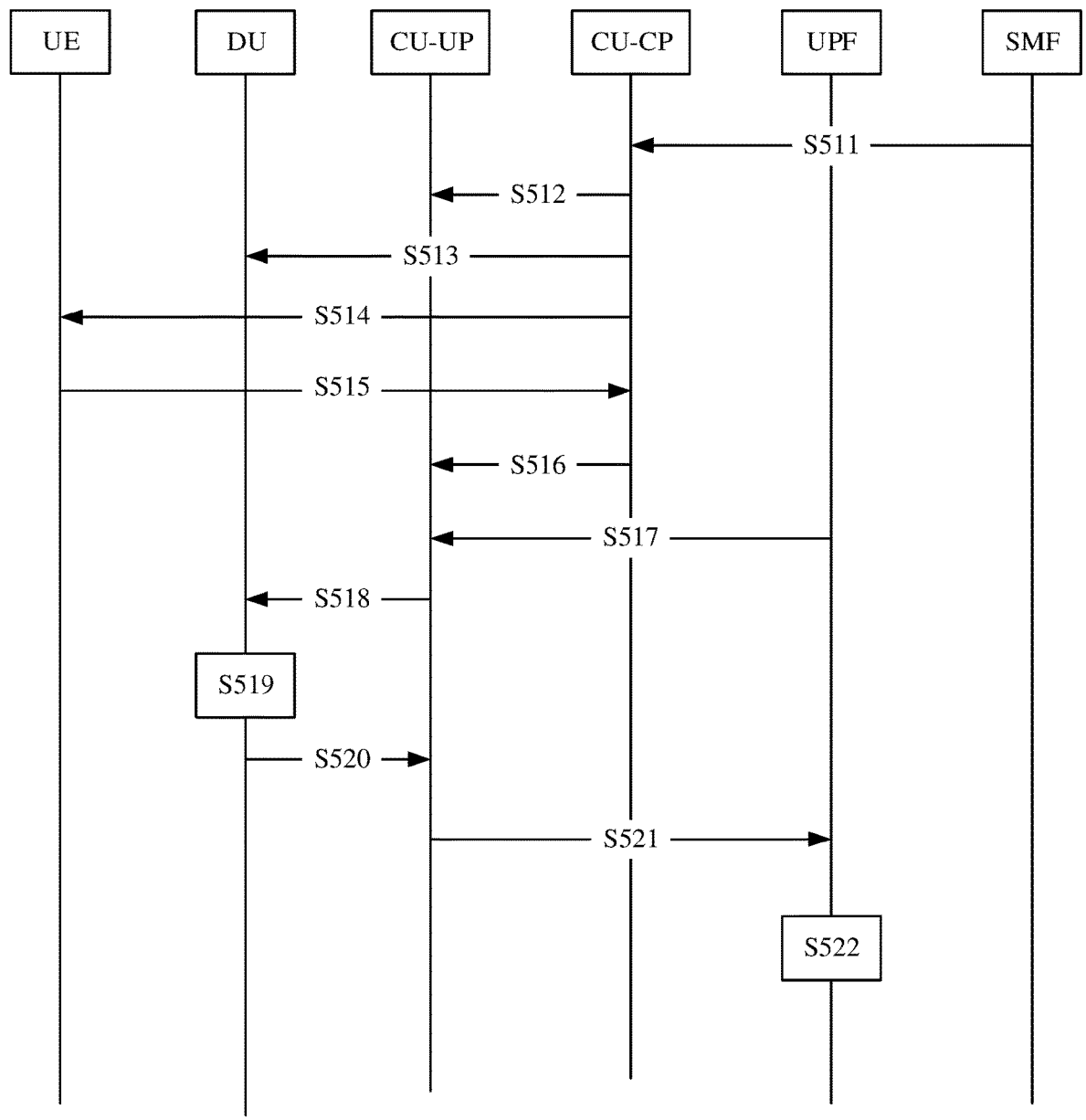
FIG. 11 is a schematic flowchart of a burst monitoring method 500 in uplink transmission in a scenario in which a DU and a CU are separated according to an embodiment of this application.

FIG. 11 is a schematic flowchart of a burst monitoring method 500 in uplink transmission in a scenario in which a DU and a CU are separated according to an embodiment of this application. The method 500 is a more specific embodiment of the method 400.

Network elements in the method shown in FIG. 11 include a terminal device, an SMF and a UPF of a core network device, and a CU-CP and a CU-UP of an access network device. In addition, in a specific embodiment, the method shown in FIG. 11 is described by using an example in which an uplink frame is used as an uplink burst and UE is used as a terminal device. For example, the uplink frame may be a video frame.

In the method 500, a process of performing S511 to S518 by each network element is the same as a process of performing S211 to S218 by each network element in the method 200. Details are not described herein again. The following describes a process of S518 to S522.

S519: The DU determines a first time based on the QMF received in S518, where the first time is a grant time of the first data packet that arrives at a MAC layer of the terminal device in the uplink frame.

S520: The DU sends UL ASSISTANCE INFORMATION DATA (PDU Type 2) to the CU-UP, where the UL ASSISTANCE INFORMATION DATA carries the first time.

For a form in which the UL ASSISTANCE INFORMATION DATA carries the first time, refer to the UL ASSISTANCE INFORMATION DATA shown in Table 4 in the method 300. Details are not described again.

S521: The CU-UP sends UL PDU SESSION INFORMATION to the UPF, where the UL PDU SESSION INFORMATION carries the first time and the fourth uplink delay.

The fourth uplink delay is the fourth uplink delay carried in the GNB-CU-CP MEASUREMENT RESULTS INFORMATION sent by the CU-CP to the CU-UP in S516.

It may be understood that the UL PDU SESSION INFORMATION carries response information for responding to the QMF sent in S517, and the response information includes the first time and the fourth uplink delay.

Table 5 shows a frame format of the UL PDU SESSION INFORMATION. An uplink frame timestamp result (ULF Timestamp Result) includes the first time and the fourth uplink delay, and an ULF Delay Ind. indicates whether the UL PDU SESSION INFORMATION includes the ULF Timestamp Result. When a value of the ULF Delay Ind. is 1, it indicates that the UL PDU SESSION INFORMATION includes the ULF Timestamp Result; or when the value of the ULF Delay Ind. is 0, it indicates that the UL PDU SESSION INFORMATION does not include the ULF Timestamp Result.

TABLE 5

| Bits | | | | | | | | Number of octets (Number of Octets) |
|---|---|---|---|---|---|---|---|---|
| 7 | 6 | 5 | 4 | 3 | 2 | 1 | 0 | |
| PDU Type (=1) | | | | QMP | DL Delay Ind. | UL Delay Ind. | DLF Delay Ind. | 1 |
| ULF Delay Ind. | Spare | | | QoS Flow Identifier | | | | 1 |
| DL Sending Timestamp Repeated | | | | | | | | 0 or 4 |
| DL Received Timestamp | | | | | | | | 0 or 4 |
| UL Sending Timestamp | | | | | | | | 0 or 4 |
| DL Delay Result | | | | | | | | 0 or 4 |
| UL Delay Result | | | | | | | | 0 or 4 |
| Downlink frame timestamp result (DLF Timestamp Result) | | | | | | | | |
| Uplink frame timestamp result (ULF Timestamp Result) | | | | | | | | |
| Padding | | | | | | | | 0 to 3 |

S522: The UPF determines an uplink delay $D_{U\text{-}UE\text{-}UPF}$ of the uplink frame between the terminal device and the UPF (that is, the core network device) based on the first time, an arrival time, and the fourth uplink delay.

The uplink delay $D_{U\text{-}UE\text{-}UPF}$ includes the fourth uplink delay and duration from the first time to the arrival time.

The uplink delay $D_{U\text{-}UE\text{-}UPF}$ determined in the foregoing embodiment includes the fourth uplink delay. When the uplink delay $D_{U\text{-}UE\text{-}UPF}$ does not include the fourth uplink delay, in S521, the CU-UP sends the UL PDU SESSION INFORMATION to the UPF, where the UL PDU SESSION INFORMATION carries the first time. In S522, the UPF determines the uplink delay $D_{U\text{-}UE\text{-}UPF}$ of the uplink frame between the terminal device and the UPF (that is, the core network device) based on the first time and the arrival time.

Downlink Transmission

With reference to FIG. 3 to FIG. 11, the foregoing describes in detail the delay of the uplink burst. With reference to FIG. 12 to FIG. 20, the following describes in detail a delay of a downlink burst.

To facilitate understanding of the delay of the downlink burst, with reference to FIG. 12 to FIG. 15, a process of transmitting the downlink burst from the access network device to the terminal device in four scenarios is described.

In addition, an example in which the protocol architecture in 5G is applied, the UPF is used as the core network device, and one downlink burst includes four data packets is used for description. The four data packets are respectively denoted as a data packet 1, a data packet 2, a data packet 3, and a data packet 4.

It should be noted that, because the SDAP layer and the PHY have no data buffering function, and a delay of data at the SDAP layer and the PHY is very short and may be ignored, the PHY layer is not shown in FIG. 12 to FIG. 15. However, for ease of description of another case, the SDAP layer is shown in the figure.

Figure 12:
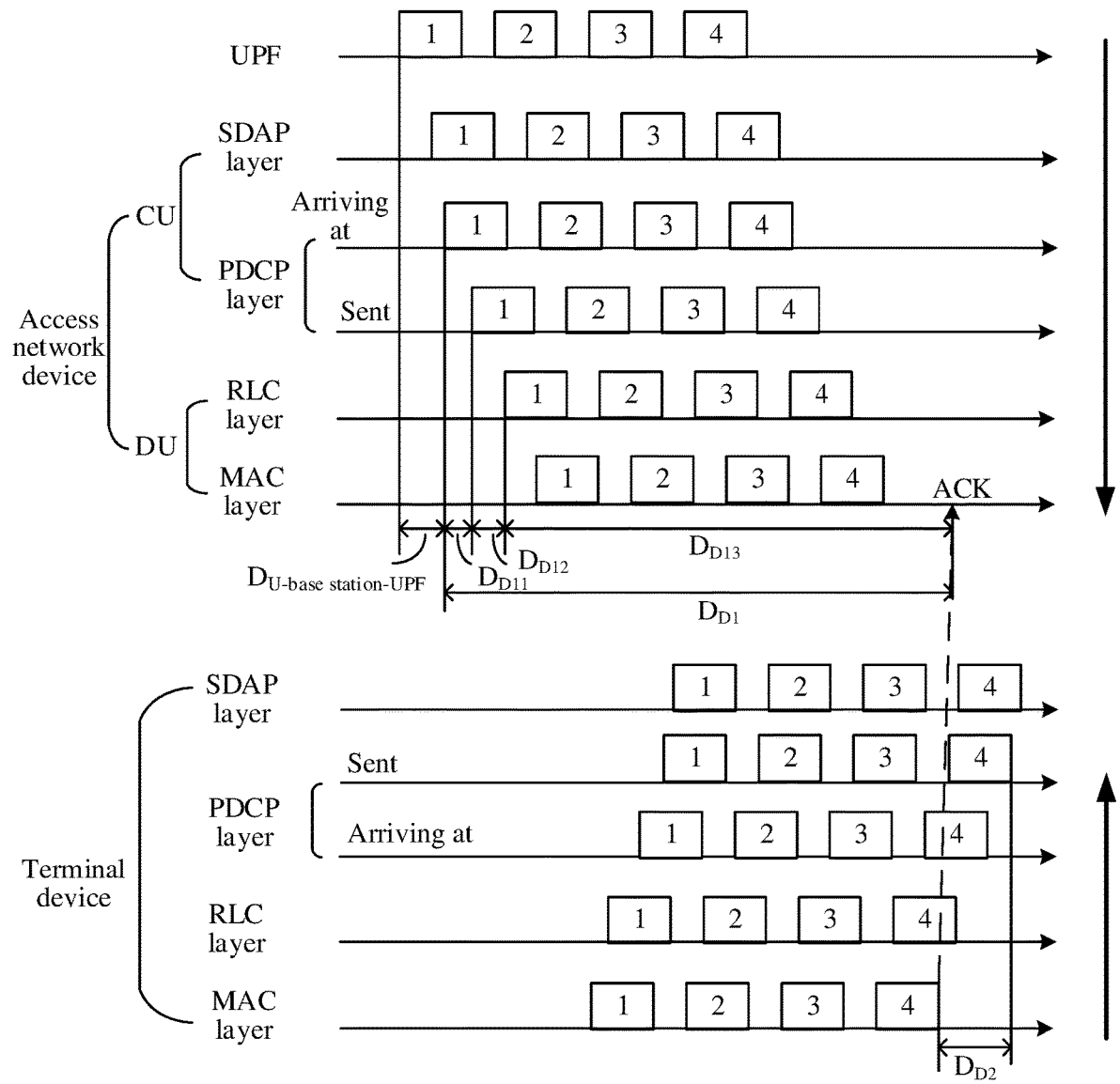
FIG. 12 is a schematic diagram of transmitting a downlink burst in a scenario of sequential delivering at protocol layers according to an embodiment of this application.

FIG. 12 is a schematic diagram of transmitting a downlink burst in a scenario of sequential delivering at protocol layers.

Refer to FIG. 12. The UPF sends the four data packets to the SDAP layer of the access network device, and the access network device sequentially delivers the four data packets to the MAC layer of the access network device from top to bottom. The access network device sends the four data packets to the access network device, and the four data packets arrive at the MAC layer of the terminal device from the MAC layer of the access network device. The terminal device sequentially delivers the four data packets to the SDAP layer of the terminal device from bottom to top.

For each successfully received data packet, the terminal device sends feedback information from the MAC layer of the terminal device to the MAC layer of the access network device, to indicate that the terminal device successfully receives the data packet. For example, the feedback information may be an acknowledgement (ACK). Only when the access network device successfully receives feedback information, it indicates that a data packet corresponding to the feedback information is successfully received, and downlink transmission of the data packet is completed. Assuming that the terminal device successfully receives the four data packets, the terminal device sends four pieces of feedback information to the MAC layer of the access network device. FIG. 12 shows only feedback information (for example, an ACK) of the data packet 4, and other feedback information is not shown.

Figure 13:
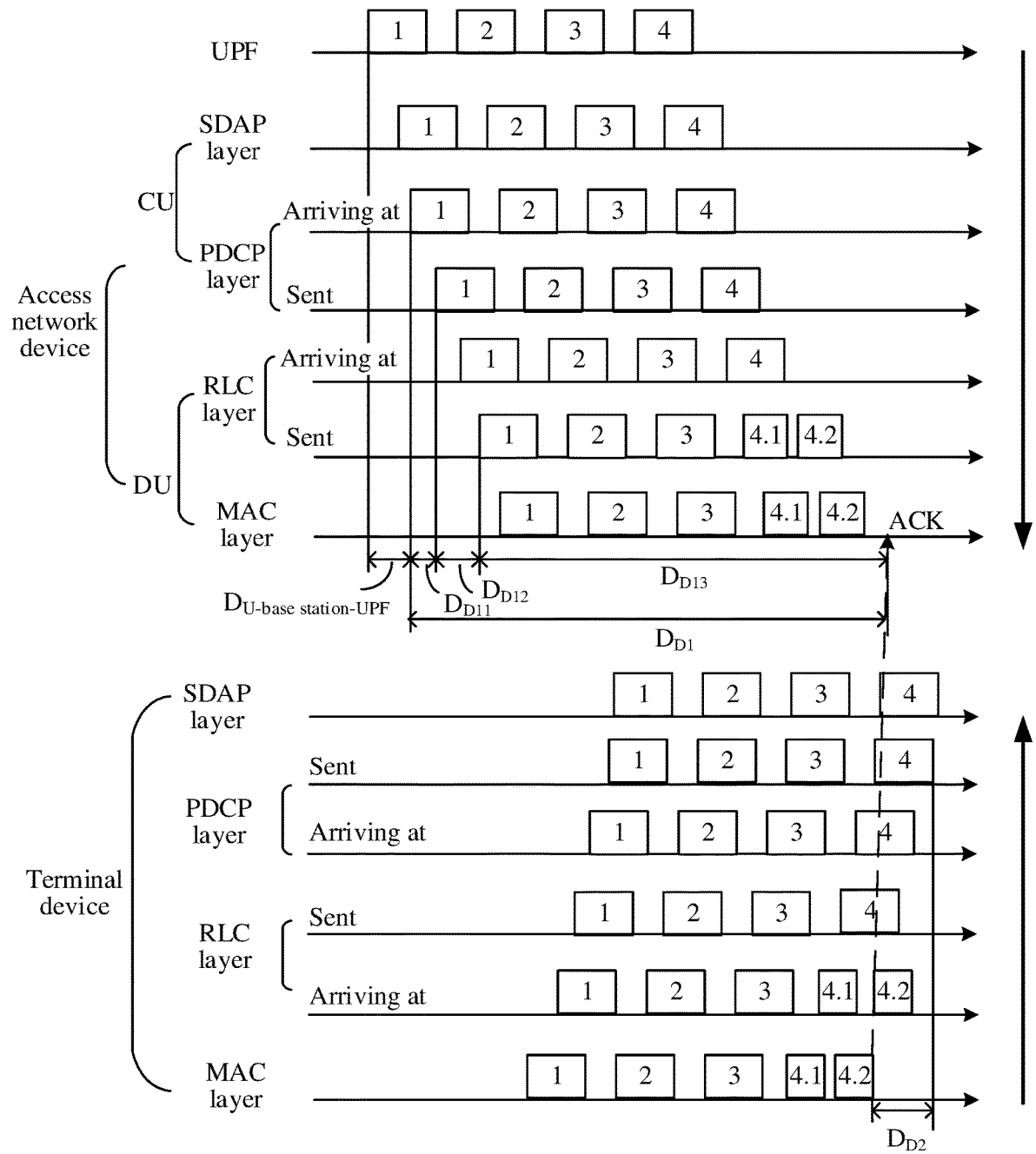
FIG. 13 is a schematic diagram of transmitting a downlink burst in a scenario of segmentation at an RLC layer according to an embodiment of this application.

FIG. 13 is a schematic diagram of transmitting a downlink burst in a scenario of segmentation at an RLC layer. It is assumed that the downlink burst is sequentially delivered at protocol layers.

Refer to FIG. 13. The UPF sends the four data packets to the SDAP layer of the access network device. After the access network device sequentially delivers the four data packets to the RLC layer in a form of an RLC SDU from top to bottom, the access network device segments the data packet of the downlink burst. It is assumed that the access network device divides the data packet 4 into two segments at the RLC layer, which are denoted as a data packet 4.1 and a data packet 4.2. In this case, the access network device sequentially delivers the data packet 1, the data packet 2, the data packet 3, the data packet 4.1, and the data packet 4.2 from the RLC layer to the MAC layer in a form of an RLC PDU. The access network device sends the five data packets to the terminal device, and the five data packets arrive at the MAC layer of the terminal device from the MAC layer of the access network device.

Assuming that the terminal device successfully receives the five data packets, the terminal device sends five pieces of feedback information to the MAC layer of the access network device. FIG. 13 shows only feedback information (for example, an ACK) of the last data packet 4.2, and other feedback information is not shown.

In a process in which the terminal device delivers a data packet, the terminal device delivers the five data packets from the MAC layer to the RLC layer, and the terminal device needs to reassemble the previously segmented data packet 4 (that is, the RLC SDU), to restore the previously segmented data packet 4. That is, the terminal device reassembles the data packet 4.1 and the data packet 4.2 to restore the original data packet 4. In this way, the terminal device delivers the four data packets from the RLC layer to the SDAP layer of the terminal device.

Figure 14:
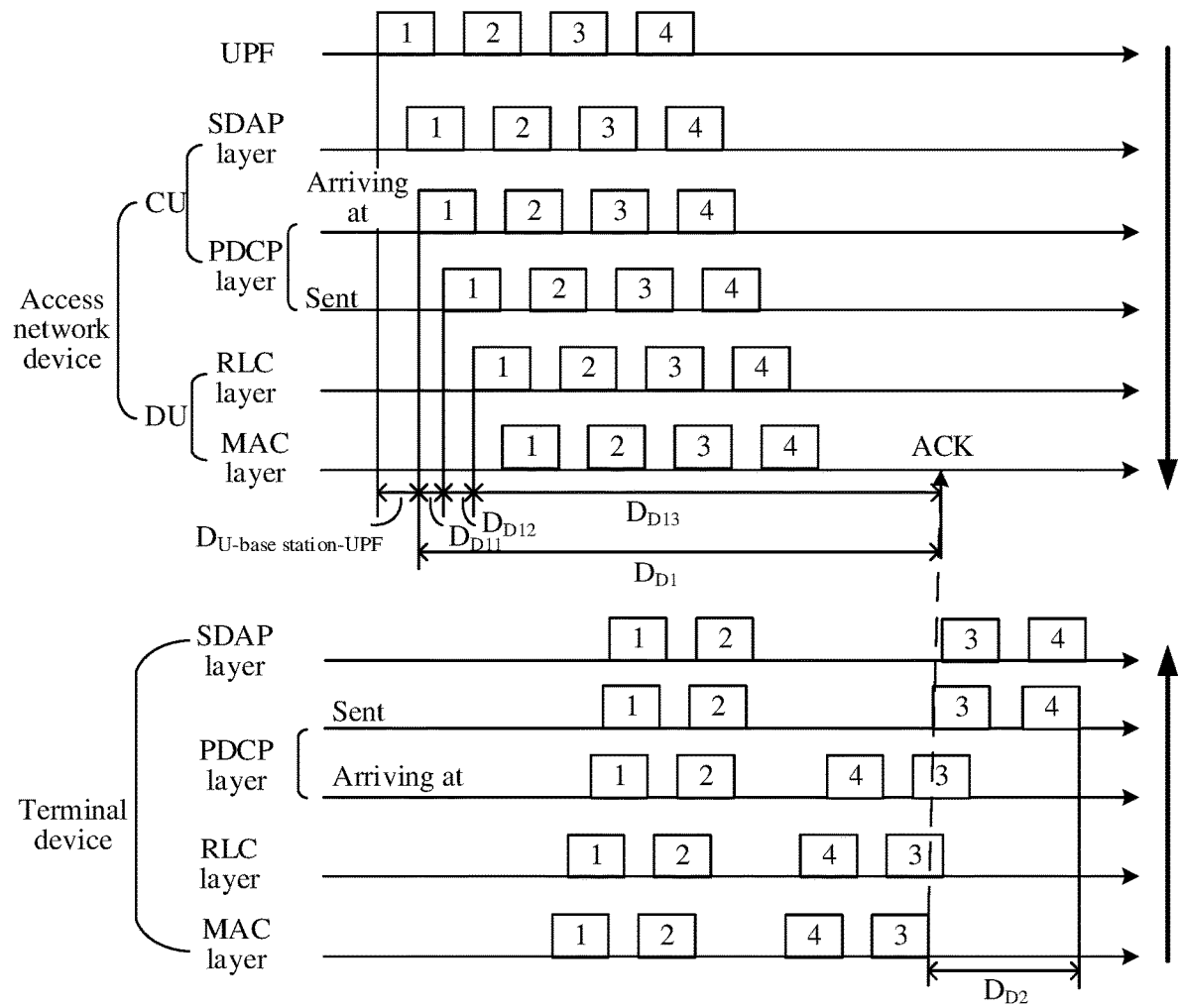
FIG. 14 is a schematic diagram of transmitting a downlink burst in a scenario of out-of-order arrival in an air interface transmission process according to an embodiment of this application.

FIG. 14 is a schematic diagram of transmitting a downlink burst in a scenario of out-of-order arrival in an air interface transmission process.

Refer to FIG. 14. The UPF sends the four data packets to the SDAP layer of the access network device, and the access network device sequentially delivers the four data packets to the MAC layer of the access network device from top to bottom. The access network device sends the four data packets to the terminal device, and the four data packets arrive at the MAC layer of the terminal device from the MAC layer of the access network device. However, in the air interface transmission process, the data packets arrive out of order, that is, the data packet 4 arrives at the MAC layer of the terminal device before the data packet 3.

Assuming that the terminal device successfully receives the four data packets, the terminal device sends four pieces of feedback information to the MAC layer of the access network device. FIG. 14 shows only feedback information (for example, an ACK) of the last data packet 4, and other feedback information is not shown.

In a process in which the terminal device delivers a data packet, the terminal device delivers the four data packets to the PDCP layer in a sequence of the data packet 1, the data packet 2, the data packet 4, and the data packet 3. When in-order delivery is configured at the PDCP layer, regardless of a sequence in which the four data packets arrive at the PDCP layer, the terminal device sends the four data packets from the PDCP layer to the SDAP layer in an original sequence of the data packet 1, the data packet 2, the data packet 3, and the data packet 4.

It should be noted that, when out-of-order delivery is configured at the PDCP layer, the terminal device sends the four data packets in a time sequence, that is, sends one data packet that arrives at the PDCP layer before another data packet that arrives at the PDCP layer, where the one data packet arrives at the PDCP layer earlier than the another data packet. In the scenario shown in FIG. 14, the terminal device continues to send the four data packets to the SDAP layer in the sequence of the data packet 1, the data packet 2, the data packet 4, and the data packet 3.

Figure 15:
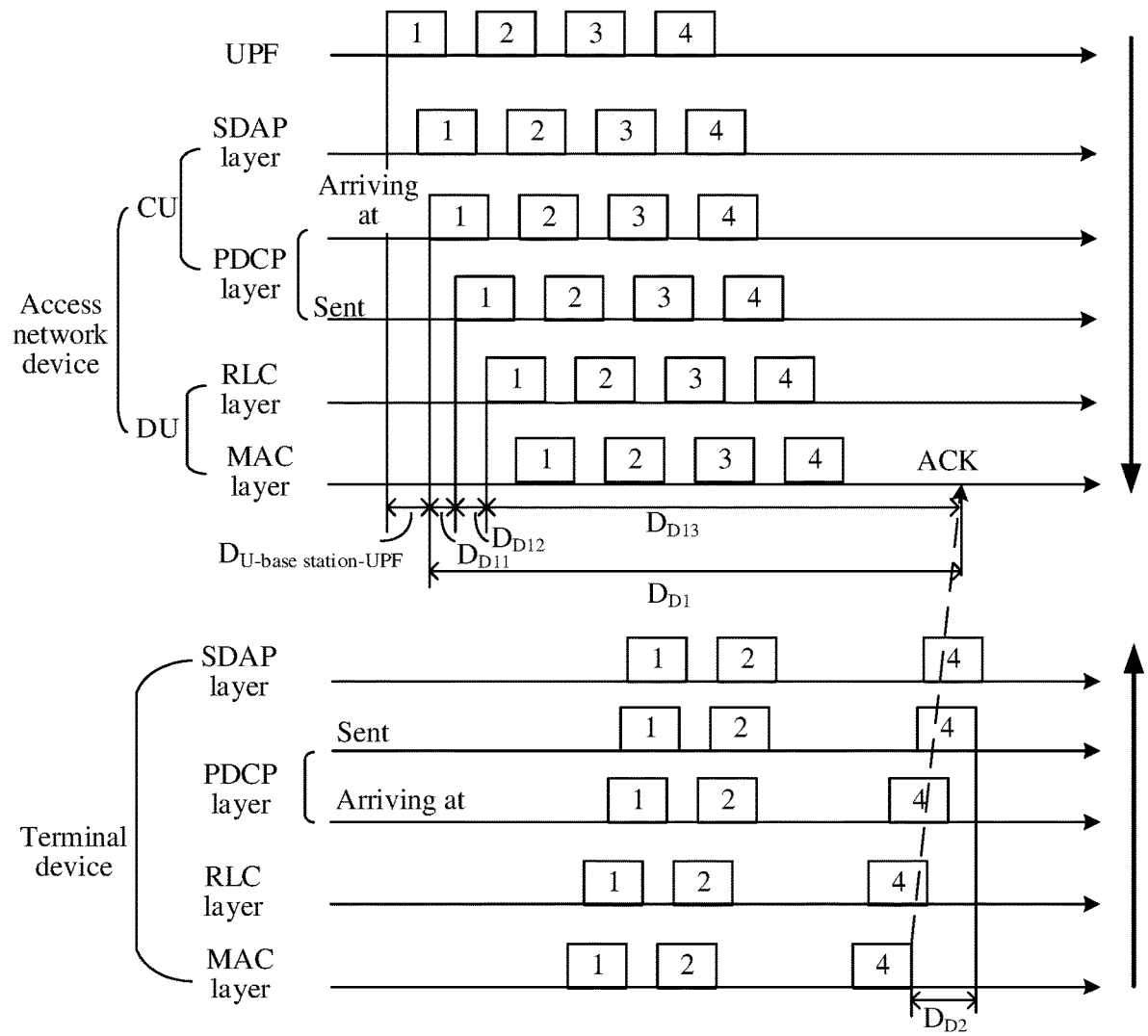
FIG. 15 is a schematic diagram of transmitting an uplink burst in a scenario of packet loss and out-of-order arrival according to an embodiment of this application.

FIG. 15 is a schematic diagram of transmitting an uplink burst in a scenario of packet loss and out-of-order arrival.

Refer to FIG. 15. The UPF sends the four data packets to the SDAP layer of the access network device, and the four data packets arrive at the SDAP layer of the access network device. The access network device sequentially delivers the four data packets to the MAC layer of the access network device from top to bottom. The access network device sends the four data packets to the terminal device, and the four data packets arrive at the MAC layer of the terminal device from the MAC layer of the access network device. However, in an air interface transmission process, packet loss and out-of-order arrival occur. To be specific, the data packet 3 does not arrive at the MAC layer of the access network device, and the data packet 4 arrives at the MAC layer of the access network device before a time at which the data packet 3 needs to arrive.

Assuming that the terminal device successfully receives the data packet 1, the data packet 2, and the data packet 4, the terminal device sends three pieces of feedback information to the MAC layer of the access network device. FIG. 15 shows only feedback information (for example, an ACK) of the last data packet 4, and other feedback information is not shown.

In a process in which the terminal device delivers a data packet, the terminal device sequentially delivers the received data packet 1, data packet 2, and data packet 4 to the PDCP layer from bottom to top. When in-order delivery is configured at the PDCP layer, even if the PDCP layer has received the data packet 4, the PDCP layer delivers the data packet 4 to the SDAP layer only after the PDCP layer does not receive the data packet 3 within preset duration.

In embodiments of this application, a downlink delay of a downlink burst between the terminal device and the access network device is denoted as $D_{D\text{-}UE\text{-}base\ station}$, a downlink delay of a downlink burst between the terminal device and the core network device is denoted as $D_{D\text{-}UE\text{-}UPF}$, and a downlink delay of a downlink burst between the access network device and the core network device is denoted as DD-base station-UPF.

The following describes the foregoing three delays in detail with reference to the scenarios shown in FIG. 12 to FIG. 15.

1. Downlink Delay $D_{D\text{-}base\ station\text{-}UPF}$

The downlink delay $D_{D\text{-}base\ station\text{-}UPF}$ indicates a delay, between the core network device and the access network device, of the first data packet (for example, the data packet 1 shown in FIG. 12 to FIG. 15) that is sent from the core network device in the downlink burst, for example, duration corresponding to the downlink delay $D_{D\text{-}base\ station\text{-}UPF}$ shown in FIG. 12 to FIG. 15. It should be understood that the downlink delay $D_{D\text{-}base\ station\text{-}UPF}$ is a delay at a granularity of a data packet.

In some embodiments, the downlink delay $D_{D\text{-}base\ station\text{-}UPF}$ includes duration from a time $T_{D0}$ to a time $T_{D1.1}$.

The time $T_{D0}$ is a sending time of the first data packet that is sent from the core network device in the downlink burst, for example, a start time of the duration corresponding to the downlink delay $D_{D\text{-}base\ station\text{-}UPF}$ shown in FIG. 12 to FIG. 15.

In an example, the time $T_{D0}$ may be a sending time of the first data packet that is sent from a GTP tunnel egress of an interface (for example, an N3 interface) between the core network device and the access network device in the downlink burst.

For example, during implementation, the time $T_{D0}$ may be determined based on an average value of sending times of data packets that are sent from a GTP tunnel egress of the core network device in the downlink burst.

The time $T_{D1.1}$ is an arrival time of the first data packet that arrives at the access network device in the downlink burst.

In an example, the time $T_{D1.1}$ may be an arrival time of the first data packet that arrives at a GTP tunnel ingress of an interface (for example, an N3 interface) between the access network device and the core network device in the downlink burst.

In another example, the time $T_{D1.1}$ may be an arrival time of the first data packet that arrives at the SDAP layer of the access network device in the downlink burst.

Because a time of data at the SDAP layer is very short and may be ignored, the time $T_{D1.1}$ may be any one of the following:

In an example, the time $T_{D1.1}$ may be an arrival time of the first data packet that arrives at the PDCP layer of the access network device in the downlink burst, for example, an end time of the duration corresponding to the downlink delay $D_{D\text{-}base\ station\text{-}UPF}$ shown in FIG. 12 to FIG. 15.

In 4G, the time $T_{D1.1}$ may be an arrival time of the first data packet that arrives at the PDCP layer of the access network device in the downlink burst.

2. Downlink Delay $D_{D\text{-}UE\text{-}base\ station}$

There are two possible cases (Case 1 and Case 2) of the downlink delay $D_{D\text{-}UE\text{-}base\ station}$ in embodiments of this application. The following describes the downlink delay $D_{D\text{-}UE\text{-}base\ station}$ in different cases.

Case 1

The downlink delay $D_{D\text{-}UE\text{-}base\ station}$ includes a downlink delay $D_{D1}$ and a downlink delay $D_{D2}$.

The downlink delay $D_{D1}$ may be understood as duration from a time at which the access network device receives the downlink burst from the core network device to a time at which the terminal device sends or the access network device receives the last piece of feedback information. The downlink delay $D_{D2}$ may be understood as a delay of delivering a downlink burst at protocol layers of the terminal device.

The following describes the downlink delay $D_{D1}$ and the downlink delay $D_{D2}$ in detail.

Downlink Delay $D_{D1}$

In some embodiments, the downlink delay $D_{D1}$ includes duration from a time $T_{D1.1}$ to a time $T_{D3}$, for example, duration corresponding to $D_{D1}$ in FIG. 12 to FIG. 15.

For descriptions of the time $T_{D1.1}$, refer to the foregoing related descriptions. Details are not described again.

The time $T_{D3}$ may be understood as a time at which the terminal device successfully receives the last data packet in the downlink burst. Because feedback information may indicate whether the terminal device successfully receives a data packet, in this embodiment of this application, a time at which the terminal device sends or the access network device receives the last piece of feedback information is used to indicate the time $T_{D3}$.

In an example, the time $T_{D3}$ is an arrival time of the last piece of feedback information that arrives at the MAC layer of the access network device, and the last piece of feedback information indicates that the terminal device successfully receives a data packet in the downlink burst.

In another example, the time $T_{D3}$ is a sending time at which the terminal device sends the last piece of feedback information from the physical layer of the terminal device. In this example, $T_{D3}$ is a time configured by the access network device.

For example, the access network device schedules the UE to transmit a downlink data packet. To receive HARQ feedback, the access network device may send, to the UE, indication information indicating a time at which the terminal device sends feedback information. The time at which the feedback information is sent and that is indicated by the indication information is the time $T_{D3}$.

It should be noted that feedback resources for a plurality of downlink data packets that the access network device schedules the UE to transmit may be a same feedback resource, and the terminal device may simultaneously send a plurality of pieces of feedback information on the same feedback resource.

In embodiments of this application, the data packet corresponding to the last piece of feedback information indicates the last data packet that is successfully received by the terminal device in the downlink burst, and the last data packet that is successfully received by the terminal device in the downlink burst may be any data packet in the downlink burst. For example, the last data packet that is successfully received by the terminal device in the downlink burst may be the last data packet that arrives at the MAC layer of the access network device in the downlink burst, or may be another data packet in the downlink burst. This specifically depends on a status of successfully receiving a data packet by the terminal device.

For example, the four data packets arrive at the terminal device in a sequence of the data packet 1, the data packet 2, the data packet 3, and the data packet 4, and the four data packets are successfully received by the terminal device at a time. The terminal device may sequentially send feedback information of the four data packets. In this case, the last piece of feedback information corresponds to the last data packet 4 that arrives at the MAC layer of the terminal device.

For another example, the four data packets arrive at the terminal device in a sequence of the data packet 1, the data packet 2, the data packet 3, and the data packet 4. The data packet 1, the data packet 2, and the data packet 4 are successfully received by the terminal device at a time, but the data packet 3 can be successfully received by the terminal device only after being retransmitted for a plurality of times. The terminal device sequentially sends feedback information of the three data packets, and subsequently sends feedback information of the data packet 3 after the data packet 3 is successfully retransmitted for a plurality of times. In this case, the last piece of feedback information corresponds to the data packet 3 that arrives at the MAC layer earlier than the data packet 4.

It should be noted that, in a scenario in which a data packet of the downlink burst is segmented at the RLC layer of the access network device, a complete data packet is used as an example. If the access network device segments the complete data packet at the RLC layer, after the complete data packet arrives at the MAC layer of the terminal device, the terminal device sends feedback information for each data packet segment of the complete data packet. If a data packet segment of the complete data packet is finally successfully received by the terminal device, the last piece of feedback information corresponds to the data packet segment of the complete data packet.

For example, in the scenario in which a data packet is segmented shown in FIG. 13, the data packet 4 is divided into the data packet 4.1 and the data packet 4.2, the data packet 4 is a complete data packet, and the data packet 4.2 is the last data packet successfully received by the terminal device. In this case, the last piece of feedback information corresponds to the data packet 4.2.

In the scenario in which the DU and the CU of the access network device are separated, the downlink delay $D_{D1}$ includes, for example, three parts of delays, and the three parts of delays include a delay $D_{D11}$, a delay $D_{D12}$, and a delay $D_{D13}$.

The delay $D_{D11}$ may be understood as a delay of processing a data packet by the CU, and includes duration from the time $T_{D1.1}$ to a time $T_{D1.2}$, for example, duration corresponding to $D_{D11}$ in FIG. 12 to FIG. 15.

For descriptions of the time $T_{D1.1}$, refer to the foregoing related descriptions. Details are not described again.

In an example, the time $T_{D1.2}$ is a sending time of the first data packet (for example, the data packet 1 in FIG. 12 to FIG. 15) that is sent from a PDCP layer of the CU in the downlink burst.

In another example, $T_{D1.2}$ may be a sending time of the first data packet (for example, the data packet 1 in FIG. 12 to FIG. 15) that is sent from a GTP tunnel egress of an F1-U interface of the CU in the downlink burst. The delay $D_{D12}$ may be understood as a delay of transmitting a data packet between the CU and the DU, and includes duration from $T_{D1.2}$ to a time $T_{D1.3}$, for example, duration corresponding to $D_{D12}$ in FIG. 12 to FIG. 15.

In an example, the time $T_{D1.3}$ is an arrival time of the first data packet (for example, the data packet 1 in FIG. 12 to FIG. 15) that arrives at an RLC layer of the DU in the downlink burst.

In another example, $T_{D1.3}$ may be an arrival time of the first data packet (for example, the data packet 1 in FIG. 12 to FIG. 15) that arrives at a GTP tunnel ingress of an F1-U interface of the DU in the downlink burst. The delay $D_{D13}$ may be understood as a sum of a delay of processing a data packet by the DU and an air interface delay of the downlink burst between the access network device and the terminal device. The delay $D_{D13}$ includes duration from the time $T_{D1.3}$ to the time $T_{D3}$, for example, duration corresponding to the delay $D_{D13}$ in FIG. 12 to FIG. 15.

Downlink Delay $D_{D2}$

The downlink delay $D_{D2}$ may be understood as a delay of delivering a downlink burst at protocol layers of the terminal device.

The downlink delay $D_{D2}$ includes duration from a time $T_{D2.1}$ to a time $T_{D2.2}$, for example, duration corresponding to $D_{D2}$ in FIG. 12 to FIG. 15.

The time $T_{D2.1}$ is an arrival time of the last data packet (for example, the data packet 4 in FIG. 12, the data packet 4.2 in FIG. 13, the data packet 3 in FIG. 14, or the data packet 4 in FIG. 15) that arrives at the MAC layer of the terminal device in the downlink burst.

In a scenario in which a data packet in a downlink burst is segmented at the RLC layer of the access network device, if a complete data packet is segmented at the RLC layer of the access network device, and a data packet segment of the complete data packet finally arrives at the MAC layer of the terminal device, the last data packet that arrives at the MAC layer of the terminal device in the downlink burst in embodiments of this application is a data packet segment of the complete data packet. For example, in the scenario shown in FIG. 13, the last data packet that arrives at the MAC layer of the terminal device is the data packet 4.2.

The time $T_{D2.2}$ is a sending time of the last data packet (for example, the data packet 4 in FIG. 12 to FIG. 15) that is sent from the PDCP layer of the terminal device in the downlink burst.

It should be understood that a sending time of a data packet that is sent from the PDCP layer of the terminal device in embodiments of this application indicates a sending time of a data packet from the PDCP layer to an upper layer, indicates a sending time of a data packet that is sent from the PDCP layer to the SDAP layer in 5G, and indicates a sending time of a data packet that is sent from the PDCP layer to the application layer in 4G.

Case 2

The downlink delay DD-UE-base station includes a downlink delay DD1, and does not relate to a downlink delay DD2 of delivering a downlink burst at protocol layers of the terminal device. For specific descriptions of the downlink delay $D_{D1}$, refer to the foregoing related descriptions in Case 1. Details are not described again.

3. Downlink Delay $D_{D\text{-}UE\text{-}UPF}$

The downlink delay $D_{D\text{-}UE\text{-}UPF}$ indicates a delay of the downlink burst between the terminal device and the core network device, and includes a downlink delay $D_{D\text{-}UE\text{-}base\ station}$ and a downlink delay $D_{D\text{-}base\ station\text{-}UPF}$. For specific descriptions of the downlink delay $D_{D\text{-}UE\text{-}base\ station}$ and the downlink delay $D_{D\text{-}base\ station\text{-}UPF}$, refer to the foregoing related descriptions. Details are not described again.

With reference to FIG. 16 to FIG. 20, the following describes in detail a burst monitoring method in downlink transmission in embodiments of this application by using the foregoing defined delay of the downlink burst.

Figure 16:
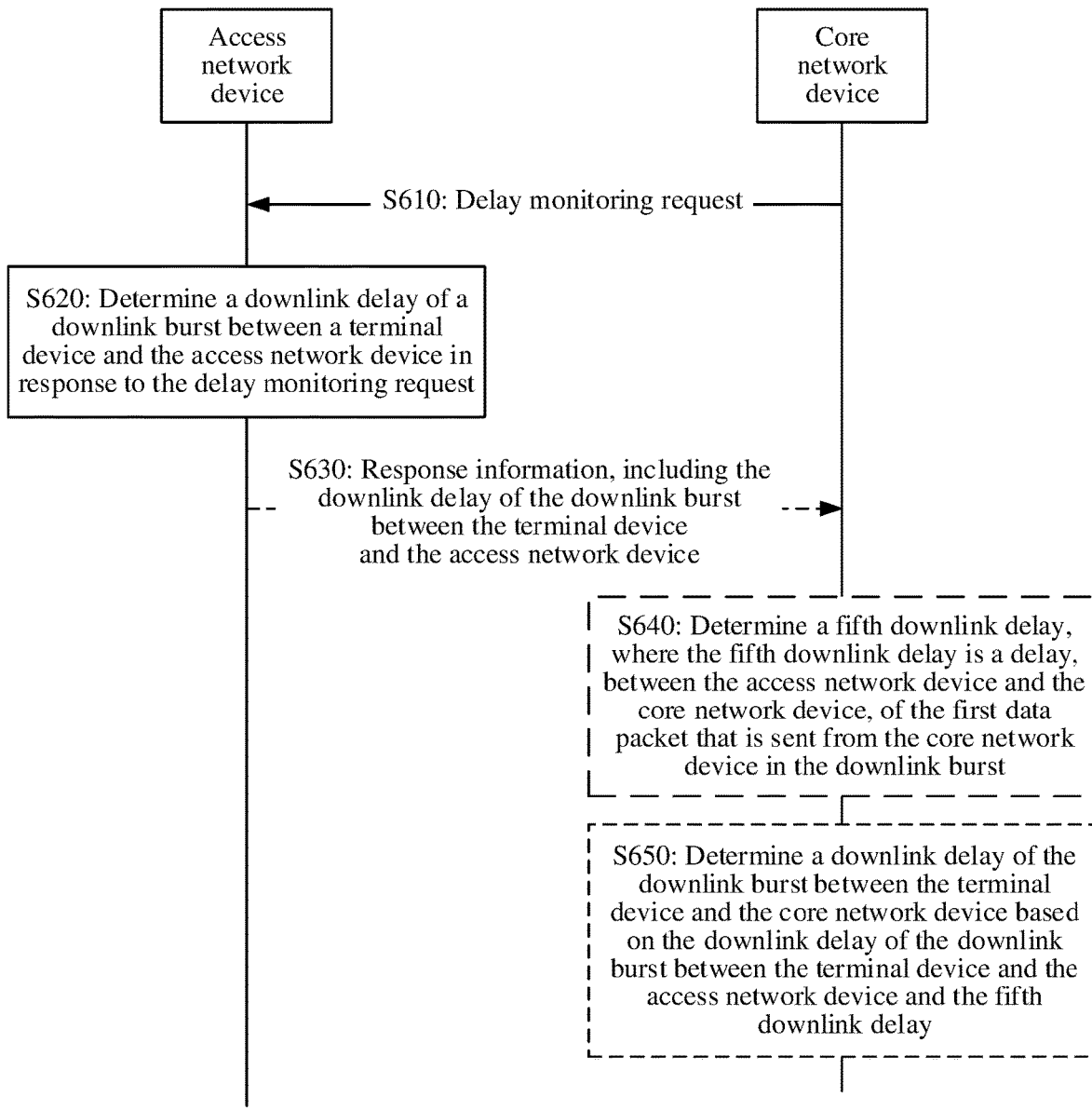
FIG. 16 is a schematic flowchart of a burst monitoring method 600 in downlink transmission according to an embodiment of this application.

FIG. 16 is a schematic flowchart of a burst monitoring method 600 in downlink transmission according to an embodiment of this application.

In S610, a core network device sends a delay monitoring request to an access network device, where the delay monitoring request indicates to perform delay monitoring on a periodic burst.

In this embodiment of this application, the downlink burst is periodic, and the delay monitoring request indicates to perform delay monitoring on a downlink burst in each of one or more periods, to determine a transmission delay of the periodic downlink burst between a terminal device and the access network device.

The delay monitoring request may be independent information, or may be content carried in other information. This is not limited in this embodiment of this application.

For example, the delay monitoring request may be a field carried in DL PDU SESSION INFORMATION.

In S620, the access network device determines a downlink delay of the downlink burst between the terminal device and the access network device in response to the delay monitoring request, where the downlink delay of the downlink burst between the terminal device and the access network device includes a first downlink delay, the first downlink delay includes duration from a first time to a second time, the first time is an arrival time of the first data packet that arrives at a packet data convergence protocol PDCP layer of the access network device in the downlink burst, and the second time is an arrival time of the last piece of feedback information that arrives at a media access control MAC layer of the access network device, or the second time is a sending time of the last piece of feedback information that is sent from a physical layer of the terminal device, where the feedback information indicates that the terminal device successfully receives a data packet in the downlink burst.

The access network device receives the delay monitoring request, and determines the downlink delay of the downlink burst between the terminal device and the access network device.

In this embodiment, the first time may be understood as a start time of the downlink burst between the terminal device and the access network device, and the second time may be understood as an end time of the downlink burst between the terminal device and the access network device.

The downlink delay of the downlink burst between the terminal device and the access network device is the foregoing downlink delay $D_{D\text{-}UE\text{-}base\ station}$, the first downlink delay is the foregoing delay $D_{D1}$, the first time is the foregoing time $T_{D1.1}$, and the second time is the foregoing time $T_{D3}$. For specific descriptions of the downlink delay $D_{D\text{-}UE\text{-}base\ station}$, the delay $D_{D1}$, the time $T_{D1.1}$, and the time $T_{D3}$, refer to the foregoing related descriptions. Details are not described again.

In some embodiments, the access network device may determine, based on a burst number of the downlink burst, the first data packet that arrives at the PDCP layer of the access network device in the downlink burst.

For example, the access network device may determine, based on a change of the burst number of the downlink burst, the first data packet that arrives at the PDCP layer of the access network device in the downlink burst. For example, the PDCP layer of the access network device first receives a data packet in a downlink burst whose burst number is 1, and subsequently receives a data packet in a downlink burst whose burst number is 2. Because the burst number has changed from 1 to 2, it means that the downlink burst whose burst number is 1 has been finished. In this case, the first data packet that is in the downlink burst whose burst number is 2 and that is received from the PDCP layer of the access network device is the first data packet that arrives at the PDCP layer of the access network device.

In some other embodiments, the access network device may determine, based on a periodicity of the downlink burst, the first data packet that arrives at the PDCP layer of the access network device in the downlink burst.

For example, the access network device may start monitoring from a start time of the periodicity, and the first data packet that is received from the PDCP layer of the access network device in the periodicity is the first data packet in the downlink burst transmitted in the periodicity.

Similarly, in this embodiment of this application, a manner in which the access network device determines the first data packet that arrives at a protocol layer of the access network device in the downlink burst may be determined based on the number or the periodicity of the downlink burst, and a manner in which the access network device determines the first data packet that is sent from a protocol layer of the access network device in the downlink burst may also be determined based on the number or the periodicity of the downlink burst. For a specific process, refer to the descriptions herein. Details are not described subsequently.

In some embodiments, the access network device may determine, based on a burst number of the downlink burst, the last piece of feedback information that arrives at the MAC layer of the access network device.

For example, the access network device may determine, based on a change of the burst number of the downlink burst, the last piece of feedback information that arrives at the MAC layer of the access network device in the downlink burst. For example, the MAC layer of the access network device first receives feedback information of a data packet in a downlink burst whose burst number is 1, and subsequently receives feedback information of a data packet in a downlink burst whose burst number is 2. Because the burst number has changed from 1 to 2, it means that the feedback information of the data packet in the downlink burst whose burst number is 1 has been sent. In this case, the last piece of feedback information before the MAC layer of the access network device starts to receive the feedback information of the downlink burst whose burst number is 2 is the last piece of feedback information that arrives at the MAC layer of the access network device in the downlink burst whose burst number is 1.

Similarly, the terminal device may also determine, based on the burst number of the downlink burst, the last piece of feedback information that is sent from the physical layer of the terminal device. For specific descriptions, refer to the foregoing descriptions. Details are not described again.

According to the burst monitoring method provided in this embodiment of this application, a method for monitoring a delay of a downlink burst is provided. An access network device determines a downlink delay based on a delay monitoring request for the downlink burst that is sent by a core network device. The downlink delay includes a first downlink delay from a first time to a second time, the first time is an arrival time of the first data packet that arrives at a packet data convergence protocol PDCP layer of the access network device in the downlink burst, and the second time is an arrival time of the last piece of feedback information that arrives at a MAC layer of the access network device or a sending time of the last piece of feedback information that is sent from a physical layer of a terminal device. In this way, a process in which the access network device monitors the downlink delay of the downlink burst between the terminal device and the access network device is implemented, so that the access network device can more accurately evaluate data transmission performance based on the downlink delay of the downlink burst, thereby improving user experience.

In some embodiments, the downlink delay of the downlink burst between the terminal device and the access network device further includes a fourth downlink delay, the fourth downlink delay includes duration from a fourth time to a fifth time, the fourth time is an arrival time of the last data packet that arrives at a MAC layer of the terminal device in the downlink burst, and the fifth time is a sending time of the last data packet that is sent from a PDCP layer of the terminal device in the downlink burst.

In this embodiment, the fifth time may be understood as an end time of the downlink burst between the terminal device and the access network device.

The fourth downlink delay is the foregoing downlink delay $D_{D2}$, the fourth time is the foregoing time $T_{D2.1}$, and the fifth time is the foregoing time $T_{D2.2}$. For specific descriptions of the downlink delay $D_{D2}$, the time $T_{D2.1}$, and the time $T_{D2.2}$, refer to the foregoing related descriptions. Details are not described again.

In an example, the terminal device determines the fourth downlink delay, and sends the fourth downlink delay to the access network device. Correspondingly, the access network device receives the fourth downlink delay.

The access network device determines the first downlink delay, and determines the downlink delay of the downlink burst between the terminal device and the access network device based on the fourth downlink delay and the first downlink delay.

In an example, the terminal device may collect statistics on fourth downlink delays of a plurality of downlink bursts, to obtain an average value of the plurality of fourth downlink delays, and may use the average value as the fourth downlink delay of the downlink burst.

The downlink delay of the downlink burst between the terminal device and the access network device includes the first downlink delay and the fourth downlink delay. Simply speaking, the access network device adds the two delays to obtain the downlink delay of the downlink burst between the terminal device and the access network device.

In some other embodiments, the terminal device may determine, based on a periodicity of the downlink burst, the last data packet that arrives at the MAC layer of the terminal device in the downlink burst.

For example, the terminal device may start monitoring from a start time of the periodicity, and the last data packet that is received from the MAC layer in the periodicity is the last data packet that arrives at the MAC layer of the terminal device in the downlink burst transmitted in the periodicity.

Similarly, in this embodiment of this application, a manner in which the terminal device determines the last data packet that arrives at a protocol layer of the terminal device in the downlink burst may be determined based on the periodicity of the downlink burst, and a manner in which the terminal device determines the last data packet that is sent from a protocol layer of the terminal device in the downlink burst may also be determined based on the periodicity of the downlink burst. For a specific process, refer to the descriptions herein. Details are not described subsequently.

According to the burst monitoring method provided in this embodiment of this application, the downlink delay of the downlink burst between the terminal device and the access network device further includes a delay of the downlink burst that is delivered at protocol layers of the terminal device, so that the access network device can more accurately monitor the downlink delay of the downlink burst. Therefore, the access network device can more accurately evaluate data transmission performance based on the downlink delay of the downlink burst, thereby further improving user experience.

This embodiment of this application provides two downlink delay monitoring methods (denoted as a manner A and a manner B). Manner A is mainly used to collect statistics on the downlink delay of the downlink burst between the terminal device and the access network device by segment, to obtain the downlink delay of the downlink burst between the terminal device and the access network device. This manner is applicable to a scenario in which a DU and a CU of the access network device are separated. Manner B is mainly used to determine the downlink delay of the downlink burst between the terminal device and the access network device based on the first time and the second time of the downlink burst. Manner B is not limited to the scenario in which the DU and the CU are separated, and may also be applied to a scenario in which the DU and the CU are not separated.

The following separately describes in detail, based on Manner A and Manner B, a method for monitoring a downlink delay of a downlink burst.

Manner A

In some embodiments, the access network device mainly collects statistics on two delays by segment, that is, a second downlink delay and a third downlink delay.

That is, the first downlink delay includes a second downlink delay and a third downlink delay, the second downlink delay includes duration from a third time to the second time, the third downlink delay includes duration from the first time to the third time, and the third time is an arrival time of the first data packet that arrives at a radio link control RLC layer of the access network device in the downlink burst.

The first time is the arrival time of the first data packet that arrives at the packet data convergence protocol PDCP layer of the access network device in the downlink burst, that is, the foregoing time $T_{D1.1}$. The second time is the arrival time of the last piece of feedback information that arrives at the MAC layer of the access network device or the sending time of the last piece of feedback information that is sent from the physical layer of the terminal device, that is, the foregoing time $T_{D3}$. The third time is the foregoing time $T_{D1.3}$. For specific descriptions of each time, refer to the foregoing related descriptions. Details are not described again.

In the scenario in which the DU and the CU are separated, specifically, the first time is an arrival time of the first data packet that arrives at a PDCP layer of the CU in the downlink burst, the second time is an arrival time of the last piece of feedback information that arrives at a MAC layer of the DU or a sending time of the last piece of feedback information that is sent from the physical layer of the terminal device, and the third time is an arrival time of the first data packet that arrives at an RLC layer of the DU in the downlink burst.

The second downlink delay is the foregoing delay $D_{D13}$, and the third downlink delay includes the foregoing delay $D_{D11}$ and delay $D_{D12}$. For specific descriptions of each delay, refer to the foregoing related descriptions. Details are not described again.

In a first case, the downlink delay of the downlink burst between the terminal device and the access network device includes the first downlink delay and the fourth downlink delay.

Based on this, in some embodiments, that the access network device determines a downlink delay of the downlink burst between the terminal device and the access network device in response to the delay monitoring request includes:

The access network device determines the second downlink delay and the third downlink delay in response to the delay monitoring request.

The access network device determines the fourth downlink delay.

The access network device determines the downlink delay of the downlink burst between the terminal device and the access network device based on the second downlink delay, the third downlink delay, and the fourth downlink delay.

In an example, the access network device receives the fourth downlink delay sent by the terminal device, to determine the fourth downlink delay. The fourth downlink delay is the foregoing downlink delay $D_{D2}$. For specific descriptions, refer to the foregoing related descriptions. Details are not described again.

In some embodiments, in the scenario in which the DU and the CU are separated, that the access network device determines a downlink delay of the downlink burst between the terminal device and the access network device in response to the delay monitoring request includes:

The DU determines the second downlink delay in response to the delay monitoring request.

The DU sends the second downlink delay to the CU.

The CU determines the fourth downlink delay.

The CU determines the third downlink delay in response to the delay monitoring request.

The CU determines the downlink delay of the downlink burst between the terminal device and the access network device based on the second downlink delay, the third downlink delay, and the fourth downlink delay.

In an example, the terminal device sends the fourth downlink delay to the CU, so that the CU determines the fourth downlink delay.

In an example, the DU may determine the second downlink delay based on the third time and the second time, that is, the DU first determines the third time and the second time, and then determines the second downlink delay.

In an example, the CU may determine the third downlink delay based on the first time and the third time, that is, the CU first determines the first time and the third time, and then determines the third downlink delay.

In another example, the CU may determine the third downlink delay based on the delay $D_{D11}$, and the delay $D_{D12}$, that is, the CU first determines the delay $D_{D11}$ and the delay $D_{D12}$, and then determines the third downlink delay.

In a scenario in which a CU-UP and a CU-CP of the CU are separated, for example, the CU-UP determines the third downlink delay, and determines the downlink delay of the downlink burst between the terminal device and the access network device based on the third downlink delay, the second downlink delay, and the fourth downlink delay.

According to the burst monitoring method provided in this embodiment of this application, the scenario in which the DU and the CU of the access network device are separated is supported. The DU reports a second downlink delay of a downlink burst between the DU and the terminal device to the CU, and the CU determines the downlink delay of the downlink burst between the terminal device and the access network device based on the second downlink delay, a third downlink delay that is determined by the CU and that is generated because the downlink burst is transmitted between the CU and the DU and the CU processes the downlink burst, and a fourth downlink delay of the downlink burst that is obtained by the CU and that is generated because data is delivered on the terminal device. That is, the DU and the CU collect statistics on delays related to the DU and the CU by segment, so that the downlink delay of the downlink burst can be monitored in the scenario in which the DU and the CU are separated.

In a second case, the downlink delay of the downlink burst between the terminal device and the access network device includes the first downlink delay, but does not include the fourth downlink delay.

Based on this, in some embodiments, that the access network device determines a downlink delay of the downlink burst between the terminal device and the access network device in response to the delay monitoring request includes:

The access network device determines the second downlink delay and the third downlink delay in response to the delay monitoring request.

The access network device determines the downlink delay of the downlink burst between the terminal device and the access network device based on the second downlink delay and the third downlink delay.

In some embodiments, in the scenario in which the DU and the CU are separated, that the access network device determines a downlink delay of the downlink burst between the terminal device and the access network device in response to the delay monitoring request includes:

The DU determines the second downlink delay in response to the delay monitoring request.

The DU sends the second downlink delay to the CU.

The CU determines the third downlink delay in response to the delay monitoring request.

The CU determines the downlink delay of the downlink burst between the terminal device and the access network device based on the second downlink delay and the third downlink delay.

In a scenario in which a CU-UP and a CU-CP of the CU are separated, for example, the CU-UP determines the third downlink delay, and determines the downlink delay of the downlink burst between the terminal device and the access network device based on the third downlink delay and the second downlink delay.

According to the burst monitoring method provided in this embodiment of this application, the scenario in which the DU and the CU of the access network device are separated is supported. The DU reports a second downlink delay of a downlink burst between the DU and the terminal device to the CU, and the CU determines the downlink delay of the downlink burst between the terminal device and the access network device based on the second downlink delay and a third downlink delay that is determined by the CU and that is generated because the downlink burst is transmitted between the CU and the DU and the CU processes the downlink burst. That is, the DU and the CU collect statistics on delays related to the DU and the CU by segment, so that the downlink delay of the downlink burst can be monitored in the scenario in which the DU and the CU are separated.

Manner B

In a first case, the downlink delay of the downlink burst between the terminal device and the access network device includes the first downlink delay and the fourth downlink delay.

Based on this, in some embodiments, that the access network device determines a downlink delay of the downlink burst between the terminal device and the access network device in response to the delay monitoring request includes:

The access network device determines the first time and the second time in response to the delay monitoring request.

The access network device determines the fourth downlink delay.

The access network device determines the downlink delay of the downlink burst between the terminal device and the access network device based on the fourth downlink delay, the first time, and the second time.

In this embodiment, the first time is an arrival time of the first data packet that arrives at the PDCP layer of the access network device in the downlink burst, that is, the foregoing time $T_{D1.1}$. The second time is the arrival time of the last piece of feedback information that arrives at the MAC layer of the access network device or the sending time of the last piece of feedback information that is sent from the physical layer of the terminal device, that is, the foregoing time $T_{D3}$. For specific descriptions of each time, refer to the foregoing related descriptions. Details are not described again. The duration from the first time to the second time is the first downlink delay in this embodiment of this application.

In the scenario in which the DU and the CU are separated, specifically, the first time is an arrival time of the first data packet that arrives at a PDCP layer of the CU in the downlink burst, the second time is an arrival time of the last piece of feedback information that arrives at a MAC layer of the DU or a sending time of the last piece of feedback information that is sent from the physical layer of the terminal device, and the third time is an arrival time of the first data packet that arrives at an RLC layer of the DU in the downlink burst.

When the second time is the sending time of the last piece of feedback information that is sent from the physical layer of the terminal device, the second time is configured by a base station for the terminal device, and the access network device may determine the second time based on the configuration. For example, the access network device schedules the UE to transmit a downlink data packet. To receive HARQ feedback, the access network device may send, to the UE, indication information indicating a time at which the terminal device sends feedback information. The time that is indicated by the indication information and at which the feedback information is sent is the time $T_{D3}$.

In some embodiments, in the scenario in which the DU and the CU are separated, that the access network device determines a downlink delay of the downlink burst between the terminal device and the access network device in response to the delay monitoring request includes:

The DU determines the second time in response to the delay monitoring request.

The DU sends the second time to the CU.

The CU determines the fourth downlink delay.

The CU determines the first time in response to the delay monitoring request.

The CU determines the downlink delay of the downlink burst between the terminal device and the access network device based on the first time, the second time, and the fourth downlink delay.

In an example, the terminal device sends the fourth downlink delay to the CU, so that the CU determines the fourth downlink delay.

In a scenario in which a CU-UP and a CU-CP of the CU are separated, for example, the CU-UP determines the downlink delay of the downlink burst between the terminal device and the access network device based on the fourth downlink delay, the first time, and the second time.

According to the burst monitoring method provided in this embodiment of this application, the scenario in which the DU and the CU of the access network device are separated is supported. The DU reports, to the CU, the second time (that is, an end time) for transmitting the downlink burst between the access network device and the terminal device, and the CU determines the downlink delay of the downlink burst between the terminal device and the access network device based on the second time, the first time (that is, a start time) of the downlink burst that is determined by the CU and that is on the CU, and the fourth downlink delay of the downlink burst that is obtained by the CU and that is generated because data is delivered on the terminal device. In this way, a process of monitoring the downlink delay of the downlink burst in the scenario in which the DU and the CU are separated can be implemented. In addition, compared with a manner in which the DU and the CU collect statistics on delays by segment, this method can obtain a more accurate downlink delay of the downlink burst.

In a second case, the downlink delay of the downlink burst between the terminal device and the access network device includes the first downlink delay, but does not include the fourth downlink delay.

Based on this, in some embodiments, that the access network device determines a downlink delay of the downlink burst between the terminal device and the access network device in response to the delay monitoring request includes:

The access network device determines the first time and the second time in response to the delay monitoring request.

The access network device determines the downlink delay of the downlink burst between the terminal device and the access network device based on the first time and the second time.

In some embodiments, in the scenario in which the DU and the CU are separated, that the access network device determines a downlink delay of the downlink burst between the terminal device and the access network device in response to the delay monitoring request includes:

The DU determines the second time in response to the delay monitoring request.

The DU sends the second time to the CU.

The CU determines the first time.

The CU determines the downlink delay of the downlink burst between the terminal device and the access network device based on the first time and the second time.

In a scenario in which a CU-UP and a CU-CP of the CU are separated, for example, the CU-UP determines the first time, and determines the downlink delay of the downlink burst between the terminal device and the access network device based on the first time and the received second time.

According to the burst monitoring method provided in this embodiment of this application, the scenario in which the DU and the CU of the access network device are separated is supported. The DU reports, to the CU, the second time (that is, an end time) for transmitting the downlink burst between the access network device and the terminal device, and the CU determines the downlink delay of the downlink burst between the terminal device and the access network device based on the second time and the first time (that is, a start time) of the downlink burst that is determined by the CU and that is on the CU. In this way, a process of monitoring the downlink delay of the downlink burst in the scenario in which the DU and the CU are separated can be implemented. In addition, compared with a manner in which the DU and the CU collect statistics on delays by segment, this method can obtain a more accurate downlink delay of the downlink burst.

In some embodiments, a downlink delay of the downlink burst between the terminal device and the core network device may be further determined based on the obtained downlink delay of the downlink burst between the terminal device and the access network device. Based on this, the burst monitoring method 600 in downlink transmission in this embodiment of this application further includes steps S630, S640, and S650.

In S630, the access network device sends response information to the core network device, where the response information includes the downlink delay of the downlink burst between the terminal device and the access network device.

The response information may be independent information, or may be content carried in other information. This is not limited in this embodiment of this application.

For example, the response information may be a field carried in UL PDU SESSION INFORMATION.

In S640, the core network device determines a fifth downlink delay, where the fifth downlink delay is a delay, between the access network device and the core network device, of the first data packet that is sent from the core network device in the downlink burst.

The fifth downlink delay is the foregoing downlink delay $D_{D\text{-base station-}UPF}$. For specific descriptions of the downlink delay $D_{D\text{-base station-}UPF}$, refer to the foregoing related descriptions. Details are not described again.

In an example, the access network device may determine the fifth downlink delay based on a sending time of the first data packet that is sent from the core network device in the downlink burst and the arrival time (that is, the first time) of the first data packet that arrives at the PDCP layer of the access network device in the downlink burst.

It should be understood that the first data packet that is sent from the core network device in the downlink burst and the first data packet that arrives at the PDCP layer of the access network device in the downlink burst are a same data packet, and the fifth downlink delay indicates a delay of one data packet. Therefore, the fifth downlink delay may alternatively be determined based on an average value of transmissions of a plurality of data packets (not limited to uplink data packets or downlink data packets) between the access network device and the core network device, or the fifth downlink delay may alternatively be obtained based on a transmission delay of any data packet between the access network device and the core network device.

In S650, the core network device determines a downlink delay of the downlink burst between the terminal device and the core network device based on the fifth downlink delay and the downlink delay of the downlink burst between the terminal device and the access network device.

The downlink delay of the downlink burst between the terminal device and the core network device includes the fifth downlink delay and the downlink delay of the downlink burst between the terminal device and the access network device. Simply speaking, the core network device adds the two delays to obtain the downlink delay of the downlink burst between the terminal device and the core network device.

The downlink delay of the downlink burst between the terminal device and the core network device is the foregoing downlink delay $D_{D\text{-}UE\text{-}UPF}$. For specific descriptions, refer to the foregoing related descriptions. Details are not described again.

According to the burst monitoring method provided in this embodiment of this application, a method for monitoring a delay of a downlink burst is provided. A core network device receives a downlink delay of a downlink burst that is between a terminal device and an access network device and that is sent by the access network device, and finally determines a downlink delay of the downlink burst between the terminal device and the core network device based on the downlink delay and a fifth downlink delay of the downlink burst that is between the access network device and the core network device and that is determined by the core network device. In this way, a process of monitoring the downlink delay of the downlink burst between the terminal device and the core network device is implemented, so that the core network device can more accurately evaluate data transmission performance based on the downlink delay of the downlink burst, thereby improving user experience.

Figure 17:
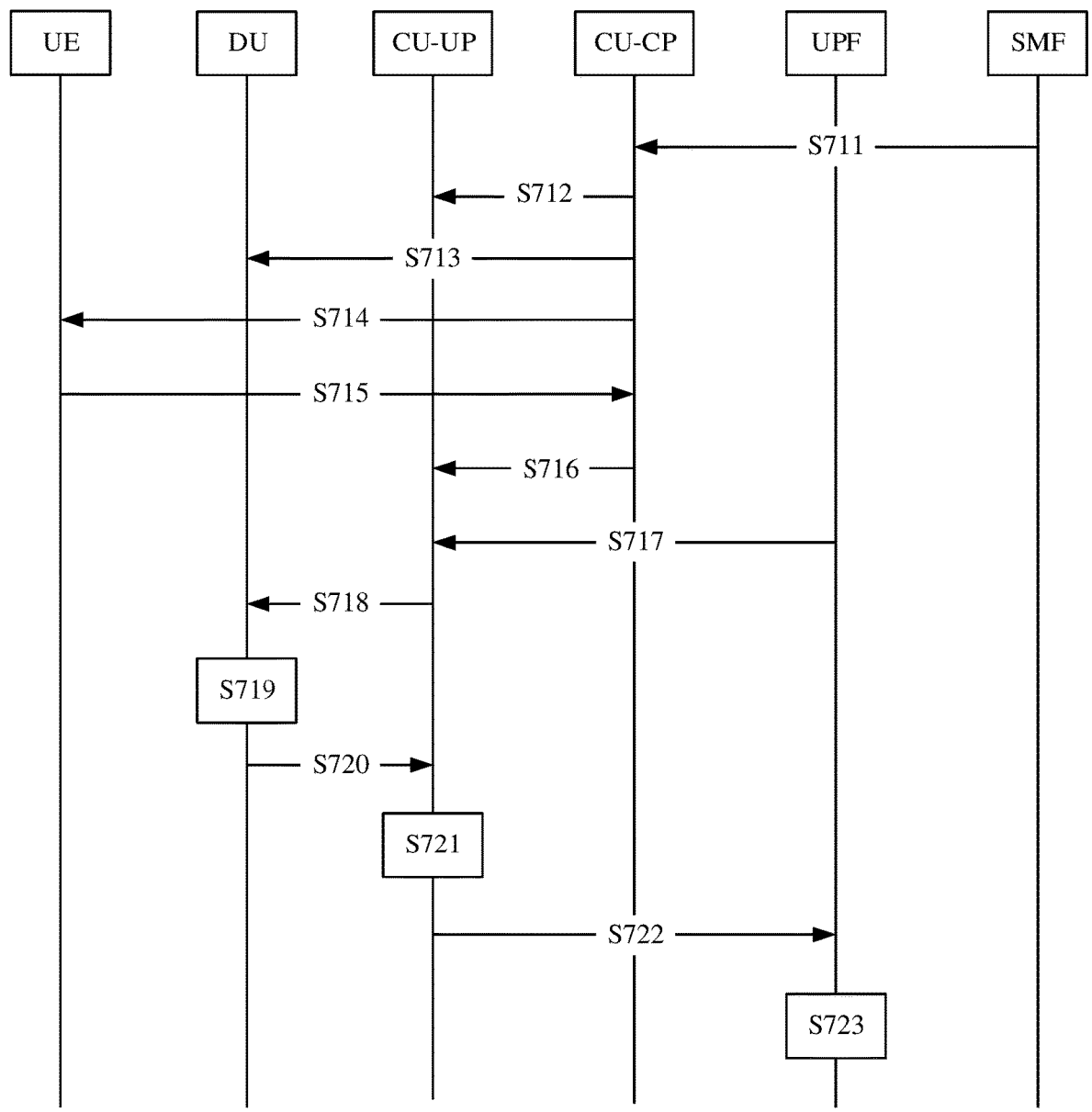
FIG. 17 is a schematic flowchart of a burst monitoring method 700 in downlink transmission in a scenario in which a DU and a CU of an access network device are separated according to an embodiment of this application.
Figure 18:
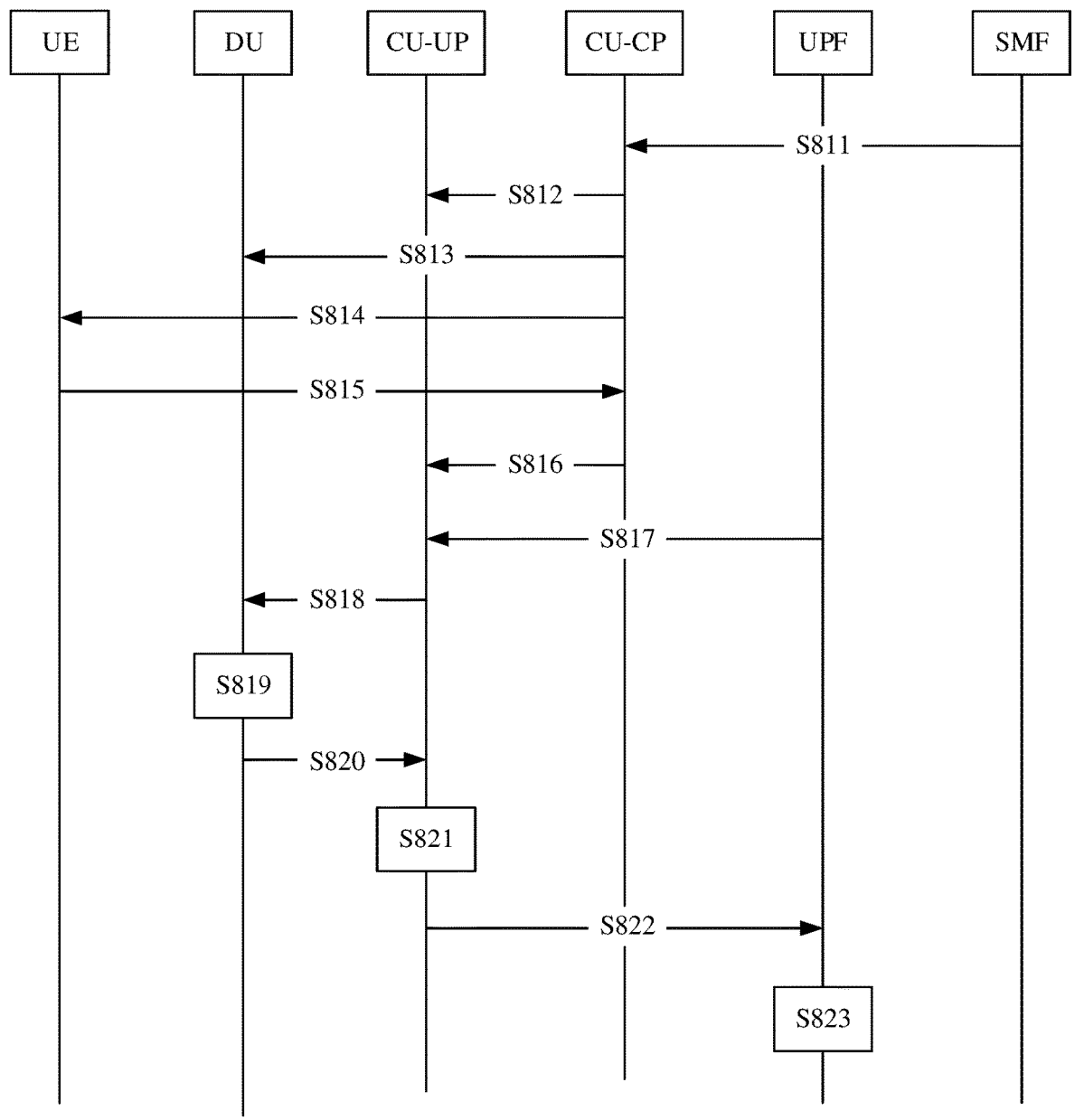
FIG. 18 is a schematic flowchart of a burst monitoring method 800 in downlink transmission in a scenario in which a DU and a CU of an access network device are separated according to an embodiment of this application.

In an example, with reference to FIG. 17 and FIG. 18, the following describes in detail a burst monitoring method in downlink transmission in a scenario in which a DU and a CU are separated. Network elements in the methods shown in FIG. 17 and FIG. 18 include a terminal device, an SMF and a UPF of a core network device, and a CU-CP and a CU-UP of an access network device. In addition, in a specific embodiment, the methods shown in FIG. 17 and FIG. 18 are described by using an example in which a downlink frame is used as a downlink burst and UE is used as a terminal device. For example, the downlink frame may be a video frame.

FIG. 17 is a schematic flowchart of a burst monitoring method 700 in downlink transmission in a scenario in which a DU and a CU of an access network device are separated according to an embodiment of this application. The method 700 corresponds to the embodiment of Manner A.

S711: The SMF sends a PDU SESSION RESOURCE SETUP REQUEST to the CU-CP, where the PDU SESSION RESOURCE SETUP REQUEST carries a QFI and a frame quality of service monitoring request.

For specific descriptions of the frame quality of service monitoring request, refer to the related descriptions of step S211 in the method 200. Details are not described again.

In this step, the frame monitoring transmission direction indicated by the frame quality of service monitoring request is downlink transmission.

S712: The CU-CP sends a BEARER CONTEXT SETUP REQUEST to the CU-UP, where the BEARER CONTEXT SETUP REQUEST carries a QFI and a frame quality of service monitoring request.

Correspondingly, the CU-UP receives the BEARER CONTEXT SETUP REQUEST sent by the CU-CP, and the CU-UP may perform the frame quality of service monitoring function for the DRB of the QFI.

S713: The CU-CP sends a UE CONTEXT SETUP REQUEST to the DU, where the UE CONTEXT SETUP REQUEST carries a QFI and a frame quality of service monitoring request.

Correspondingly, the DU receives the UE CONTEXT SETUP REQUEST from the CU-CP, and obtains the QFI and the corresponding frame quality of service monitoring request. The DU may perform the frame quality of service monitoring function for the DRB of the QFI.

S714: The CU-CP sends measurement configuration information (measureconfig) to the UE, where the measureconfig includes a delivery delay, on the terminal device, of the last data packet that arrives at a MAC layer in a downlink frame in which the UE is indicated to report the DRB, and the delivery delay, on the terminal device, of the last data packet that arrives at the MAC layer in the downlink frame is the foregoing fourth downlink delay, that is, the downlink delay $D_{D2}$.

S715: The UE collects statistics on the fourth downlink delay of the downlink frame of the DRB. The UE sends a measurement report to the CU-CP, where the measurement report carries an identifier (for example, an ID) of the DRB and the fourth downlink delay of the corresponding downlink frame.

Correspondingly, the CU-CP receives the measurement report, and obtains the fourth downlink delay of the downlink frame corresponding to the DRB.

S716: The CU-CP sends GNB-CU-CP measurement results information (GNB-CU-CP MEASUREMENT RESULTS INFORMATION) to the CU-UP, where the GNB-CU-CP MEASUREMENT RESULTS INFORMATION carries the identifier of the DRB and the fourth downlink delay $D_{D2}$ of the downlink frame corresponding to the identifier of the DRB.

S717: The UPF sends a data frame of DL PDU SESSION INFORMATION to the CU-UP, where the data frame carries a QoS monitoring frame (QMF). The QMF may be understood as the delay monitoring request in the method 600.

For example, Table 1 shows an example of the DL PDU SESSION INFORMATION. The DL PDU SESSION INFORMATION carries the QMF. For specific descriptions, refer to the foregoing related descriptions of Table 1.

S718: The CU-UP sends DL USER DATA (PDU Type 0) to the DU, where the DL USER DATA carries the QMF.

S719: The DU determines a second downlink delay of the downlink frame between the terminal device and the DU based on the QMF received in S718.

The second downlink delay is the delay $D_{D3}$. For specific descriptions, refer to the foregoing related descriptions. Details are not described again.

S720: The DU sends UL ASSISTANCE INFORMATION DATA (PDU Type 2) to the CU-UP, where the UL ASSISTANCE INFORMATION DATA carries the second downlink delay between the terminal device and the DU.

For example, Table 2 shows an example of the UL ASSISTANCE INFORMATION DATA. As shown in Table 2, a downlink frame delay DU result ((DL frame, DLF) Delay DU Result) includes the downlink delay of the downlink frame between the terminal device and the DU, and is represented by 0 or 4 bytes. A downlink frame delay indicator (DLF Delay Ind.) indicates whether the UL ASSISTANCE INFORMATION DATA includes the DLF Delay DU Result, and is represented by 1 byte. For example, when a value of the DLF Delay Ind. is 1, it indicates that the UL ASSISTANCE INFORMATION DATA includes the DLF Delay DU Result; or when the value of the DLF Delay Ind. is 0, it indicates that the UL ASSISTANCE INFORMATION DATA does not include the DLF Delay DU Result.

It should be understood that, when a burst is used as a description object, the downlink frame delay result may also be referred to as a downlink burst delay result, and the downlink frame delay indicator may also be referred to as a downlink burst delay indicator. Descriptions of the two may be replaced.

S721: The CU-UP determines a downlink delay of the downlink frame between the terminal device and the CU-UP based on the QMF received in S717, that is, determines the downlink delay $D_{U\text{-}UE\text{-}base\ station}$ of the downlink frame between the terminal device and the access network device.

The downlink delay includes the second downlink delay, a third downlink delay, and the fourth downlink delay. First downlink delay=Third downlink delay+Second downlink delay.

That is, the CU-UP determines the downlink delay between the terminal device and the CU-UP based on the second downlink delay, the third downlink delay, and the fourth downlink delay.

The fourth downlink delay is the fourth downlink delay carried in the GNB-CU-CP MEASUREMENT RESULTS INFORMATION sent by the CU-CP to the CU-UP in S716.

The second downlink delay is the second downlink delay carried in the UL ASSISTANCE INFORMATION DATA sent by the DU to the CU-UP in S720.

Third downlink delay=Delay $D_{D11}$+Delay $D_{D12}$. For specific descriptions of the delay, refer to the foregoing related descriptions. Details are not described again.

S722: The CU-UP sends UL PDU SESSION INFORMATION to the UPF, where the UL PDU SESSION INFORMATION carries the downlink delay $D_{D\text{-}UE\text{-}base\ station}$ between the terminal device and the CU-UP.

It may be understood that the UL PDU SESSION INFORMATION carries response information for responding to the QMF sent in S717, and the response information includes the downlink delay $D_{D\text{-}UE\text{-}base\ station}$ between the terminal device and the CU-UP.

For example, Table 3 shows an example of the UL PDU SESSION INFORMATION. As shown in Table 3, a downlink frame delay result includes the downlink delay of the downlink frame between the terminal device and the CU-UP, and the DLF Delay Ind. indicates whether the UL PDU SESSION INFORMATION includes the DLF Delay Result, and is represented by 1 byte. For example, when a value of the DLF Delay Ind. is 1, it indicates that the UL PDU SESSION INFORMATION includes the DLF Delay Result; or when the value of the DLF Delay Ind. is 0, it indicates that the UL PDU SESSION INFORMATION does not include the DLF Delay Result.

S723: The UPF determines a downlink delay of the downlink frame between the terminal device and the UPF (that is, the core network device).

The downlink delay includes a fifth downlink delay $D_{D\text{-}base\ station\text{-}UPF}$ of the downlink frame between the UPF and the CU-UP, and the downlink delay $D_{D\text{-}UE\text{-}base\ station}$ of the downlink frame between the terminal device and the CU-UP.

That is, the UPF determines the downlink delay $D_{D\text{-}UE\text{-}UPF}$ of the downlink frame between the terminal device and the UPF based on the fifth downlink delay and the downlink delay of the downlink frame between the terminal device and the CU-UP.

The downlink delay determined in the foregoing embodiment includes the fourth downlink delay. When the downlink delay does not include the fourth downlink delay, for another specific embodiment in the scenario in which the DU and the CU are separated, refer to the embodiment in FIG. 17. However, because the fourth downlink delay does not need to be determined, a method for monitoring a downlink delay is slightly different. In this embodiment, S714 to S716 are omitted, and all content related to the fourth downlink delay is omitted in S719 to S723.

FIG. 18 is a schematic flowchart of a burst monitoring method 800 in downlink transmission in a scenario in which a DU and a CU of an access network device are separated according to an embodiment of this application. The method 800 corresponds to the embodiment of Manner B.

In the method 800, a process of performing S811 to S818 by each network element is the same as a process of performing S711 to S718 by each network element in the method 700. Details are not described herein again. The following describes a process of S819 to S823.

S819: The DU determines a second time based on the QMF received in S818, where the second time is an arrival time of the last piece of feedback information that arrives at a MAC layer of the access network device or a sending time of the last piece of feedback information that is sent from a physical layer of the terminal device.

The second time is the foregoing time $T_{D3}$. For specific descriptions, refer to the foregoing related descriptions. Details are not described again.

S820: The DU sends UL ASSISTANCE INFORMATION DATA (PDU Type 2) to the CU-UP, where the UL ASSISTANCE INFORMATION DATA carries the second time.

For example, Table 4 shows an example of the UL ASSISTANCE INFORMATION DATA. As shown in Table 4, a downlink frame timestamp DU result ((DL frame, DLF) Timestamp DU Result) includes the second time of the downlink frame, and a downlink frame delay indicator (DLF Delay Ind.) indicates whether the UL ASSISTANCE INFORMATION DATA includes the DLF Timestamp DU Result. For example, when a value of the DLF Delay Ind. is 1, it indicates that the UL ASSISTANCE INFORMATION DATA includes the DLF Timestamp DU Result; or when the value of the DLF Delay Ind. is 0, it indicates that the UL ASSISTANCE INFORMATION DATA does not include the DLF Timestamp DU Result.

S821: The CU-UP determines a downlink delay of the downlink frame between the terminal device and the CU-UP, to determine the downlink delay $D_{D\text{-}UE\text{-}base\ station}$ of the downlink frame between the terminal device and the access network device.

The downlink delay includes the fourth downlink delay, delivered on the terminal device, of the last data packet that arrives at the MAC layer in the downlink frame and a first downlink delay from a first time to the second time, and the first time is an arrival time of the first data packet that arrives at a PDCP layer of the CU in the downlink frame.

That is, the CU-UP determines the downlink delay $D_{D\text{-}UE\text{-}base\ station}$ between the terminal device and the CU-UP (that is, the core network device) based on the fourth downlink delay, the first time, and the second time.

The fourth downlink delay is the fourth downlink delay carried in the GNB-CU-CP MEASUREMENT RESULTS INFORMATION sent by the CU-CP to the CU-UP in S816.

S822: The CU-UP sends UL PDU SESSION INFORMATION to the UPF, where the UL PDU SESSION INFORMATION carries the downlink delay $D_{U\text{-}UE\text{-}base\ station}$ between the terminal device and the CU-UP.

For example, Table 3 shows an example of the UL PDU SESSION INFORMATION, and a DLF Delay Result carries the downlink delay $D_{D\text{-}UE\text{-}base\ station}$.

S823: The UPF determines a downlink delay $D_{D\text{-}UE\text{-}UPF}$ of the downlink frame between the terminal device and the UPF (that is, the core network device).

A process of performing S822 and S823 by each network element is the same as a process of performing S722 and S723 by each network element in the method 700. Details are not described herein again.

The downlink delay determined in the foregoing embodiment includes the fourth downlink delay. When the downlink delay does not include the fourth downlink delay, for another specific embodiment in the scenario in which the DU and the CU are separated, refer to the embodiment in FIG. 18. However, because the fourth downlink delay does not need to be determined, a method for monitoring a downlink delay is slightly different. In this embodiment, S814 to S816 are omitted, and all content related to the fourth downlink delay is omitted in S821 to S823.

An embodiment of this application further provides a burst monitoring method. In the method, a downlink delay of a downlink burst between a terminal device and a core network device is mainly determined based on a start time and a second time of the downlink burst between the terminal device and the core network device. The downlink delay is more accurate than a downlink delay obtained in a manner in which each network element collects statistics on delays by segment.

Figure 19:
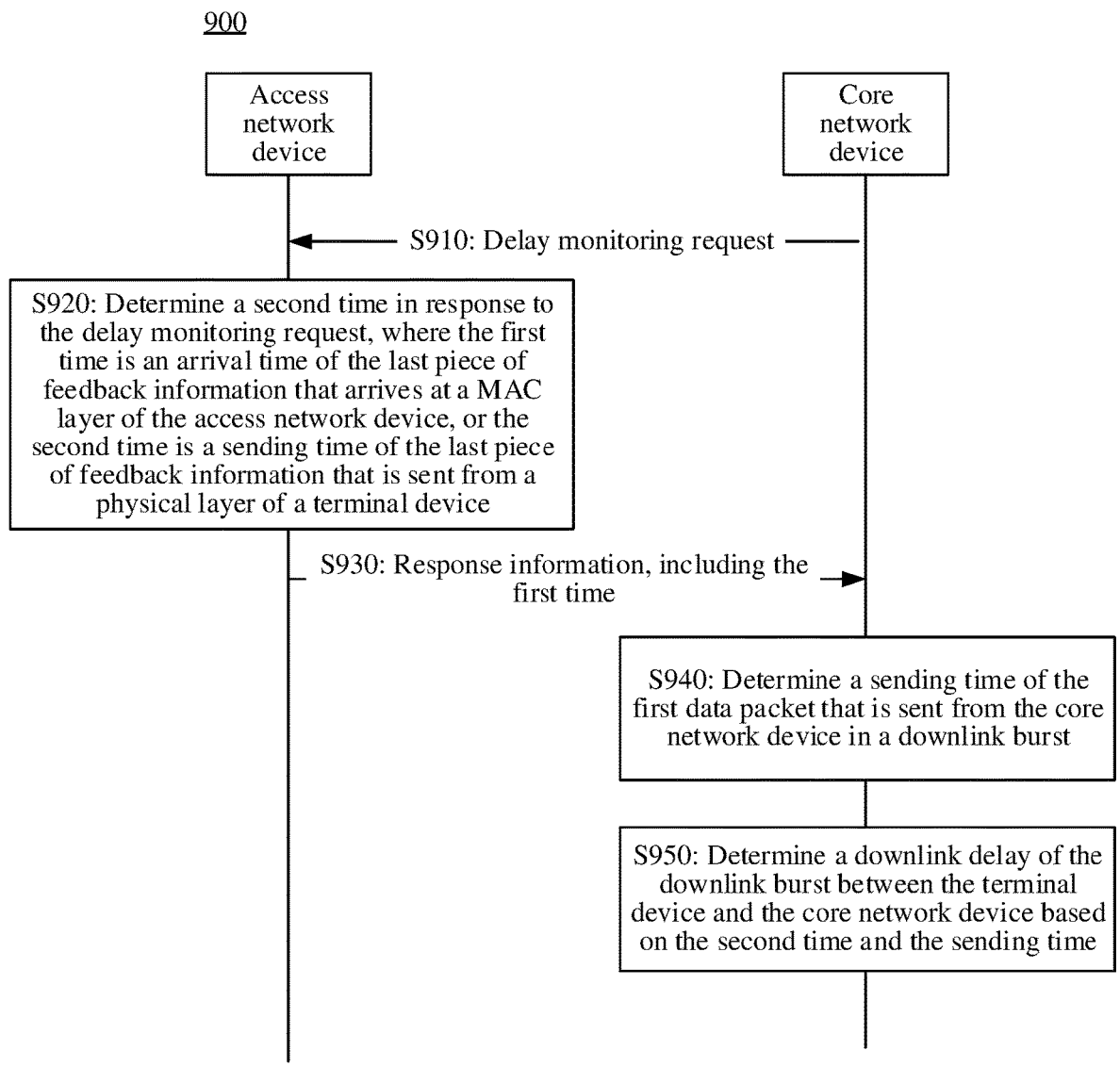
FIG. 19 is a schematic flowchart of a burst monitoring method 900 in downlink transmission according to an embodiment of this application.

FIG. 19 is a schematic flowchart of a burst monitoring method 900 in downlink transmission according to an embodiment of this application.

In S910, a core network device sends a delay monitoring request to an access network device, where the delay monitoring request indicates to perform delay monitoring on a periodic burst.

For the delay monitoring request, refer to the related descriptions of S610 in the method 600. Details are not described again.

In S920, the access network device determines a second time in response to the delay monitoring request, where the second time is an arrival time of the last piece of feedback information that arrives at a MAC layer of the access network device, or the second time is a sending time of the last piece of feedback information that is sent from a physical layer of the terminal device.

For specific descriptions of determining the second time by the access network device, refer to the related descriptions of determining the second time by the access network device described in the first case of Manner B. Details are not described again.

In S930, the access network device sends response information to the core network device, where the response information includes the second time.

The response information may be independent information, or may be content carried in other information. This is not limited in this embodiment of this application.

For example, the response information may be a field carried in an UL PDU SESSION INFORMATION frame.

In S940, the core network device determines a sending time of the first data packet that is sent from the core network device in the downlink burst.

The sending time may be understood as a start time of the downlink burst between the terminal device and the core network device.

The sending time is the foregoing time $T_{D0}$. For specific descriptions, refer to the foregoing related descriptions. Details are not described again.

In S950, the core network device determines a downlink delay of the downlink burst between the terminal device and the core network device based on the sending time and the second time.

The downlink delay of the downlink burst between the terminal device and the core network device is the foregoing downlink delay $D_{D\text{-}UE\text{-}UPF}$, and includes duration from the sending time to the second time.

According to the burst monitoring method provided in this embodiment of this application, the core network device determines the downlink delay of the downlink burst between the terminal device and the core network device by using the sending time of the first data packet that is sent from the core network device in the burst and that is sent by the access network device, and the second time of the last piece of feedback information that arrives at the access network device or the last piece of feedback information that is sent from the terminal device. In this way, a process of monitoring the downlink delay of the downlink burst between the terminal device and the core network device is implemented, and a more accurate downlink delay can be obtained, so that the core network device can more accurately evaluate data transmission performance based on the downlink delay of the downlink burst, thereby improving user experience.

In some embodiments, the downlink delay $D_{D\text{-}UE\text{-}UPF}$ of the downlink burst between the terminal device and the core network device further includes a fourth downlink delay. Based on this, the method 900 further includes:

The core network device receives the fourth downlink delay from the terminal device.

In S950, specifically, the core network device determines the downlink delay of the downlink burst between the terminal device and the core network device based on the fourth downlink delay, the sending time, and the second time.

The terminal device sends the fourth downlink delay to the core network device by using the access network device.

In an example, the response information sent by the access network device includes the second time and the fourth downlink delay.

Figure 20:
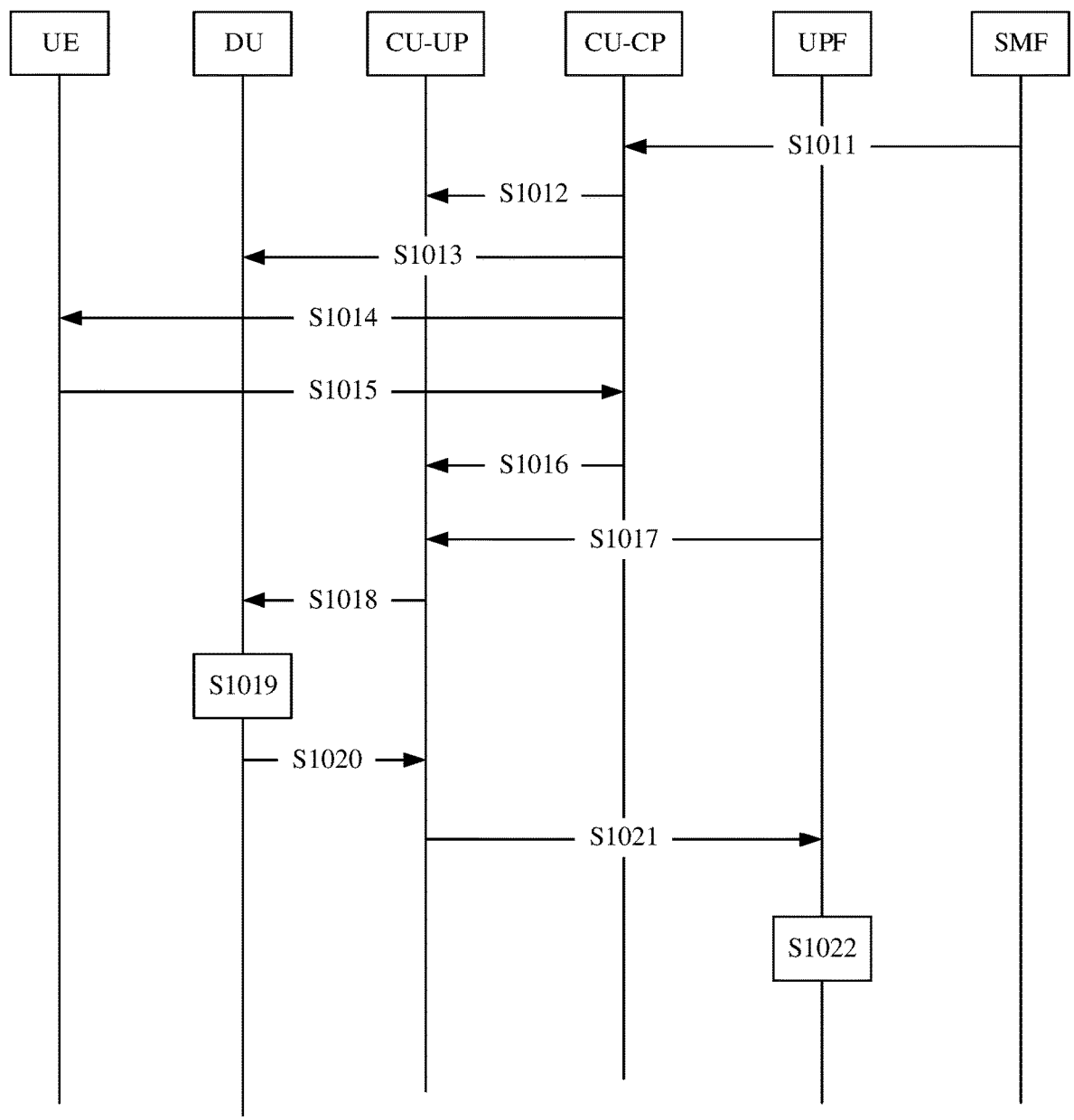
FIG. 20 is a schematic flowchart of a burst monitoring method 1000 in downlink transmission in a scenario in which a DU and a CU are separated according to an embodiment of this application.

FIG. 20 is a schematic flowchart of a burst monitoring method 1000 in downlink transmission in a scenario in which a DU and a CU are separated according to an embodiment of this application. The method 1000 is a more specific embodiment of the method 900.

Network elements in the method shown in FIG. 20 include a terminal device, an SMF and a UPF of a core network device, and a CU-CP and a CU-UP of an access network device. In addition, in a specific embodiment, the method shown in FIG. 20 is described by using an example in which a downlink frame is used as a downlink burst and UE is used as a terminal device. For example, the downlink frame may be a video frame.

In the method 1000, a process of performing S1011 to S1018 by each network element is the same as a process of performing S711 to S718 by each network element in the method 700. Details are not described herein again. The following describes a process of S1018 to S1022.

S1019: The DU determines a second time based on the QMF received in S1018.

S1020: The DU sends UL ASSISTANCE INFORMATION DATA (PDU Type 2) to the CU-UP, where the UL ASSISTANCE INFORMATION DATA carries the second time.

For a form in which the UL ASSISTANCE INFORMATION DATA carries the second time, refer to the related descriptions of S820 in the method 800. Details are not described again.

S1021: The CU-UP sends UL PDU SESSION INFORMATION to the UPF, where the UL PDU SESSION INFORMATION carries the second time and the fourth downlink delay.

The fourth downlink delay is the fourth downlink delay carried in the GNB-CU-CP MEASUREMENT RESULTS INFORMATION sent by the CU-CP to the CU-UP in S1016.

It may be understood that the UL PDU SESSION INFORMATION carries response information for responding to the QMF sent in S1017, and the response information includes the second time and the fourth downlink delay.

For example, Table 5 shows an example of the UL PDU SESSION INFORMATION. As shown in Table 5, a downlink frame timestamp result (DLF Timestamp Result) includes the second time and the fourth downlink delay, and a DLF Delay Ind. indicates whether the UL PDU SESSION INFORMATION includes the DLF Timestamp Result. For example, when a value of the DLF Delay Ind. is 1, it indicates that the UL PDU SESSION INFORMATION includes the DLF Timestamp Result; or when the value of the DLF Delay Ind. is 0, it indicates that the UL PDU SESSION INFORMATION does not include the DLF Timestamp Result.

It should be understood that, when a burst is used as a description object, the downlink frame timestamp result may also be referred to as a downlink burst timestamp result. Descriptions of the two may be replaced.

S1022: The UPF determines a downlink delay $D_{D\text{-}UE\text{-}UPF}$ of the downlink frame between the terminal device and the UPF (that is, the core network device) based on a sending time of the first data packet that is sent from the UPF (core network device) in the downlink frame, the second time, and the fourth downlink delay.

The downlink delay $D_{D\text{-}UE\text{-}UPF}$ includes the fourth downlink delay and duration from the sending time to the second time.

The downlink delay $D_{D\text{-}UE\text{-}UPF}$ determined in the foregoing embodiment includes the fourth downlink delay. When the downlink delay $D_{D\text{-}UE\text{-}UPF}$ does not include the fourth downlink delay, in S1021, the CU-UP sends the UL PDU SESSION INFORMATION to the UPF, where the UL PDU SESSION INFORMATION carries the second time. In S1022, the UPF determines the downlink delay $D_{D\text{-}UE\text{-}UPF}$ of the downlink frame between the terminal device and the UPF (that is, the core network device) based on the sending time and the second time.

Figure 21:
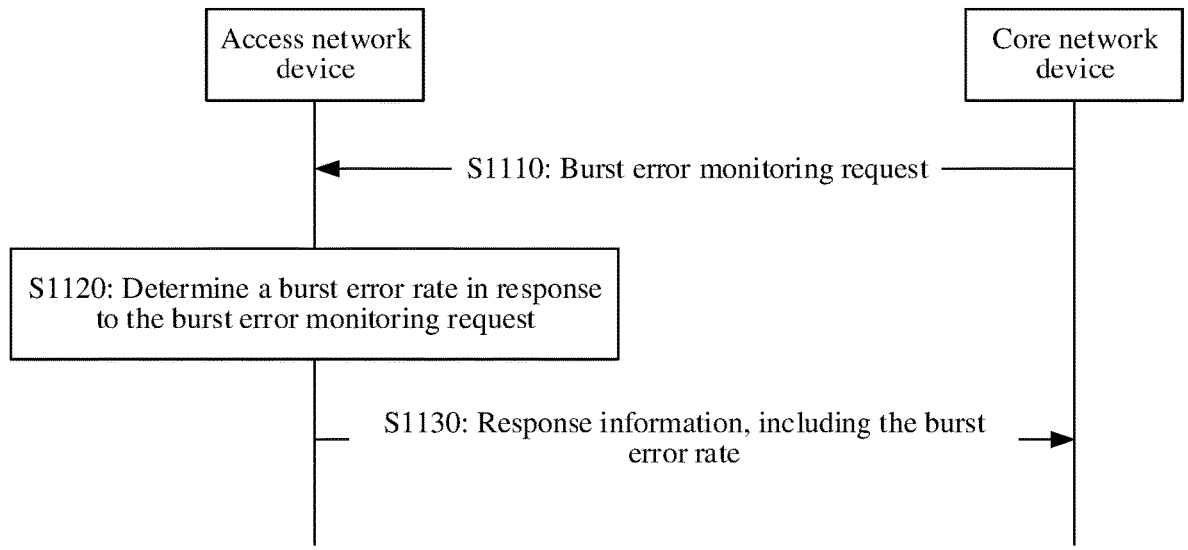
FIG. 21 is a schematic flowchart of a burst monitoring method 1100 according to an embodiment of this application.
Figure 22:
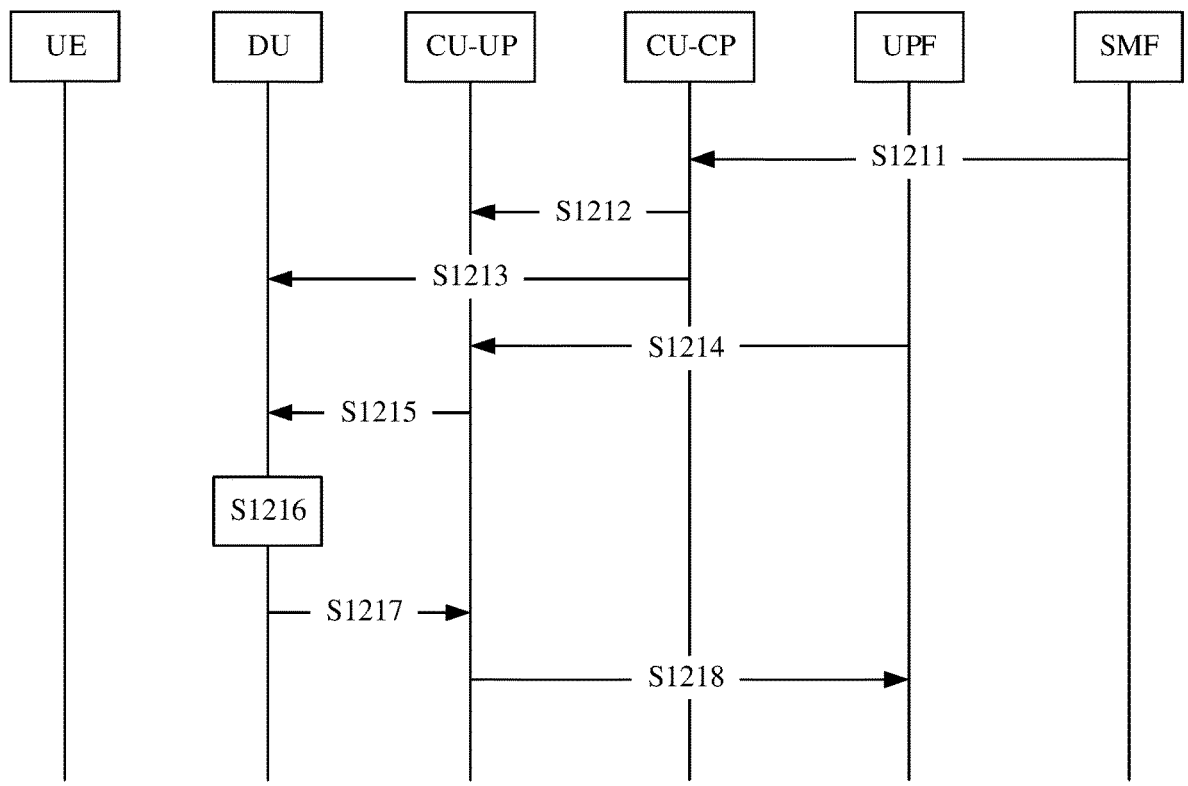
FIG. 22 is a schematic flowchart of a burst monitoring method 1200 in downlink transmission in a scenario in which a DU and a CU of an access network device are separated according to an embodiment of this application.

With reference to FIG. 12 to FIG. 20, the foregoing describes in detail the delay of the downlink burst. With reference to FIG. 21 and FIG. 22, the following describes in detail a burst error rate for a burst.

FIG. 21 is a schematic flowchart of a burst monitoring method 1100 according to an embodiment of this application. The method 1100 is used to determine a burst error rate, and is applicable to uplink transmission and downlink transmission.

In S1110, a core network device sends a burst error monitoring request to an access network device.

Correspondingly, the access network device receives the burst error monitoring request.

The burst error monitoring request indicates the access network device to report a burst error rate for a plurality of bursts to the core network device.

In uplink transmission, a burst is an uplink burst, and a burst error rate is a burst error rate for the uplink burst.

In downlink transmission, a burst is a downlink burst, and a burst error rate is a burst error rate for the downlink burst.

It should be understood that the burst error monitoring request may be independent information, or may be content carried in other information. This is not limited in this embodiment of this application.

For example, the burst error monitoring request may be a field carried in DL PDU SESSION INFORMATION.

In S1120, the access network device determines a burst error rate in response to the burst error monitoring request, where the burst error rate indicates a relationship between a quantity of first-type bursts in a plurality of bursts and a quantity of the plurality of bursts, and the first-type burst indicates that at least one data packet in one burst is not successfully received by a receive end within a preset delay.

The plurality of bursts used to determine the burst error rate indicate a plurality of bursts in a period of time. For example, the period of time may be predefined in a protocol, or may be set or configured by the access network device. In addition, a period of time of uplink transmission and a period of time of downlink transmission may be the same or may be different. This is not limited.

The preset delay used to determine whether the burst is the first-type burst may be predefined in a protocol, or may be set or configured by the access network device. In addition, a preset delay of uplink transmission and a preset delay of downlink transmission may be the same or may be different. This is not limited.

The at least one data packet used to determine the first-type burst may include one, two, three, or the like data packets.

In uplink transmission, the first-type burst indicates that at least one data packet in one burst is not successfully received by the access network device within a preset delay, and the access network device is the receive end.

In downlink transmission, the first-type burst indicates that at least one data packet in one burst is not successfully received by a terminal device within a preset delay, and the terminal device is the receive end. It should be understood that, in downlink transmission, if the access network device receives feedback information indicating that a data packet is successfully received, it is considered that the data packet is successfully received by the terminal device.

It is assumed that the preset delay is 10 ms, there are 10 bursts, each burst includes 10 data packets, and the at least one data packet used to determine the first-type burst includes one data packet. In this case, in a transmission process, two data packets in one burst are not successfully received by the receive end within the preset delay, one data packet in another burst is not successfully received by the receive end within the preset delay, and the remaining eight bursts are all successfully received by the receive end within the preset delay. In this case, the first-type burst includes the two bursts.

In some embodiments, the burst error rate is a ratio of the quantity of first-type bursts to the quantity of the plurality of bursts.

Still using the foregoing example as an example, there are two first-type bursts, and a total quantity of bursts is 10. Therefore, the burst error rate is 2/10=20%.

Certainly, the burst error rate may alternatively be determined in another manner based on the quantity of first-type bursts and the quantity of the plurality of bursts. This is not limited in this embodiment of this application.

In some embodiments, the first-type burst may further indicate that at least one data packet in first-type data in one burst is not successfully received by the receive end within the preset delay. The first-type data is base-layer data generated in the burst. The base-layer data is data used as a reference for decoding a burst to which the base-layer data belongs or another burst.

In some scenarios, an encoder may encode a burst to two types of data: first-type data, that is, base-layer data, and second-type data, that is, enhancement-layer data. That is, the burst includes the base-layer data and the enhancement-layer data. In addition, in these scenarios, a base station may separately collect statistics on a delay of the base-layer data and a delay of the enhancement-layer data. Therefore, in some cases, it may be considered that a burst is successfully transmitted, provided that base-layer data in the burst is successfully received by the receive end. Therefore, when the burst error rate is calculated, only whether a data packet in the first-type data is successfully received needs to be calculated.

In S1130, the access network device sends response information to the core network device, where the response information includes the burst error rate.

Correspondingly, the core network device receives the response information, and obtains the burst error rate.

According to the burst monitoring method provided in this embodiment of this application, a method for determining a burst error rate for a burst is provided. The burst error rate indicates a relationship between a plurality of bursts and a first-type burst that is not successfully received by a receive end in the plurality of bursts, so that an access network device determines a burst error rate for the plurality of bursts based on a burst error monitoring request of a core network device, and sends the burst error rate to the core network device. In this way, a process in which the access network device monitors the burst error rate between the terminal device and the access network device is implemented, and data transmission performance can be more accurately evaluated based on the burst error rate for the burst, thereby improving user experience.

In an example, with reference to FIG. 22, the following describes a burst monitoring method in a scenario in which a DU and a CU are separated. The method is an example of a process of monitoring a burst error rate. Network elements in the method shown in FIG. 22 include a terminal device, an SMF and a UPF of a core network device, and a CU-CP and a CU-UP of an access network device. In addition, in a specific embodiment, the method shown in FIG. 22 is described by using an example in which a frame is used as a burst and UE is used as a terminal device. For example, the frame may be a video frame.

S1211: The SMF sends a PDU SESSION RESOURCE SETUP REQUEST to the CU-CP, where the PDU SESSION RESOURCE SETUP REQUEST carries a QFI and a frame error rate quality of service monitoring request.

The frame error rate quality of service monitoring request indicates a monitoring transmission direction, and the transmission direction includes uplink transmission and downlink transmission. After the CU-CP receives the frame error rate quality of service monitoring request, the DU and the CU-UP can perform a frame error rate quality of service monitoring function for a DRB of the QFI, and the DU can enable a frame monitoring function.

It should be understood that, when a burst is used as a description object, the frame error rate quality of service monitoring request may also be referred to as a burst error rate quality of service monitoring request. Descriptions of the two may be replaced.

S1212: The CU-CP sends a BEARER CONTEXT SETUP REQUEST to the CU-UP, where the BEARER CONTEXT SETUP REQUEST message carries a QFI and a frame error rate quality of service monitoring request.

Correspondingly, the CU-UP receives the BEARER CONTEXT SETUP REQUEST sent by the CU-CP, and the CU-UP may perform the frame error rate quality of service monitoring request for the DRB of the QFI.

It should be understood that, when a burst is used as a description object, the frame error rate quality of service monitoring function may also be referred to as a burst error rate quality of service monitoring function. Descriptions of the two may be replaced.

S1213: The CU-CP sends a UE CONTEXT SETUP REQUEST to the DU, where the UE CONTEXT SETUP REQUEST carries a QFI and a frame error rate quality of service monitoring request.

Correspondingly, the DU receives the UE CONTEXT SETUP REQUEST from the CU-CP, and obtains the QFI and the corresponding frame error rate quality of service monitoring request. The DU may perform the frame error rate quality of service monitoring function for the DRB of the QFI.

S1214: The UPF sends DL PDU SESSION INFORMATION to the CU-UP, where the DL PDU SESSION INFORMATION carries a QoS monitoring frame error. The QoS monitoring frame error may be understood as the burst error monitoring request in the method 1100.

It should be understood that, when a burst is used as a description object, the QoS monitoring frame error may also be referred to as a QoS monitoring burst error. Descriptions of the two may be replaced.

S1215: The CU-UP sends DL USER DATA (PDU Type 0) to the DU, where the DL USER DATA carries the QoS monitoring frame error.

Correspondingly, the DU receives the DL USER DATA (PDU Type 0), and obtains the QoS monitoring frame error.

S1216: The DU determines a frame error rate.

The DU monitors a first-type frame in a plurality of frames in a period of time, and obtains the frame error rate based on a quantity of first-type frames and a quantity of the plurality of frames. For specific descriptions of determining the frame error rate, refer to the foregoing related descriptions. Details are not described again.

It should be understood that, when a burst is used as a description object, the frame error rate may also be referred to as a burst error rate. Descriptions of the two may be replaced.

S1217: The DU sends UL ASSISTANCE INFORMATION DATA (PDU Type 2) to the CU-UP, where the UL ASSISTANCE INFORMATION DATA carries the frame error rate.

Correspondingly, the CU-UP receives the UL ASSISTANCE INFORMATION DATA, and obtains the frame error rate.

S1218: The CU-UP sends UL PDU SESSION INFORMATION to the UPF, where the UL PDU SESSION INFORMATION carries the frame error rate.

Correspondingly, the UPF receives the UL PDU SESSION INFORMATION, and obtains the frame error rate.

Figure 23:
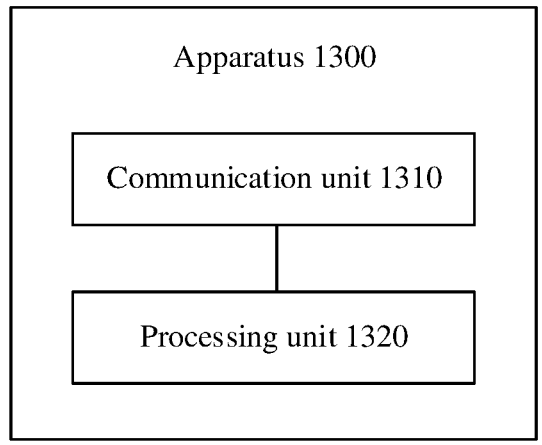
FIG. 23 is a schematic block diagram of a burst monitoring apparatus 1300 according to an embodiment of this application.
Figure 24:
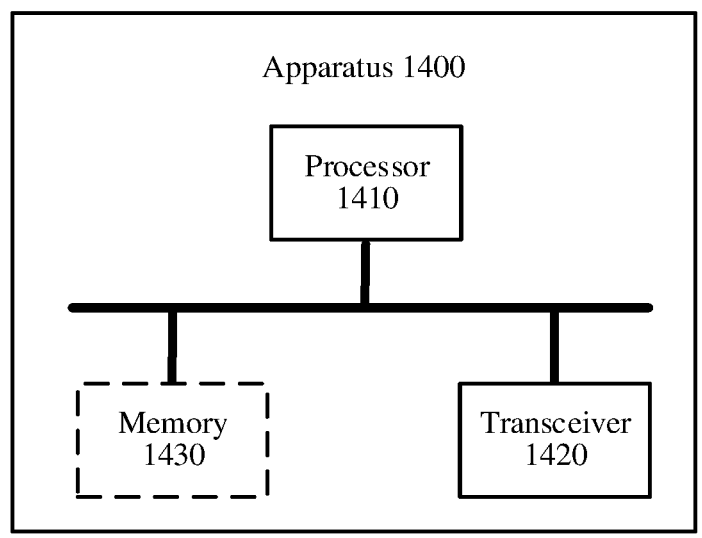
FIG. 24 is a schematic diagram of a structure of a burst monitoring apparatus 1400 according to an embodiment of this application.

With reference to FIG. 1 to FIG. 22, the burst monitoring method provided in embodiments of this application is described in detail above. With reference to FIG. 23 to FIG. 24, a burst monitoring apparatus provided in embodiments of this application is described in detail below.

FIG. 23 shows a burst monitoring apparatus 1300 according to an embodiment of this application. The apparatus 1300 may be an access network device or a core network device, or may be a chip in the access network device or the core network device. The apparatus 1300 includes a communication unit 1310 and a processing unit 1320.

In a possible implementation, the apparatus 1300 is configured to perform the procedures and steps corresponding to the access network device in the method 100. The processing unit 1320 may be configured to perform step S120 in the method 100, and the communication unit 1310 may be configured to perform step S110 in the method 100.

In another possible implementation, the apparatus 1300 is configured to perform the procedures and steps corresponding to the core network device in the method 100. The processing unit 1320 may be configured to perform steps S140 and S150 in the method 100, and the communication unit 1310 may be configured to perform steps S110 and S130 in the method 100.

In another possible implementation, the apparatus 1300 is configured to perform the procedures and steps corresponding to the core network device in the method 400. The communication unit 1310 may be configured to perform steps S410 and S430 in the method 400, and the processing unit 1320 may be configured to perform steps S440 and S450 in the method 400.

In another possible implementation, the apparatus 1300 is configured to perform the procedures and steps corresponding to the access network device in the method 600. The communication unit 1310 may be configured to perform step S610 in the method 600, and the processing unit 1320 may be configured to perform step S620 in the method 600.

In another possible implementation, the apparatus 1300 is configured to perform the procedures and steps corresponding to the core network device in the method 600. The communication unit 1310 may be configured to perform steps S610 and S630 in the method 600, and the processing unit 1320 may be configured to perform steps S640 and S650 in the method 600.

In another possible implementation, the apparatus 1300 is configured to perform the procedures and steps corresponding to the core network device in the method 900. The communication unit 1310 may be configured to perform steps S910 and S930 in the method 900, and the processing unit 1320 may be configured to perform steps S940 and S950 in the method 900.

In another possible implementation, the apparatus 1300 is configured to perform the procedures and steps corresponding to the access network device in the method 1100. The communication unit 1310 may be configured to perform steps S110 and S1130 in the method 1100, and the processing unit 1320 may be configured to perform step S1120 in the method 1100.

It should be understood that a specific process in which each unit performs corresponding steps in the foregoing methods has been described in detail in the foregoing method embodiments. For brevity, details are not described herein again.

It should be understood that the apparatus 1300 herein is embodied in a form of functional units. The term "unit" herein may be an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function.

The apparatus 1300 in the foregoing solutions has a function of implementing a corresponding step performed by the access network device or the core network device in the foregoing method. The function may be implemented by hardware, or may be implemented by hardware by executing corresponding software. The hardware or the software includes one or more modules corresponding to the foregoing function. For example, the communication unit may be replaced with a transmitter and a receiver, and another unit such as the processing unit may be replaced with a processor, to separately perform sending and receiving operations and a related processing operation in the method embodiments. In addition, the communication unit in the apparatus 1300 may alternatively include a sending unit and a receiving unit. For a receiving-related operation, a function of the communication unit may be understood as a receiving operation performed by the receiving unit, and for a sending-related operation, a function of the communication unit may be understood as a sending operation performed by the sending unit.

In embodiments of this application, the apparatus in FIG. 23 may alternatively be a chip or a chip system, for example, a system-on-a-chip (SoC). Correspondingly, a transceiver unit may be a transceiver circuit of the chip. This is not limited herein.

FIG. 24 shows another burst monitoring apparatus 1400 according to an embodiment of this application. It should be understood that the apparatus 1400 may be specifically the access network device or the core network device in the foregoing embodiments, and may be configured to perform the steps and/or procedures corresponding to the access network device or the core network device in the foregoing method embodiments.

The apparatus 1400 includes a processor 1410, a transceiver 1420, and a memory 1430. The processor 1410, the transceiver 1420, and the memory 1430 communicate with each other by using an internal connection path. The processor 1410 may implement functions of the processing unit 1320 in various possible implementations of the apparatus 1300. The transceiver 1420 may implement functions of the communication unit 1310 in various possible implementations of the apparatus 1300. The memory 1430 is configured to store instructions, and the processor 1410 is configured to execute the instructions stored in the memory 1430. In other words, the processor 1410 may invoke the stored instructions to implement a function of the processor 1320 in the apparatus 1300, to control the transceiver 1420 to send a signal and/or receive a signal.

Optionally, the memory 1430 may include a read-only memory and a random access memory, and provide instructions and data for the processor. A part of the memory may further include a non-volatile random access memory. For example, the memory may further store information of a device type. The processor 1410 may be configured to execute the instructions stored in the memory, and when the processor 1410 executes the instructions stored in the memory, the processor 1410 is configured to perform the steps and/or procedures corresponding to the access network device or the core network device in the foregoing method embodiments.

In a possible implementation, the apparatus 1400 is configured to perform the procedures and steps corresponding to the access network device in the method 100. The processor 1410 may be configured to perform step S120 in the method 100, and the transceiver 1420 may be configured to perform step S110 in the method 100.

In another possible implementation, the apparatus 1400 is configured to perform the procedures and steps corresponding to the core network device in the method 100. The processor 1410 may be configured to perform steps S140 and S150 in the method 100, and the transceiver 1420 may be configured to perform steps S110 and S130 in the method 100.

In another possible implementation, the apparatus 1400 is configured to perform the procedures and steps corresponding to the core network device in the method 400. The transceiver 1420 may be configured to perform steps S410 and S430 in the method 400, and the processor 1410 may be configured to perform steps S440 and S450 in the method 400.

In another possible implementation, the apparatus 1400 is configured to perform the procedures and steps corresponding to the access network device in the method 600. The transceiver 1420 may be configured to perform step S610 in the method 600, and the processor 1410 may be configured to perform step S620 in the method 600.

In another possible implementation, the apparatus 1400 is configured to perform the procedures and steps corresponding to the core network device in the method 600. The transceiver 1420 may be configured to perform steps S610 and S630 in the method 600, and the processor 1410 may be configured to perform steps S640 and S650 in the method 600.

In another possible implementation, the apparatus 1400 is configured to perform the procedures and steps corresponding to the core network device in the method 900. The transceiver 1420 may be configured to perform steps S910 and S930 in the method 900, and the processor 1410 may be configured to perform steps S940 and S950 in the method 900.

In another possible implementation, the apparatus 1400 is configured to perform the procedures and steps corresponding to the access network device in the method 1100. The transceiver 1420 may be configured to perform steps S1110 and S1130 in the method 1100, and the processor 1410 may be configured to perform step S1120 in the method 1100.

It should be understood that, in this embodiment of this application, the processor in the apparatus may be a central processing unit (central processing unit, CPU), or may be another general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like.

In an implementation process, the steps in the foregoing methods can be implemented by using a hardware integrated logical circuit in the processor or by using instructions in a form of software. The steps of the methods disclosed with reference to embodiments of this application may be directly performed by a hardware processor, or may be performed by using a combination of hardware and software units in the processor. A software unit may be located in a mature storage medium in the art, such as a random access memory, a flash memory, a read-only memory, a programmable read-only memory, an electrically erasable programmable memory, or a register. The storage medium is located in the memory, and a processor executes instructions in the memory and completes the steps in the foregoing methods in combination with hardware of the processor. To avoid repetition, details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. A burst monitoring method, comprising:
   receiving, by an access network device, a delay monitoring request from a core network device, wherein the delay monitoring request indicates to perform delay monitoring on a periodic burst; and
   determining, by the access network device, an uplink delay of an uplink burst between a terminal device and the access network device in response to the delay monitoring request, wherein the uplink delay of the uplink burst comprises a first uplink delay, the first uplink delay comprises a duration from a first time to a second time, the first time is a grant time of a first data packet that arrives at a media access control (MAC) layer of the terminal device in the uplink burst, and the second time is a sending time of the last data packet that is sent from a packet data convergence protocol (PDCP) layer of the access network device in the uplink burst.

2. The method according to claim 1, wherein
   the first uplink delay comprises a second uplink delay and a third uplink delay, the second uplink delay comprises a duration from the first time to a third time, the third uplink delay comprises a duration from the third time to the second time, and the third time is a sending time of the last data packet that is sent from a radio link control (RLC) layer of the access network device to the PDCP layer of the access network device in the uplink burst.

3. The method according to claim 1, wherein the uplink delay of the uplink burst further comprises a fourth uplink delay, the fourth uplink delay comprises a duration from a fourth time to a fifth time, or the fourth uplink delay comprises a duration from a fourth time to the first time, the fourth time is an arrival time of the first data packet that arrives at a PDCP layer of the terminal device in the uplink burst,
   the fifth time is an arrival time of the first data packet that arrives at the MAC layer of the terminal device in the uplink burst.

4. The method according to claim 3, wherein determining the uplink delay of the uplink burst comprises:
   determining, by the access network device, a second uplink delay and a third uplink delay in response to the delay monitoring request, wherein the second uplink delay comprises the duration from the first time to a third time, the third time is a sending time of the last data packet that is sent from a radio link control (RLC) layer of the access network device to the PDCP layer of the access network device in the uplink burst, the third uplink delay comprises the duration from the third time to the second time, and the third time is the sending time of the last data packet that is sent from the radio link control (RLC) layer of the access network device to the PDCP layer of the access network device in the uplink burst;
   determining, by the access network device, the fourth uplink delay; and
   determining, by the access network device, the uplink delay of the uplink burst based on the second uplink delay, the third uplink delay, and the fourth uplink delay.

5. The method according to claim 3, wherein determining the uplink delay of the uplink burst comprises:
   determining, by the access network device, the first time and the second time in response to the delay monitoring request;
   determining, by the access network device, the fourth uplink delay; and
   determining, by the access network device, the uplink delay of the uplink burst based on the fourth uplink delay, the first time, and the second time.

6. The method according to claim 2, wherein determining the uplink delay of the uplink burst comprises:
   determining, by the access network device, the second uplink delay and the third uplink delay in response to the delay monitoring request; and
   determining, by the access network device, the uplink delay of the uplink burst based on the second uplink delay and the third uplink delay.

7. The method according to claim 2, wherein determining the uplink delay of the uplink burst comprises:
   determining, by the access network device, the first time and the second time in response to the delay monitoring request; and
   determining, by the access network device, the uplink delay of the uplink burst based on the first time and the second time.

8. The method according to claim 1, wherein the method further comprises:
   sending, by the access network device, response information to the core network device, wherein the response information comprises the uplink delay of the uplink burst between the terminal device and the access network device.

9. An apparatus, comprising:
   at least one processor; and
   at least one memory coupled to the at least one processor; wherein the at least one memory stores instructions to be executed by the at least one processor, the instructions when executed cause the apparatus to:
   receive a delay monitoring request from a core network device, wherein the delay monitoring request indicates to perform delay monitoring on a periodic burst; and
   determine an uplink delay of an uplink burst between a terminal device and the apparatus in response to the delay monitoring request, wherein the uplink delay of the uplink burst between the terminal device and the apparatus comprises a first uplink delay, the first uplink delay comprises a duration from a first time to a second time, the first time is a grant time of a first data packet that arrives at a media access control (MAC) layer of the terminal device in the uplink burst, and the second time is a sending time of the last data packet that is sent from a packet data convergence protocol (PDCP) layer of the apparatus in the uplink burst.

10. The apparatus according to claim 9, wherein the first uplink delay comprises a second uplink delay and a third uplink delay, the second uplink delay comprises a duration from the first time to a third time, the third uplink delay comprises a duration from the third time to the second time, and the third time is a sending time of the last data packet that is sent from a radio link control (RLC) layer of the apparatus to the PDCP layer of the apparatus in the uplink burst.

11. The apparatus according to claim 9, wherein the uplink delay of the uplink burst further comprises a fourth uplink delay, the fourth uplink delay comprises a duration from a fourth time to a fifth time, or the fourth uplink delay comprises duration from a fourth time to the first time, the fourth time is an arrival time of the first data packet that arrives at a PDCP layer of the terminal device in the uplink burst, and the fifth time is an arrival time of the first data packet that arrives at the MAC layer of the terminal device in the uplink burst.

12. The apparatus according to claim 11, wherein the instructions to determine the uplink delay of the uplink burst comprises instructions to:
determine a second uplink delay and a third uplink delay in response to the delay monitoring request, wherein the second uplink delay comprises the duration from the first time to a third time, the third time is a sending time of the last data packet that is sent from a radio link control (RLC) layer of the apparatus to the PDCP layer of the apparatus in the uplink burst, the third uplink delay comprises the duration from the third time to the second time, and the third time is the sending time of the last data packet that is sent from the radio link control (RLC) layer of the apparatus to the PDCP layer of the apparatus in the uplink burst;
determine the fourth uplink delay; and
determine the uplink delay of the uplink burst based on the second uplink delay, the third uplink delay, and the fourth uplink delay.

13. The apparatus according to claim 11, wherein the instructions to determine the uplink delay of the uplink burst comprises instructions to:
determine the first time and the second time in response to the delay monitoring request;
determine the fourth uplink delay; and
determine the uplink delay of the uplink burst based on the fourth uplink delay, the first time, and the second time.

14. The apparatus according to claim 10, wherein the instructions to determine the uplink delay of the uplink burst comprises instructions to:
determine the second uplink delay and the third uplink delay in response to the delay monitoring request; and
determine the uplink delay of the uplink burst based on the second uplink delay and the third uplink delay.

15. The apparatus according to claim 10, wherein the instructions to determine the uplink delay of the uplink burst comprises instructions to:
determine the first time and the second time in response to the delay monitoring request; and
determine the uplink delay of the uplink burst between the terminal device and the apparatus based on the first time and the second time.

16. The apparatus according to claim 9, wherein the instructions when executed further cause the apparatus to:
send response information to the core network device, wherein the response information comprises the uplink delay of the uplink burst between the terminal device and the apparatus.

17. A communication system, comprising:
an access network device; and
a core network device comprising at least one processor and at least one memory coupled to the at least one processor, the at least one memory storing instructions to be executed in the at least one processor, the instructions when executed cause the core network device to:
send a delay monitoring request to the access network device, wherein the delay monitoring request indicates to perform delay monitoring on a periodic burst;
receive response information from the access network device, wherein the response information is information for responding to the delay monitoring request, and the response information comprises an uplink delay of an uplink burst between a terminal device and the access network device, wherein the uplink delay of the uplink burst between the terminal device and the access network device comprises a first uplink delay, the first uplink delay comprises a duration from a first time to a second time, the first time is a grant time of a first data packet that arrives at a media access control (MAC) layer of the terminal device in the uplink burst, and the second time is a sending time of the last data packet that is sent from a packet data convergence protocol (PDCP) layer of the access network device in the uplink burst;
determine a fifth uplink delay, wherein the fifth uplink delay is a delay, between the access network device and the core network device, of the last data packet that is sent from the PDCP layer of the access network device in the uplink burst; and
determine an uplink delay of the uplink burst between the terminal device and the core network device based on the fifth uplink delay and the uplink delay of the uplink burst between the terminal device and the access network device.

18. The system according to claim 17, wherein the uplink delay of the uplink burst between the terminal device and the access network device further comprises a fourth uplink delay, the fourth uplink delay comprises a duration from a fourth time to a fifth time, or the fourth uplink delay comprises a duration from a fourth time to the first time, the fourth time is an arrival time of the first data packet that arrives at a PDCP layer of the terminal device in the uplink burst, and the fifth time is an arrival time of the first data packet that arrives at the MAC layer of the terminal device in the uplink burst.

19. The system according to claim 17, wherein the access network device comprises at least one processor and at least one memory coupled to the at least one processor, the at least one memory of the access network device storing instructions to be executed in the at least one processor of the access network device, the instructions of the access network device when executed cause the access network device to:
receive a delay monitoring request from the core network device; and
determine an uplink delay of an uplink burst between a terminal device and the access network device in response to the delay monitoring request.

* * * * *